(12) United States Patent
Palmer et al.

(10) Patent No.: US 10,695,769 B2
(45) Date of Patent: Jun. 30, 2020

(54) APPARATUS, SYSTEM AND METHOD FOR PROVIDING A BITUMEN-RICH STREAM FROM BITUMEN-CONTAINING MATERIALS

(71) Applicant: Shingle Resource Recycling, LLC, Little Rock, AR (US)

(72) Inventors: Robert William Palmer, Springdale, AR (US); Stephen Woodson Craig, Little Rock, AR (US); David Woodson Craig, Little Rock, AR (US); Randell Gween Shelton, Jr., Tool, TX (US)

(73) Assignee: Shingle Resource Recycling, LLC, Springdale, AR (US)

( * ) Notice: Subject to any disclaimer, the term of this patent is extended or adjusted under 35 U.S.C. 154(b) by 0 days.

(21) Appl. No.: 15/932,291

(22) Filed: Feb. 16, 2018

(65) Prior Publication Data
US 2019/0255534 A1   Aug. 22, 2019

(51) Int. Cl.
*B02C 17/18*   (2006.01)
*B01D 11/04*   (2006.01)
(Continued)

(52) U.S. Cl.
CPC ........ *B02C 17/184* (2013.01); *B01D 11/0492* (2013.01); *B01F 7/00508* (2013.01);
(Continued)

(58) Field of Classification Search
CPC ..... B02C 17/184; B02C 17/02; B02C 17/186; B02C 17/185; B01D 11/0492; C10C 3/08;
(Continued)

(56) References Cited

U.S. PATENT DOCUMENTS 250,578 A * 12/1881 Richmond
2,192,094 A    2/1940 Moore
(Continued)

FOREIGN PATENT DOCUMENTS

JP            8-57281     *  8/1994
WO     2010/104516 A1      9/2010

OTHER PUBLICATIONS

"Bitumen Guide", Sources and Types, date accessed Nov. 8, 2017, 1 page, website: www.scribd.com.
(Continued)

*Primary Examiner* — Charles Cooley
(74) *Attorney, Agent, or Firm* — Brandon V. Zuniga; James R. Gourley; Carstens & Cahoon, LLP

(57) ABSTRACT

Method and apparatus to facilitate recycling of at least one fraction of bitumen-containing materials. This can be accomplished by dissolving the at least one fraction, for example, maltenes or asphaltenes in roofing shingles, into at least one solvent. In one aspect, the apparatus comprises a dissolution vessel, a tumbler positioned therein, and at least one solvent distributor. The tumbler is configured to facilitate wetting the bitumen-containing materials with solvent. In a second aspect, a system comprises the apparatus, a solid-liquid separator, for example, a vibratory screen, and at least one solvent-fraction separator, for example, a flash drum. The at least one solvent can comprise one or more solvents useful to extract the at least one fraction. In a third aspect, a first fraction is extracted from the bitumen-containing materials with a first solvent composition, then a second fraction is extracted from the remaining bitumen-containing materials with a second solvent composition.

21 Claims, 22 Drawing Sheets

(51) Int. Cl.
  *B02C 17/02* (2006.01)
  *B01F 7/12* (2006.01)
  *B01F 7/00* (2006.01)
  *C08L 95/00* (2006.01)
  *E01C 19/05* (2006.01)
  *C10C 3/08* (2006.01)
  *C10G 1/04* (2006.01)

(52) U.S. Cl.
  CPC ............... *B01F 7/12* (2013.01); *B02C 17/02* (2013.01); *B02C 17/185* (2013.01); *B02C 17/186* (2013.01); *C10G 1/04* (2013.01); *C08L 95/00* (2013.01); *C08L 2555/34* (2013.01); *C10C 3/08* (2013.01); *E01C 19/05* (2013.01)

(58) Field of Classification Search
  CPC ...... E01C 19/05; C08L 2555/34; C08L 95/00; B01F 7/12; B01F 7/005; B01F 7/00508; B01F 7/00558
  USPC .................................................. 366/234, 305
  See application file for complete search history.

(56) References Cited

U.S. PATENT DOCUMENTS

| | | | |
|---|---|---|---|
| 2,368,371 A | 1/1945 | Minge | |
| 3,279,894 A * | 10/1966 | Tate | B01F 7/00008 366/322 |
| 3,415,492 A * | 12/1968 | Rule | A23N 17/02 366/157.2 |
| 3,484,213 A * | 12/1969 | Leybourne | B01F 7/00216 198/662 |
| 4,000,000 A | 12/1976 | Mendenhall | |
| 4,108,681 A | 8/1978 | Lawson | |
| 4,208,135 A * | 6/1980 | Bastiao | A01C 1/00 366/219 |
| 4,222,851 A | 9/1980 | Good | |
| 4,224,138 A | 9/1980 | Kruyer | |
| 4,311,561 A | 1/1982 | Hastings | |
| 4,325,641 A | 4/1982 | Babus | |
| 4,532,024 A * | 7/1985 | Haschke | C10G 1/04 203/68 |
| 4,706,893 A | 11/1987 | Brock | |
| 4,726,846 A | 2/1988 | Jackson | |
| 5,098,025 A | 3/1992 | Drouin | |
| 5,201,472 A | 4/1993 | Brock | |
| 5,264,118 A | 11/1993 | Cymerman | |
| 5,337,901 A | 8/1994 | Skaer | |
| 5,337,965 A | 8/1994 | Chiovitti | |
| 5,378,079 A | 1/1995 | Omann | |
| 5,385,426 A | 1/1995 | Omann | |
| 5,386,947 A | 2/1995 | Omann | |
| 5,538,343 A * | 7/1996 | Tynan | B01D 19/0052 366/149 |
| 5,811,607 A | 9/1998 | Richardt | |
| 5,848,755 A | 12/1998 | Zickell | |
| 6,120,838 A | 9/2000 | Zickell | |
| 6,186,700 B1 | 2/2001 | Omann | |
| 6,228,503 B1 | 5/2001 | Zickell | |
| 6,290,152 B1 | 9/2001 | Zickell | |
| 6,290,383 B1 * | 9/2001 | Shohet | B01F 13/06 366/132 |
| 6,386,751 B1 * | 5/2002 | Wootan | A01K 63/042 366/170.3 |
| 6,439,139 B1 | 8/2002 | Jones | |
| 6,588,973 B1 | 7/2003 | Omann | |
| 7,107,916 B2 | 9/2006 | Bland | |
| 7,238,408 B2 | 7/2007 | Aschenbeck | |
| 7,297,301 B1 | 11/2007 | Deschamps | |
| 7,806,584 B2 * | 10/2010 | Wootan | A01K 63/042 366/170.3 |
| 7,913,940 B2 | 3/2011 | Harmon | |
| 8,382,302 B2 | 2/2013 | Geller | |
| 8,404,108 B2 | 3/2013 | Fan | |
| 8,449,172 B2 * | 5/2013 | Wood | B01F 3/04531 366/170.3 |
| 8,496,196 B2 | 7/2013 | Zickell | |
| 8,789,773 B2 | 7/2014 | Teeter, Jr. | |
| 8,814,464 B2 | 8/2014 | McDade | |
| 8,919,681 B1 | 12/2014 | Horton | |
| 9,259,860 B2 | 2/2016 | Kalkanoglu | |
| 9,295,992 B2 | 3/2016 | Zickell | |
| 9,393,532 B2 * | 7/2016 | Ramalingam | B01F 5/0665 |
| 9,399,713 B1 | 7/2016 | Ozer | |
| 9,457,354 B2 | 10/2016 | Svec | |
| 2005/0274068 A1 | 12/2005 | Morton | |
| 2006/0215483 A1 | 9/2006 | Helf | |
| 2008/0184661 A1 | 8/2008 | Lombard | |
| 2010/0032348 A1 | 2/2010 | Duyvesteyn | |
| 2010/0064937 A1 | 3/2010 | Harmon | |
| 2010/0089800 A1 | 4/2010 | MacDonald | |
| 2010/0213295 A1 | 9/2010 | Gould | |
| 2011/0049275 A1 | 3/2011 | Zickell | |
| 2011/0210044 A1 | 9/2011 | Chakrabarty | |
| 2012/0152809 A1 * | 6/2012 | Kift | C10G 1/04 208/390 |
| 2013/0001136 A1 | 1/2013 | Adeyinka | |
| 2013/0026063 A1 | 1/2013 | Gillis | |
| 2013/0036714 A1 | 2/2013 | Bolton | |
| 2013/0087330 A1 | 4/2013 | Sodhi | |
| 2013/0104774 A1 | 5/2013 | Teeter, Jr. | |
| 2013/0199410 A1 | 8/2013 | Maldonado | |
| 2014/0014000 A1 | 1/2014 | Franzen | |
| 2014/0034762 A1 | 2/2014 | Zickell | |
| 2014/0097278 A1 | 4/2014 | Zickell | |
| 2014/0373749 A1 | 12/2014 | Zickell | |
| 2015/0352506 A1 * | 12/2015 | Ramalingam | B01F 5/0665 366/305 |
| 2016/0122507 A1 | 5/2016 | Cox | |

OTHER PUBLICATIONS

Nave, R., "Ultrasonic Sound", Dec. 21, 2017, 3 pages, website: http://hyperphysics.phy.astr.gsu.edu/hbase/Sound/usound.html.
Raha Bitumen Co., Bitumen Components.composition of bitumen. Bitumen Characterization, Nov. 11, 2017, 4 pages, website: http://rahabitumen.com/bitumen.components/.
Sharma, B.K., "Maltenes and Asphaltenes of Petroleum Vacuum Residues: Physico.Chemical Characterization", Petroleum Science and Technology, 25:93.104, 2007, 12 pages.
Wikipedia "Asphalt" Dec. 8, 2017 (Dec. 8, 2017) Retrieved online from https://en.wikipedia.org/w/index.php?title=Asphalt&oldid=814301 003 on Jun. 3, 2019 (Jun. 3, 2019); p. 1 para [0001]; p. 10 para [0004] (18 pages).
Wikipedia "Asphalt roll roofing" Oct. 31, 2016 (Oct. 31, 2016) Retrieved online from https://en.wikipedia.org/w/index.php?title=Asphalt_roll_roofing&oldid=747026001 on Jun. 3, 2019 (Jun. 3, 2019); p. 1 para [0001] (3 pages).
Wikipedia "Heptane" Nov. 17, 2016 (Nov. 17, 2016) Retrieved online from https://en.wikipedia.org/w/index_php?title=Heptane&oldid=749946980 on Jun. 3, 2019 (Jun. 3, 2019); p. 1 para [0002] (5 pages).
International Search Report and Written Opinion from PCT/2019/018343 dated Jun. 25, 2019 (21 pages).

* cited by examiner

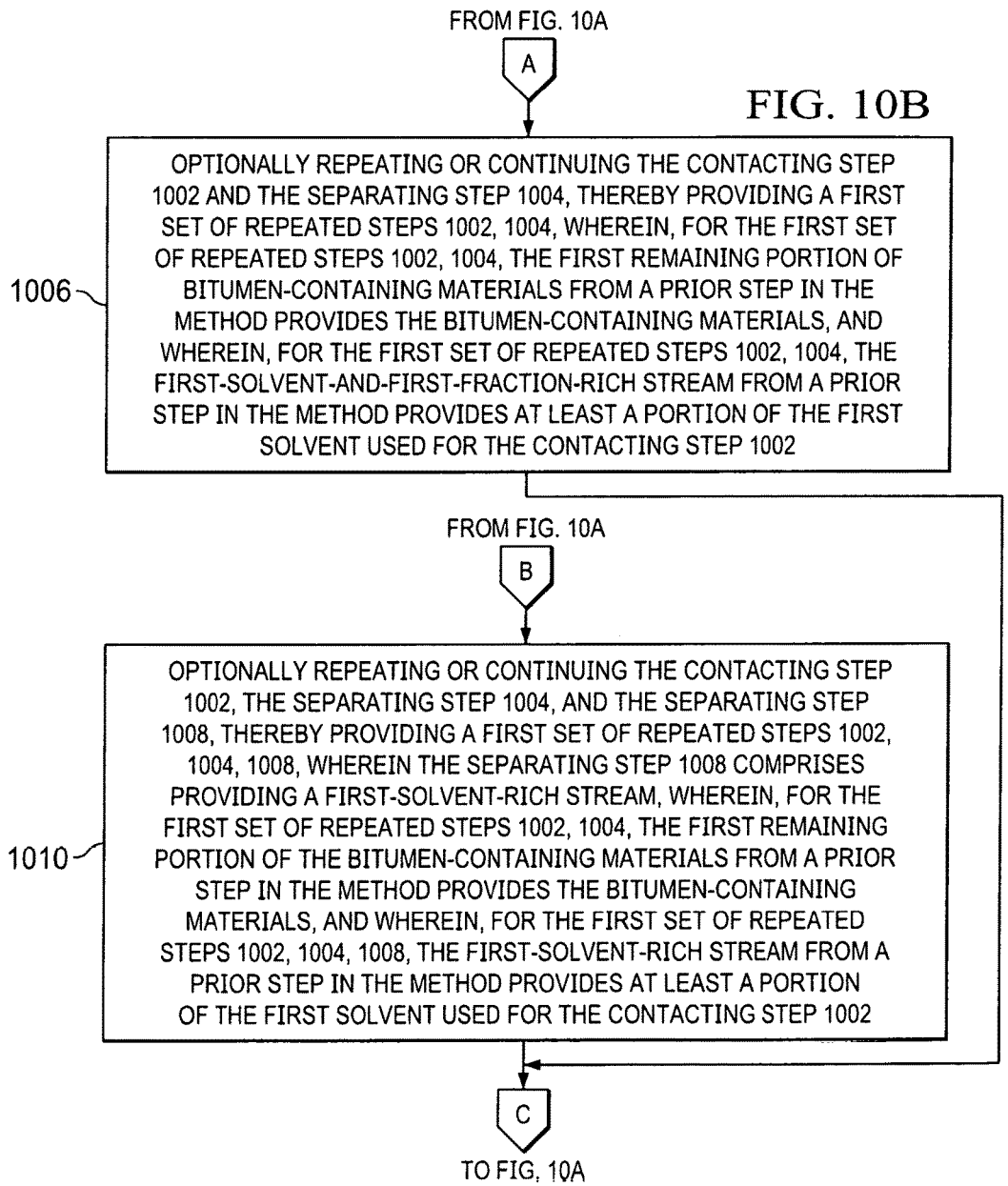

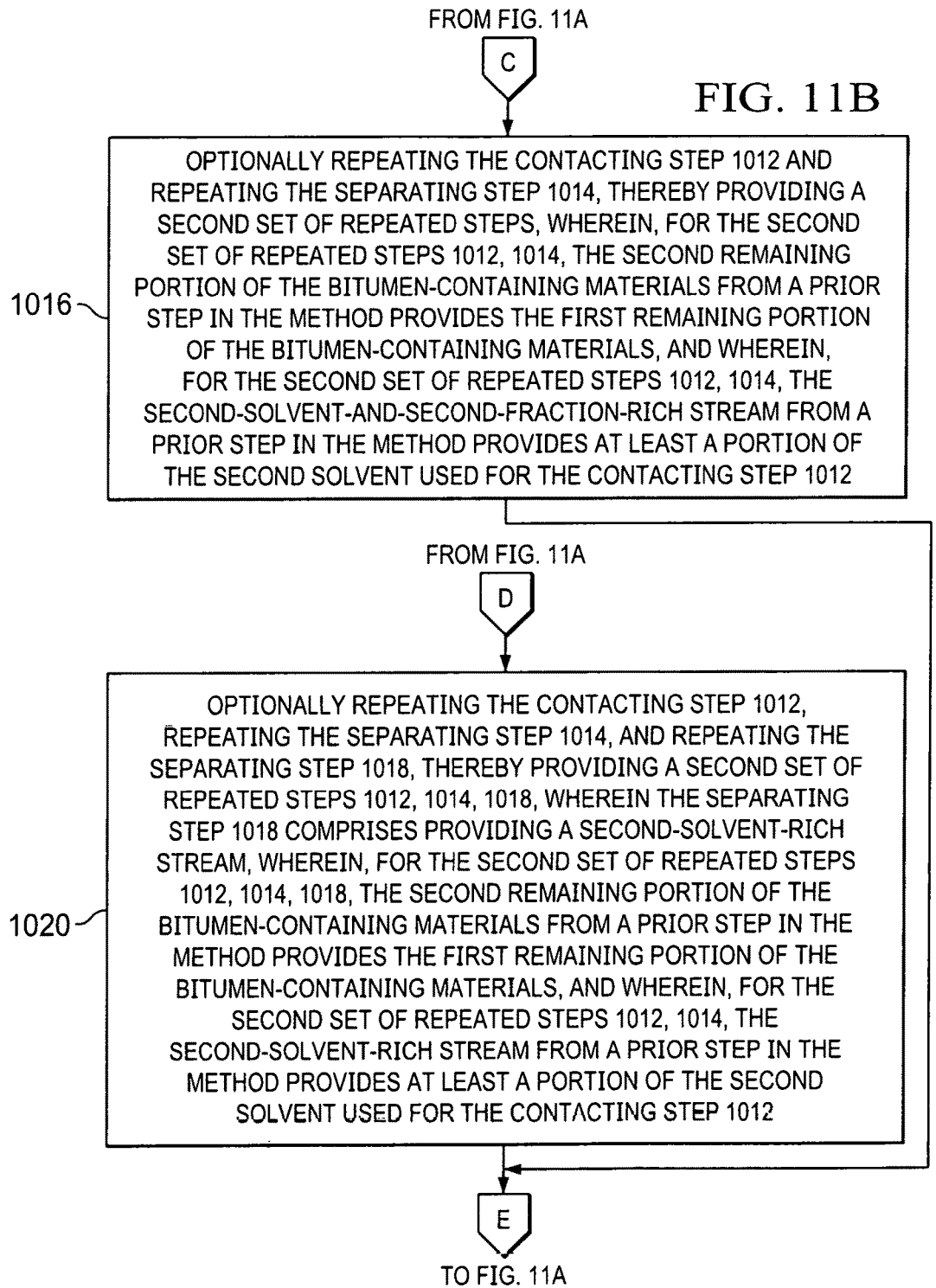

APPARATUS, SYSTEM AND METHOD FOR PROVIDING A BITUMEN-RICH STREAM FROM BITUMEN-CONTAINING MATERIALS

BACKGROUND

Cross-Reference to Related Applications

This paragraph is intentionally left blank.

Technical Field

In one aspect, the present invention relates to recycling, for example, recycling materials which comprise bitumen. Examples of materials which comprise bitumen include products that use asphalt cement as a binder, such as roofing shingles, roll roofing (also known as rolled roofing), cold patch, asphalt road paving, emulsions, and the like.

In a second aspect, the present invention relates to separating bitumen-containing materials to provide a bitumen rich stream.

BACKGROUND

Bitumen-containing materials and fractions of the bitumen-containing materials that are typically disposed in landfills include used asphalt roofing shingles and underlying felt, used roll roofing, and waste cutouts from shingle manufacturing. Fees for this disposal method typically range from $20 to $100 dollars per ton. Examples of products made from bitumen-containing materials include asphalt cement, gravel, granules, aggregate, sand, limestone, petroleum-based additives, and either fiberglass or cellulose. When separated from each other, these fractions are usable and have market value.

A small portion of these bitumen-containing materials, specifically used asphalt roofing shingles, are recycled in lieu of going into a landfill. When recycled, the recycling technique involves grinding and mixing the shingles into hot mix paving asphalt. The market value for this use is substantially less than the total value of the separate individual fractions.

SUMMARY OF THE INVENTION

In a first aspect, an embodiment of the invention provides an apparatus to facilitate dissolution of at least one fraction of bitumen-containing materials into at least one solvent. The apparatus comprises a dissolution vessel, a tumbler, and at least one solvent distributor. The tumbler is configured to agitate the bitumen-containing materials and facilitate wetting the bitumen-containing materials with the at least one solvent. The at least one solvent distributor is configured to discharge the at least one solvent into the dissolution vessel.

The dissolution vessel comprises a feed inlet, a catch basin, and at least one discharge outlet. The feed inlet of the dissolution vessel is configured to facilitate feeding the bitumen-containing materials into the dissolution vessel.

The tumbler comprises a cage and a containment space bounded by the cage. The cage is configured to receive the bitumen-containing materials comprising larger solid objects and smaller solid objects. The cage is configured to partially contain the bitumen-containing materials. The cage comprises cage apertures configured to retain the larger solid objects that cannot pass through the cage apertures and allow liquid and the smaller solid objects to pass through the cage apertures. The containment space is configured to permit the bitumen-containing materials to be agitated within the cage.

The catch basin of the dissolution vessel is configured to receive catch basin contents comprising the at least one solvent, the at least one fraction of the bitumen-containing materials and the smaller solid objects in the bitumen containing materials. The catch basin is configured to discharge the catch basin contents through the at least one discharge outlet, thereby providing a mixed-materials stream.

In a second aspect, an embodiment of the invention provides a system comprising an apparatus to facilitate dissolution of at least one fraction of bitumen-containing materials into at least one solvent, a solid-liquid separator, and at least one solvent-fraction separator.

The apparatus comprises a dissolution vessel, a tumbler, and at least one solvent distributor. The tumbler is configured to agitate the bitumen-containing materials and facilitate wetting the bitumen-containing materials with the at least one solvent. The at least one solvent distributor is configured to discharge the at least one solvent into the dissolution vessel.

The dissolution vessel comprises a feed inlet, a catch basin, and at least one discharge outlet. The feed inlet of the dissolution vessel is configured to facilitate feeding the bitumen-containing materials into the dissolution vessel.

The tumbler comprises a cage and a containment space bounded by the cage. The cage is configured to receive the bitumen-containing materials comprising larger solid objects and smaller solid objects. The cage is configured to partially contain the bitumen-containing materials. The cage comprises cage apertures configured to retain the larger solid objects that cannot pass through the cage apertures and allow liquid and the smaller solid objects to pass through the cage apertures. The containment space is configured to permit the bitumen-containing materials to be agitated within the cage.

The catch basin of the dissolution vessel is configured to receive catch basin contents comprising the at least one solvent, the at least one fraction of the bitumen-containing materials and the smaller solid objects in the bitumen containing materials. The catch basin is configured to discharge the catch basin contents through the at least one discharge outlet, thereby providing a mixed-materials stream.

The solid-liquid separator configured to receive the mixed-materials stream from the at least one discharge outlet of the dissolution vessel. The solid-liquid separator is configured to separate the mixed-materials stream into a liquid-rich stream comprising liquid from the mixed-materials stream and a solids-rich stream comprising solids from the mixed-materials stream.

The at least one solvent-fraction separator is configured to separate the liquid-rich stream into a solvent-rich stream comprising the at least one solvent and a bitumen-rich stream comprising the at least one fraction.

In a third aspect, an embodiment of the invention provides a method for separating bitumen-containing materials to provide at least one product stream. The at least one product stream comprises a bitumen-rich stream, and the bitumen-rich stream comprises at least one fraction selected from the group consisting of asphaltenes, maltenes and a combination thereof.

The method comprises several steps. A first step comprises contacting the bitumen-containing materials with at least one solvent while agitating the bitumen-containing materials. The bitumen-containing materials comprise the at least one fraction, and the at least one fraction is soluble in the at least one solvent.

A second step comprises separating the bitumen-containing materials to provide a solvent-and-bitumen-rich stream. The solvent-and-bitumen-rich stream comprises a separated portion of the at least one solvent and the at least one fraction dissolved in the separated portion of the at least one solvent.

A third step comprises separating the solvent-and-bitumen-rich stream to provide the bitumen-rich stream, and the bitumen-rich stream comprises the at least one fraction.

In a fourth aspect, an embodiment of the invention provides a method for separating bitumen-containing materials to provide at least one product stream. The bitumen-containing materials comprise a first fraction and a second fraction, and the at least one product stream comprises a first-fraction-rich stream comprising the first fraction and a second-fraction-rich stream comprising the second fraction.

The method comprises several steps. A first step comprises contacting the bitumen-containing materials with a first solvent in which the first fraction, which comprises maltenes, is soluble.

A second step comprises separating the bitumen-containing materials to provide a first-solvent-and-first-fraction-rich stream and a first remaining portion of the bitumen-containing materials. The first-solvent-and-first-fraction-rich stream comprises a separated portion of the first solvent and the first fraction dissolved in the separated portion of the first solvent.

A third step comprises separating the first-solvent-and-first-fraction-rich stream to provide the first-fraction-rich stream.

A fourth step comprises contacting the first remaining portion of the bitumen-containing materials with a second solvent. The first remaining portion of the bitumen-containing materials comprises the second fraction. The second fraction, which comprises asphaltenes, is soluble in the second solvent.

A fifth step comprises separating the first remaining portion of the bitumen-containing materials to provide a second-solvent-and-second-fraction-rich stream. The second-solvent-and-second-fraction-rich stream comprises a separated portion of the second solvent and the second fraction dissolved in the separated portion of the second solvent.

A sixth step comprises separating the second-solvent-and-second-fraction-rich stream to provide the second-fraction-rich stream.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIGS. 10A, 10B, 11A and 11B are schematic flow charts illustrating an embodiment of a method for separating bitumen-containing materials to provide at least one product stream, wherein the bitumen-containing materials comprises a first fraction and optionally a second fraction, each of which can be selected from asphaltenes, maltenes, and a combination thereof, and wherein the at least one product stream comprises a first-fraction-rich-stream and optionally a second-fraction-rich stream.

DETAILED DESCRIPTION

Figure 1:
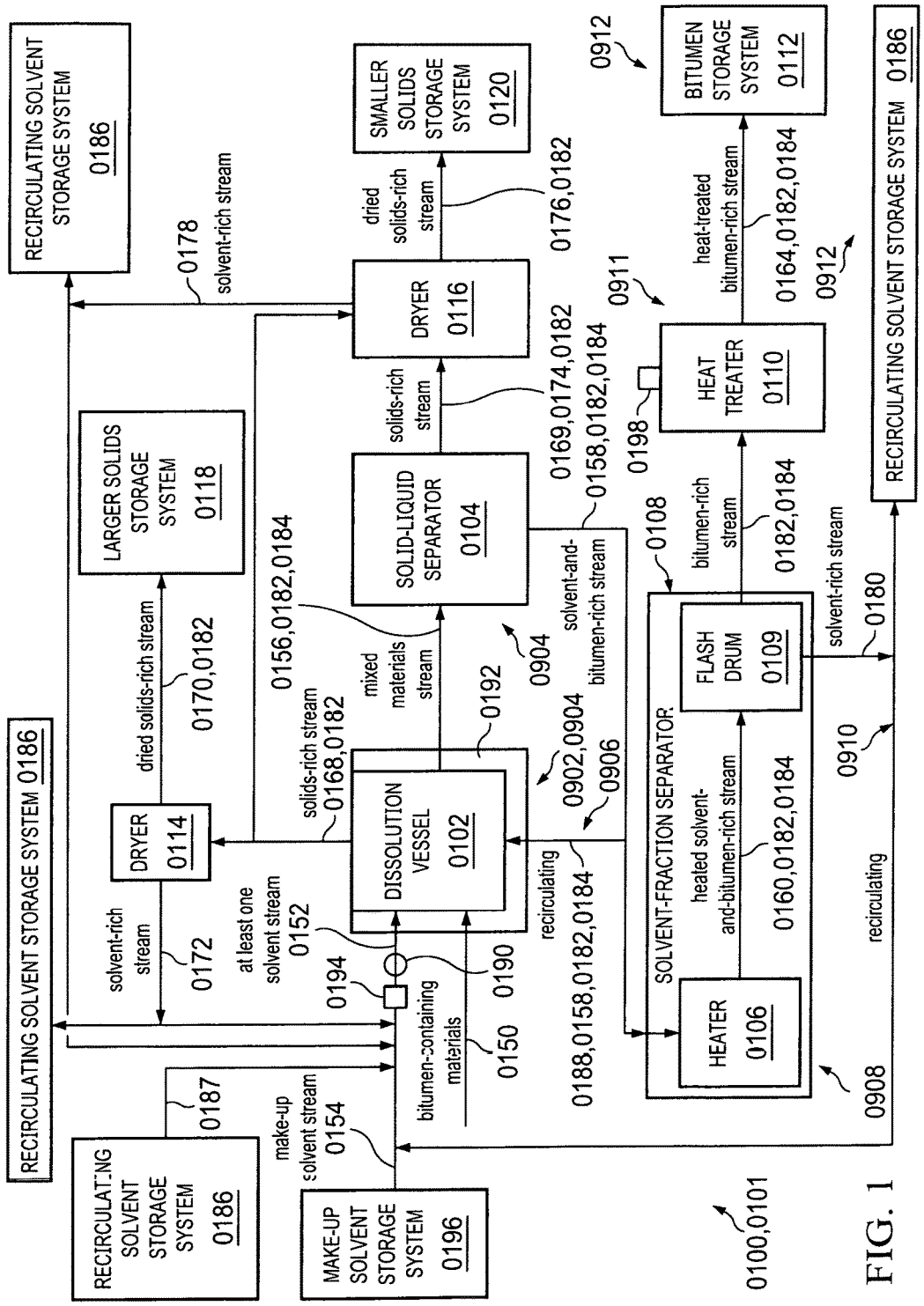
FIG. 1 is a schematic block flow diagram illustrating an embodiment of a system and method for contacting bitumen-containing materials with at least one solvent stream to provide a bitumen-rich stream.

As a general overview, FIG. 1, FIG. 2, FIG. 3, FIG. 9, FIG. 10A, FIG. 10B, FIG. 11A and FIG. 11B, illustrate methods 0100 for separating bitumen-containing materials 0150 to provide at least one product stream 0182. The illustrated methods can generally be run as a batch process, continuous process, mixed batch-and-continuous process, approximately steady-state process, dynamic process (i.e., not steady-state) or combination thereof. As an example, the solvation process involving the dissolution of bitumen in a solvent can occur as a dynamic batch process, while later steps, for example, separation of a solvent and bitumen or separation of solids and liquids, can occur as approximately steady state processes. Additionally, in some embodiments, the processes described herein can be used to extract bitumen from bitumen-containing materials without first comminuting the bitumen-containing materials. For ease of reference, the reference numbers for an element described in this application generally begin with two digits that correspond to a figure where the reference number can be found.

Generally speaking, the products produced using the processes, systems, and apparatuses described herein can be derived from bitumen-containing materials, for example, a recycling stream of roofing shingles, rolled roofing, and many other used products, whether or not they first comminuted. The ability of the processes described herein to economically and efficiently recycle such a wide range of recycled bitumen-containing materials is an economically valuable advantage relative to conventional recycling processes. For example, existing processes do not economically process non-comminuted bitumen-containing materials. Additionally, existing processes do not economically process rolled roofing, whether comminuted or not.

Because the incoming bitumen-containing materials can vary widely in their composition, the products formed using the present process can also vary widely in their composition. For example, some processes described herein can produce both a harder-bitumen-rich product stream and a softerbitumen-rich product stream. However, this does not necessarily mean that the harder bitumen-rich product stream is hard in a general sense (for example, having a penetration value equal to 0 to 20 dmm as measured at 25° C.). Rather, "harder" can mean that the harder bitumen-rich product stream is harder than the softer bitumen-rich product stream. Accordingly, if a process is fed bitumen-containing materials comprising a softer bitumen, then the harder bitumen-rich product stream may actually be relatively soft in a general sense (for example, having a penetration value equal to greater than 20 dmm as measured at 25° C. and optionally up to the highest penetration value possible for a penetration test). Unless otherwise specified herein, the penetration values described herein should be determined at 25° C. according to ASTM D5M-13, "Standard Test Method for Penetration of Bituminous Materials" by ASTM International.

Although the bitumen-containing materials fed to the processes described herein can vary greatly in their composition, the use of various features, for example, a tumbler, various separation operations, a mixture of specific solvents, an ordered series of different solvents, or a combination thereof, can be used to provide specific desirable bitumen products that conventional recycling processes do not produce economically. For example, the present process can economically produce stronger more durable bitumen products by including a desired mass ratio of harder asphaltenes and softer maltenes in a product. For example, asphaltenes can help add hardness and strength to a bitumen blend, while maltenes can help provide durability and ductility.

Advantageously, the processes, systems and apparatuses described herein enable the skilled person to separately extract a first bitumen fraction with a desired ratio of maltenes to asphaltenes and then extract one or more subsequent bitumen fractions with different ratios of maltenes to asphaltenes, and thereby produce specific-bitumen-fraction-rich product streams with different characteristics and end uses. Additionally, once the various bitumen fractions have been separated from each other, they can be blended together in desired ratios to provide further products. Similarly, the non-bitumen fractions can be extracted from the bitumen-containing materials and sold as-is, further separated, individually re-used, or blended with other components to form new products.

Moreover, upon reading the present specification, a skilled person would understand that the features, equipment, solvents and technique described herein can be recombined in nearly infinite permutations, depending on the bitumen-containing materials being processed, in order to provide a desired product or set of products, including essentially any existing bitumen-containing product and including bitumen-containing products that previously could not be produced from discarded bitumen-containing materials in an economic manner. As an example, incoming bitumen-containing materials having harder bitumen can be used to make products including harder bitumen. Similarly, bitumen-containing materials having softer bitumen can be used to make products include softer bitumen. Additionally, incoming bitumen-containing materials comprising both harder and softer bitumen can be used to create products including harder bitumen, softer bitumen or both. For example, bitumen-containing materials that comprise both asphaltenes and maltenes can be contacted with a first solvent composition to extract all or some of the maltenes and perhaps a portion of the asphaltenes and then contacted with a subsequent solvent composition to extract components that were not extracted by the first solvent composition.

As a skilled person would recognize after reading the present specification, each extraction of a desired bitumen fraction from bitumen-containing materials can be accomplished by varying the process conditions used to dissolve bitumen (e.g., maltenes, asphaltenes or a combination thereof) into a first solvent composition and any subsequent solvent compositions. These process conditions include temperature, pressure, solvent or solvents used, solvent mass concentration, solvent-to-bitumen mass ratio, dissolution time, recirculation mass flow rate, type of agitation, and degree of agitation. Furthermore, the composition of one or more fractions extracted from the bitumen-containing materials can be modified by the types of separation steps employed, for example, size-based (e.g., filtration, screening), gravity-based (settling, phase-separation), or distillation-based separation. For example, asphaltenes tend to be denser and harder than maltenes, melt at higher temperatures than maltenes, have higher boiling points than maltenes at a given pressure, and have higher flash points than maltenes. Additionally, while both maltenes and asphaltenes tend to dissolve in various aromatic compounds or ketones, asphaltenes tend not to dissolve as well as maltenes in alkanes.

Moreover, while several different examples of useful specific solvents and classes of solvents are provided in the present application, a skilled person, upon reading this disclosure, would understand that additional useful solvents can be determined, for example, by determining whether bitumen (e.g., maltenes, asphaltenes or both) have a desired degree of solubility (e.g., 0.1, 1, 10, or 100 grams of the bitumen dissolves in 100 grams of the solvent under a standard set of conditions described herein or under the operating conditions according to a process described herein).

Also, as a skilled person would understand upon reading this disclosure, the recycling of bitumen-containing materials, for example, shingles, rolled roofing, etc., can be achieved at economically and commercially advantageous rates. For example, some processes, systems, or apparatuses described herein can be used to process at least 23, 45, 227, 454, 2268, 3402, 4536, 4990, 5443, 5897, 6350 or 6804 kg (50, 100, 500, 1000, 5000, 7500, 10000, 11000, 12000, 13000, 14000 or 15000 lb) per batch of bitumen-containing materials (e.g., fed to a process, system, apparatus, dissolution vessel, agitator, tumbler, cage, or combination thereof) and optionally up to 13608, 11340 or 9072 kg (30000, 25000 or 20000 lb) per batch of bitumen-containing material. As a skilled person would understand, if one batch is processed per hour, the feed rates described herein in terms of kg/batch (lb/batch) can also be described in terms of kg/hour (lb/hr). At least in some embodiments, higher feed rates of bitumen-containing materials can result in more commercially desirable processes.

In some embodiments, the bitumen-containing materials (e.g., shingles) comprise 74 wt. % sand and gravel, 6 wt. % fiberglass, and 20 wt. % bitumen (e.g., asphalt), although the wt. % of each component can vary by 30, 25, 20, 15, 10, 9, 8, 7, 6, 5, 4, 3, 2 or 1% from the listed weight percentages in some embodiments. Accordingly, some embodiments described herein can process, for example, at least 4.5, 9.1, 45, 91, 454, 680, 907, 998, 1089, 1179, 1270 or 1361 kg (10, 20, 100, 200, 1000, 1500, 2000, 2200, 2400, 2600, 2800 or 3000 lb) of bitumen per batch of bitumen-containing materials and optionally up to 2722, 2268 or 1814 kg (6000, 5000 or 4000 lb) of bitumen per batch of bitumen-containing materials. Additionally, some embodiments can provide one or more product streams comprising at least 50, 60, 70, 80, 85, 86, 87, 88, 89, 90, 91, 92, 93, 94, 95, 96, 97, 98, 99 wt. % and up to 100 wt. % of the bitumen in the bitumen-containing materials (e.g., on a per batch or optionally per hour basis). For example, a process can be designed so that at least approximately 90 wt. % and up to 100 wt. % of the bitumen in the bitumen-containing materials is provided in a bitumen-rich product stream, thereby providing a bitumen-rich product stream with a mass flow rate of at least about 1139 kg (2512 lb) of bitumen/batch of bitumen-containing materials or 1139 kg/hr (2512 lb/hour).

Moreover, some embodiments can provide one or more product streams comprising at least 50, 60, 70, 80, 85, 86, 87, 88, 89, 90, 91, 92, 93, 94, 95, 96, 97, 98, 99 wt. % and up to 100 wt. % of the bitumen in the bitumen-containing materials. For example, in some embodiments, a bitumen-rich product stream can comprise about 97 wt. % bitumen and about 3 wt. % solvent (e.g., n-heptane and toluene). Accordingly, the total mass flow rate of the bitumen-rich product stream can be approximately 1175 kg (2590 lb) of bitumen and solvent per batch of bitumen-containing materials or 1175 kg (2590 lb) of bitumen and solvent per hour. Although other higher and lower production rates are also possible with the processes, systems, and apparatuses described herein, it is worthwhile to point out that the production rates in lb per hour of bitumen that can be achieved by processing one batch per hour of bitumen-containing materials can be considerably higher than those provided by conventional processes while also providing for more control over the bitumen fractions included in one or more bitumen-rich product streams.

Figure 9:
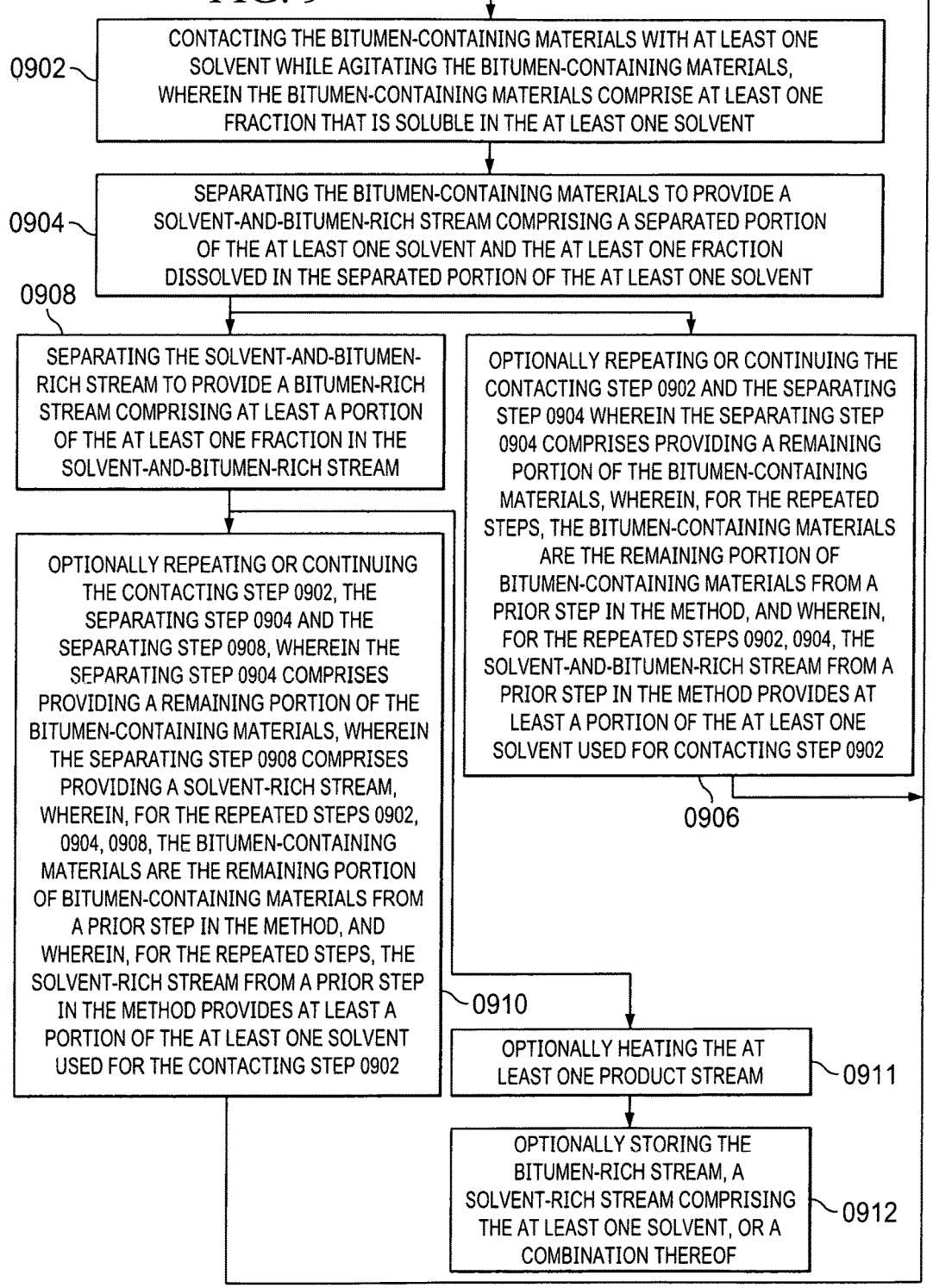
FIG. 9 is a schematic flow chart illustrating an embodiment of a method for separating bitumen-containing materials to provide at least one product stream comprising a bitumen-rich stream, for example, asphaltenes, maltenes, and a combination thereof.

An embodiment of a method 0100 for separating bitumen-containing materials 0150 to provide at least one product stream 0182 will now be described with reference to FIG. 9 and FIG. 1. As illustrated in FIG. 9, the at least one product stream 0182 comprises a bitumen-rich stream 0184, and the bitumen-rich stream 0184 comprises at least one fraction, which can be selected from the group consisting of asphaltenes, maltenes and a combination thereof. The method comprises several steps.

A first step comprises contacting 0902 the bitumen-containing materials 0150 with at least one solvent (e.g., in at least one solvent stream 0152 in FIG. 1) while agitating the bitumen-containing materials 0150, wherein the bitumen-containing materials 0150 comprise the at least one fraction, and wherein the at least one fraction is soluble in the at least one solvent.

As illustrated in FIG. 1, the contacting step 0902 can be accomplished using a dissolution vessel 0102 and optionally a cage that rotates (e.g., at a rotational velocity of at least 1, 2, 3, 4, 5, 6, 7, 8, 9, 10, 15, 20, 25, 30, 40, 50, 60, 70, 80, 90, 100, 110, 120, 130, 140, 150, 160, 170, 180, 190, 200, 210, 220 or 230 rotations per minute (rpm), no more than 240, 230, 220, 210, 200, 190, 180, 170, 160, 150, 140, 130, 120, 110, 100, 90, 80, 70, 60, 50, 40, 30, 25, 20, 15, 10, 9, 8, 7, 6, 5, 4, 3, or 2 rpm, at greater than 0 to 240 rpm, at greater than 0 to 120 rpm, 3 to 90 rpm, 6 to 60 rpm, 10 to 45 rpm, 10 to 30 rpm, 10 to 20 rpm, or a combination thereof) within the dissolution vessel to cause agitation (e.g., movement, tumbling) of the bitumen-containing materials.

Figure 8:
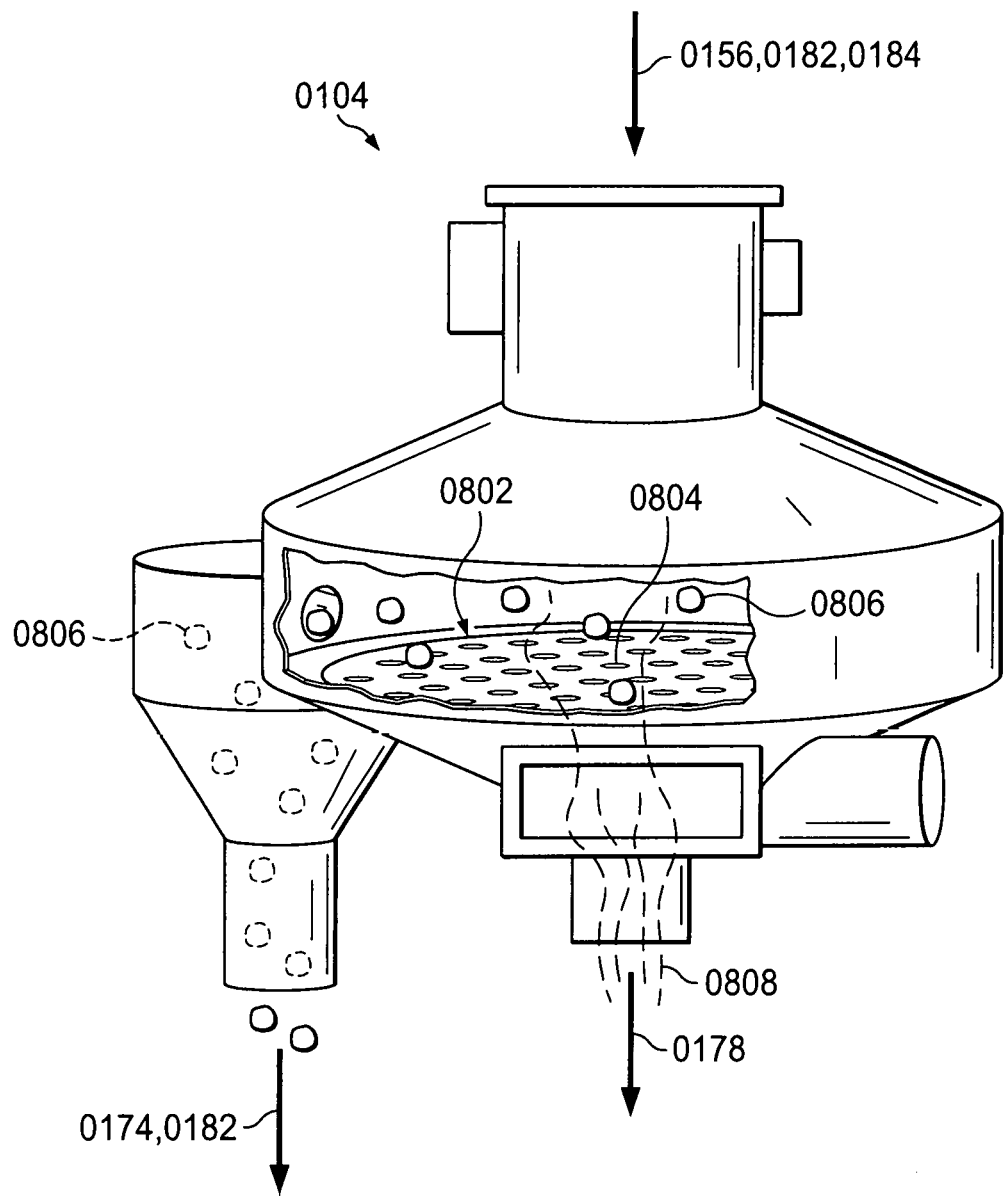
FIG. 8 is a schematic illustration showing a cut-away perspective view of the solid-liquid separator of FIG. 6, which is depicted as a vibratory screen that removes solids from the mixed-materials stream to provide a solids-rich stream and a solvent-and-bitumen-rich stream, which can be fed to a solvent-fraction separator to provide a solvent rich stream and a bitumen rich stream.

A second step comprises separating 0904 the bitumen-containing materials 0150 to provide a solvent-and-bitumen-rich stream 0158. The solvent-and-bitumen-rich stream 0158 comprises a separated portion of the at least one solvent and the at least one fraction dissolved in the separated portion of the at least one solvent. As illustrated in FIG. 1, this step can be accomplished using a solid-liquid separator 0104, which can comprise a vibratory screen, centrifugal separator or other separator. A schematic illustration of a solid-liquid separator 0104 comprising a vibratory screen is shown in FIG. 8.

A third step comprises separating 0908 the solvent-and-bitumen-rich stream 0158 to provide a bitumen-rich stream 0184. The bitumen-rich stream 0184 comprises at least a portion of the at least one fraction in the solvent-and-bitumen-rich stream 0158. As illustrated in FIG. 1, this step can be accomplished using a solvent-fraction separator 0108, which can comprise a flash drum 0109, or both a flash drum 0109 and a heater 0109 upstream of a flash drum to heat the feed stream to the flash drum.

An optional fourth step comprises storing 0912 the bitumen-rich stream 0184, a solvent-rich stream 0180 comprising the at least one solvent, or a combination thereof.

An optional fifth step comprises heating 0911 the bitumen-rich stream 0182 to at least 204, 232, 260, 287, 315 or 343° C., within 0.28° C. of the listed temperature, no more than 233, 260, 288, 316, 344 or 372° C., or a combination thereof. For example, the heating can occur using a heat treater 0110 (e.g., using a heat exchanger, a heater, in a heat treat container, tank, vessel, or a combination thereof). In some embodiments, agitation (e.g., mixing, stirring, etc.) occurs during heating. In some embodiments, the heat treater 0110 operates at atmospheric pressure, under a vacuum, or under full vacuum. Accordingly, in some embodiments, the heating occurs with agitation, under a vacuum, or a combination thereof. For example, the heat treater can be in fluid communication with an optional vacuum source 0198 to provide a vacuum in the heat treater. With reference to FIG. 1, in some embodiments the system 0101 or apparatus 0400 comprises an optional vacuum source 0198 in fluid communication with heat treater 0110. In some embodiments, the vacuum source 0198 is configured to provide a vacuum (e.g., greater than 0 kPa, at least 0.1 1, 2, 3, 4, 5, 6, 7, 8, 9, 10, 20, 30, 40, 50, 60, 70, 80, 90, 100 kPa, less than 101.325 kPa, no more than 90, 80, 70, 68, 60, 50, 40, 30, 20, or 10 kPa, or a combination thereof) in the heat treater 0198. Furthermore, the vacuum source 0198 can be configured to provide the vacuum in the heat treater 0110 while the contents of the heat treater 0110 are heated, agitated, or a combination thereof. Examples of a vacuum source 0198 include a pump, a fan, a compressor or a combination thereof.

As a recirculation option, some embodiments comprise repeating or continuing 0906 the step of contacting 0902 the bitumen-containing materials with at least one solvent and repeating or continuing 0906 the step of separating 0904 the bitumen-containing materials to provide a solvent-and-bitumen-rich stream 0158. As is evident, the repeating or continuing 0906 step can refer, for example, to a batch process in which the at least one solvent contacts the bitumen-containing materials, the at least one solvent and the bitumen-containing materials separate to at least some extent, and then the at least one solvent and the bitumen-containing materials are again brought into contact. Additionally, the repeating or continuing 0906 step can comprise a continuous recirculation of the at least one solvent which can be carrying significant amounts of bitumen or almost no bitumen depending, for example, how long the at least one solvent has spent in contact with the bitumen-containing materials. When the recirculation option (e.g., the recirculating solvent-and-bitumen-rich stream 0188) is pursued, the step of separating 0904 the bitumen-containing materials can comprise providing a remaining portion of the bitumen-containing materials 0150 in addition to the solvent-and-bitumen-rich stream 0158. For example, the remaining portion can remain in the cage 0414 in the dissolution vessel 0102. Furthermore, when the recirculation option is pursued, during the repeated steps 0902, 0904, the remaining portion of bitumen-containing materials from a prior step in the method can provide the bitumen-containing materials 0150 used in the repeated steps 0902, 0904. Additionally, when the recirculation option is pursued, the solvent-and-bitumen-rich stream 0158 from a prior step in the method can provide at least a portion of the at least one solvent (e.g., in at least one solvent stream 0152 in FIG. 1) used for the step of contacting 0902 the bitumen-containing materials 0150 with at least one solvent. The optional step of recirculating the solvent-and-bitumen-rich stream 0158 from the solid-liquid separator 0104 to the dissolution vessel 0102, thereby providing a recirculating solvent-and-bitumen-rich stream 0188, is illustrated in FIG. 1. In some embodiments, the optional step of recirculating continues until a desired amount of the bitumen in the bitumen-containing materials has been dissolved into the solvent-and-bitumen-rich stream 0158. Then, the third step of separating 0908 the solvent-and-bitumen-rich stream 0158 to provide a bitumen-rich stream 0184 can be performed.

As a second recirculation option, some embodiments comprise repeating or continuing 0910 the step of contacting 0902 the bitumen-containing materials 0150 with at least one solvent, repeating or continuing 0910 the step of separating 0904 the bitumen-containing materials 0150 to provide a solvent-and-bitumen-rich stream 0158, and repeating or continuing 0910 the step of separating 0908 the solvent-and-bitumen-rich stream 0158. As is evident, the repeating or continuing 0910 step can refer, for example, to a batch process in which the at least one solvent contacts the bitumen-containing materials, the at least one solvent and the bitumen-containing materials separate to at least some extent, and then the at least one solvent and the bitumen-containing materials are again brought into contact. Additionally, the repeating or continuing 0910 step can comprise a continuous recirculation of the at least one solvent which can be carrying significant amounts of bitumen or almost no bitumen depending, for example, on how long the at least one solvent has spent in contact with the bitumen-containing materials and the amount of bitumen removed from the at least one solvent as part of the recirculation option. When the recirculation option is pursued (e.g., when the solvent-rich stream 0180 is recirculated to provide at least a portion of the at least one solvent stream 0152 as illustrated in FIG. 1), the step of separating 0904 the bitumen-containing materials comprises providing a remaining portion of the bitumen-containing materials 0150 in addition to the solvent-and-bitumen-rich stream 0158. For example, this remaining portion can remain in the cage 0414 in the dissolution vessel 0102. Also, in conjunction with the repeated steps 0902, 0904, the step of separating 0908 the solvent-and-bitumen-rich stream comprises providing a solvent-rich stream 0180 in addition to providing a bitumen-rich stream 0184. Furthermore, when the recirculation option is pursued, during the repeated steps 0902, 0904, the remaining portion of bitumen-containing materials from a prior step in the method can provide the bitumen-containing materials 0150 used in the repeated steps 0902, 0904. Additionally, when the recirculation option is pursued, the solvent-rich stream 0180 from a prior step in the method can provide at least a portion of the at least one solvent (e.g., in the at least one solvent stream 0152 illustrated in FIG. 1) used for the step of contacting 0902 the bitumen-containing materials 0150 with at least one solvent. The optional step of recirculating the solvent-rich stream 0180 from the solid-liquid separator 0104 to the dissolution vessel 0102, thereby providing a recirculating solvent-rich stream 0180, is illustrated in FIG. 1. In some embodiments, the optional step of recirculating continues until a desired amount of the bitumen in the bitumen-containing materials has been dissolved into the solvent-and-bitumen-rich stream 0158.

It should be understood that for the purposes of describing compositions in the present application, it is often useful to describe the compositions in terms of whether a component is soluble or not in a certain solvent, combination of solvents, or ordered series of solvents. Additionally, in order to modify the definition of the composition, it can be useful to widen or narrow the definition of solubility in the solvent. This can be more practical than attempting to chemically define numerous molecules present in a fraction provided by a process described herein. Accordingly, it is useful to note that solubility, in general, can be described as a chemical property referring to the ability of a given substance to dissolve in a solvent under some conditions (e.g., temperature, pressure, mass concentration, time, etc.). In some embodiments described in this specification, a fraction (e.g., bitumen, first fraction, second fraction, or combination thereof) can be deemed soluble in a solvent (e.g., at least one solvent, first solvent, second solvent, or combination thereof) if at least 0.1 grams of the fraction (or another specified mass) is soluble in 100 grams of the solvent at 25° C., 101.325 kPa and after 48 hours of non-agitated (e.g., unstirred, unmixed) contact with the solvent.

Moreover, in some embodiments, when a fraction is described as soluble herein in the context of a dissolution step in a process, the fraction can be deemed soluble if at least 0.1 grams of the fraction (or another specified mass) is soluble in 100 grams of the solvent at the dissolution conditions used in the dissolution step during the duration of the dissolution step. Furthermore, when any fraction is described as soluble in any solvent herein, an additional embodiment (which is deemed to be described herein) can be specified wherein the fraction is required to have greater solubility in the solvent, for example, solubility can range from at least 0.1, 0.2, 0.3, 0.4, 0.5, 0.6, 0.7, 0.8, 0.9, 1, 2, 3, 4, 5, 6, 7, 8, 9, 10, 20, 30, 40, 50, 60, 70, 80, 90 or 100 g of the fraction is soluble in 100 g of the solvent up to the fraction being miscible (soluble in any amount) in the solvent.

Given that desired fractions of bitumen are often described as maltenes and asphaltenes, which can be given functional definitions as a matter of practicality, selecting a narrower or broader definition of solubility can be useful to functionally define a boundary line between what is considered a maltene verses what is considered an asphaltene in a bitumen-containing material. To illustrate, a maltene can be characterized as a fraction of a sample of the bitumen-containing materials that dissolves in n-heptane at 25° C. and 101.325 kPa after being in contact with the n-heptane under unstirred conditions for 48 hours. Then, Asphaltenes could be defined as the undissolved, remaining bitumen-containing materials that can be removed by toluene at 25° C. and 101.325 kPa after being in contact with the toluene under unstirred conditions for 48 hours.

Using this definition, a process can be developed to extract at least 95 wt. % (or some other amount) of the maltenes in the bitumen-containing materials using any solvent that accomplishes this goal within a desired range of operating conditions. Similarly, a solvent can be selected to extract at least 95 wt. % (or some other amount) of the asphaltenes in the bitumen-containing materials using a desired set of operating conditions. In order to accomplish the desired degree of extraction, it can be useful to select a solvent or solvents so that at least a minimum of 100 g (or some other amount) of the maltene fraction or asphaltene fraction is soluble in 100 g of the solvent as measured in solvent after a contacting step under specified operating conditions. Accordingly, a functional definition of a solvent could be any solvent that dissolves at least 100 g of maltenes in 100 g of the solvent at 51.7° C. and 101.325 kPa after contact under agitation as measured either at the end of a batch process with a specific duration (e.g., 15 minutes) or upon discharge from a vessel used for dissolution with a specific residence time. It should be noted that the definition of acceptable solvents could be provided in terms of solubility in a batch process, even though the solvent will be used for a continuous process, or vice versa.

As an additional example, selecting a narrower or broader definition of solubility can be useful to define which solvents are acceptable for a process. For example, if it is desirable from an economics and process-operability standpoint to contact bitumen-containing materials with solvent at 51.7° C. and 101.325 kPa under agitation, if it is desired to use no more than a specific mass rate of solvent per 1000 kg batch of bitumen-containing materials, and if it is desired to remove 95 wt. % of maltenes from bitumen-containing materials in a shorter period of time, it could be useful to use only solvents with a higher carrying capacity for maltenes at 51.7° C. and 101.325 kPa. For example, it could be useful to contact the bitumen-containing materials with solvents in which at least 100 g of maltenes (e.g., as defined based on solubility in n-heptane or another solvent at specified conditions) are soluble in 100 g of the solvent under the specified conditions.

Figure 10A:
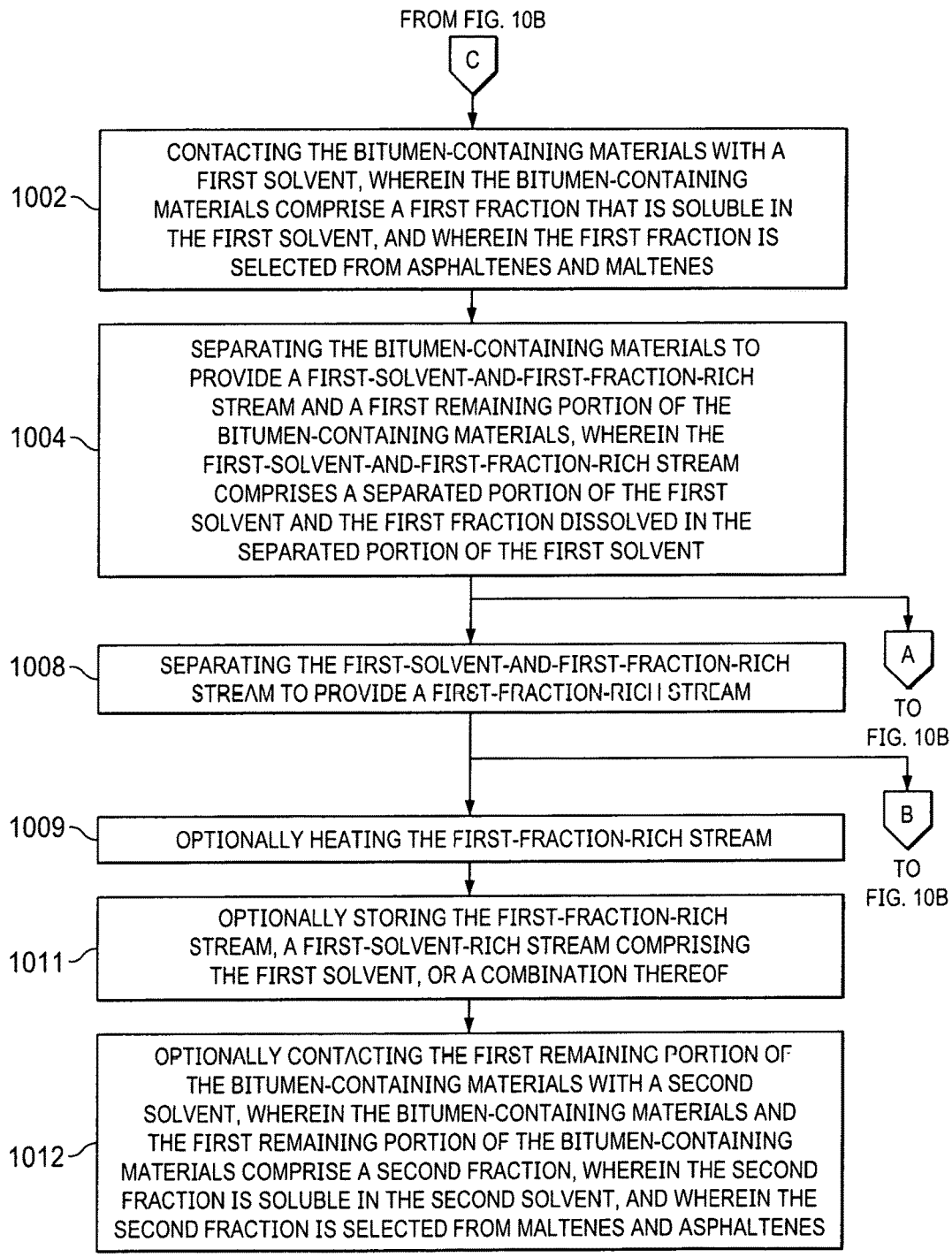

An embodiment will now be described with reference to FIG. 10A, FIG. 10B, FIG. 2 and FIG. 3. FIG. 10A and FIG. 10B illustrate a method 0200 for separating bitumen-containing materials 0150 to provide at least one product stream 0182. The bitumen-containing materials 0150 comprise a first fraction and optionally a second fraction. The at least one product stream 0182 comprises a first-fraction-rich stream 0204 comprising the first fraction and optionally a second-fraction-rich stream 0304 comprising the second fraction. The method comprises several steps.

A first step comprises contacting 1002 the bitumen-containing materials 0150 with a first solvent (e.g., in the first-solvent stream 0202 illustrated in FIG. 2) in which the first fraction is soluble. The first fraction can comprise maltenes, asphaltenes, or a combination thereof. The first fraction can comprise a relatively higher mass concentration of maltenes compared to the second fraction. The first fraction can also comprise more of the total mass of maltenes present in the bitumen-containing materials as compared to the second fraction. The first fraction can comprise a lower molecular weight fraction (e.g., maltenes), a shorter-carbon-chain-length fraction, a higher molecular weight fraction (e.g., asphaltenes), a longer-carbon-chain-length fraction, or a combination thereof. The first fraction can comprise a softer bitumen (e.g., higher penetration value bitumen, a maltene-rich fraction, maltenes), a harder bitumen (e.g., lower penetration value bitumen, an-asphaltene-rich fraction, asphaltenes), or a combination thereof.

A second step comprises separating 1004 the bitumen-containing materials 0150 to provide a first-solvent-and-first-fraction-rich stream 0258 and a remaining portion 0250, 350 of the bitumen-containing materials 0150 (e.g., first remaining portion 0250 of the bitumen-containing materials 0150). The first-solvent-and-first-fraction-rich stream 0258 comprises a separated portion of the first solvent and the first fraction dissolved in the separated portion of the first solvent.

A third step comprises separating 1008 the first-solvent-and-first-fraction-rich stream 0258 to provide the first-fraction-rich stream 0204.

An optional fourth step comprises storing 1011 the first-fraction-rich stream 0204, a first-solvent-rich stream 0280 comprising the first solvent, or a combination thereof.

An optional fifth step comprises heating 1009 the first-fraction-rich stream 0204 to at least 204, 232, 260, 287, 315 or 343° C., within 0.28° C. of the listed temperature, no more than 233, 260, 288, 316, 344 or 372° C., or a combination thereof. For example, the heating can occur using a heat treater 0110 (e.g., using a heat exchanger, a heater, in a heat treat container, tank, vessel, or a combination thereof). In some embodiments, agitation (e.g., mixing, stirring, etc.) occurs during heating.

Figure 2:
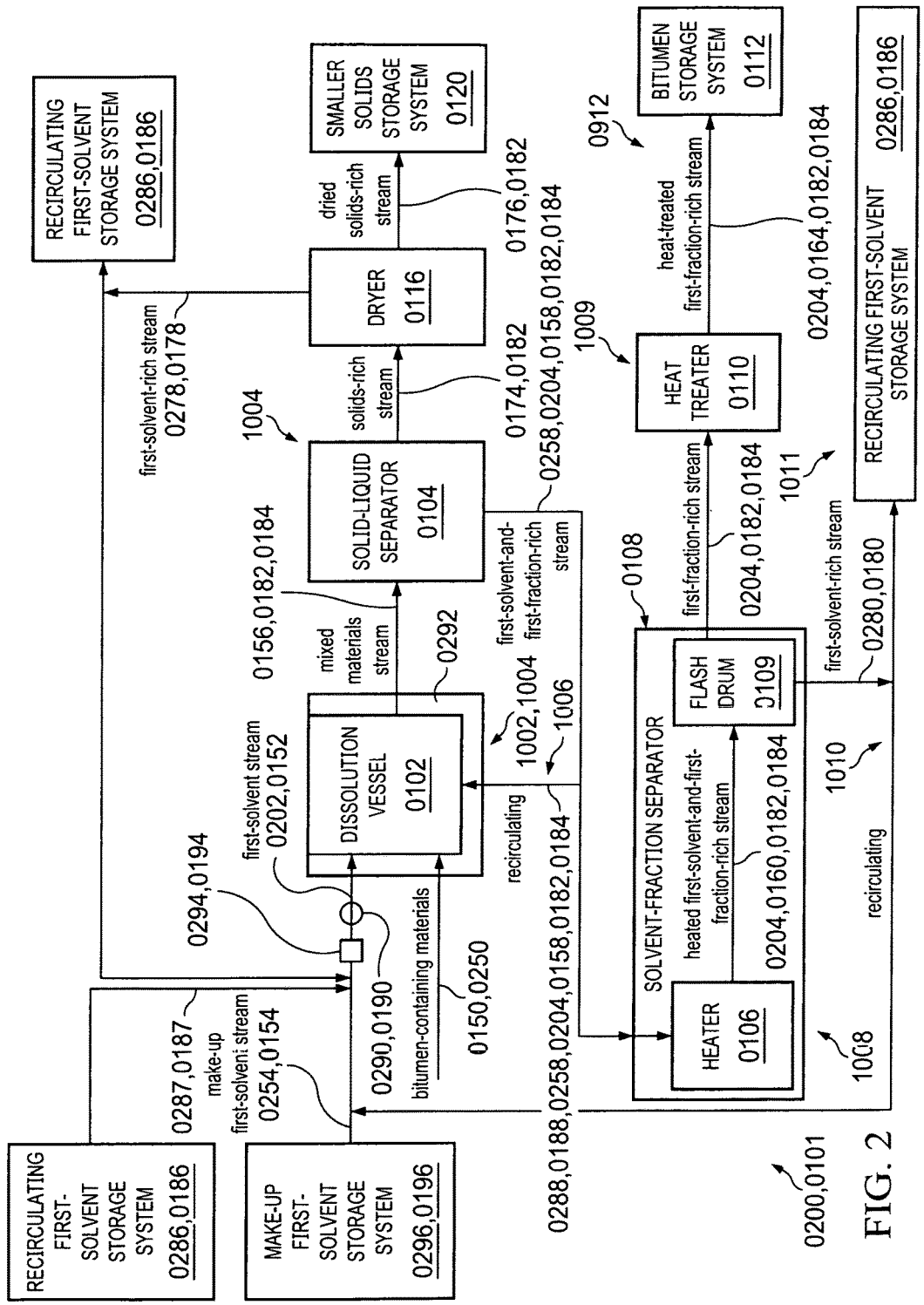
FIG. 2 is a schematic block flow diagram illustrating an embodiment of a system and method for contacting bitumen-containing materials with a first solvent, for example, an alkane, fatty acid, or combination thereof, and providing a bitumen-rich stream, and in particular, a first-fraction-rich stream, for example, a maltene-rich stream.
Figure 3:
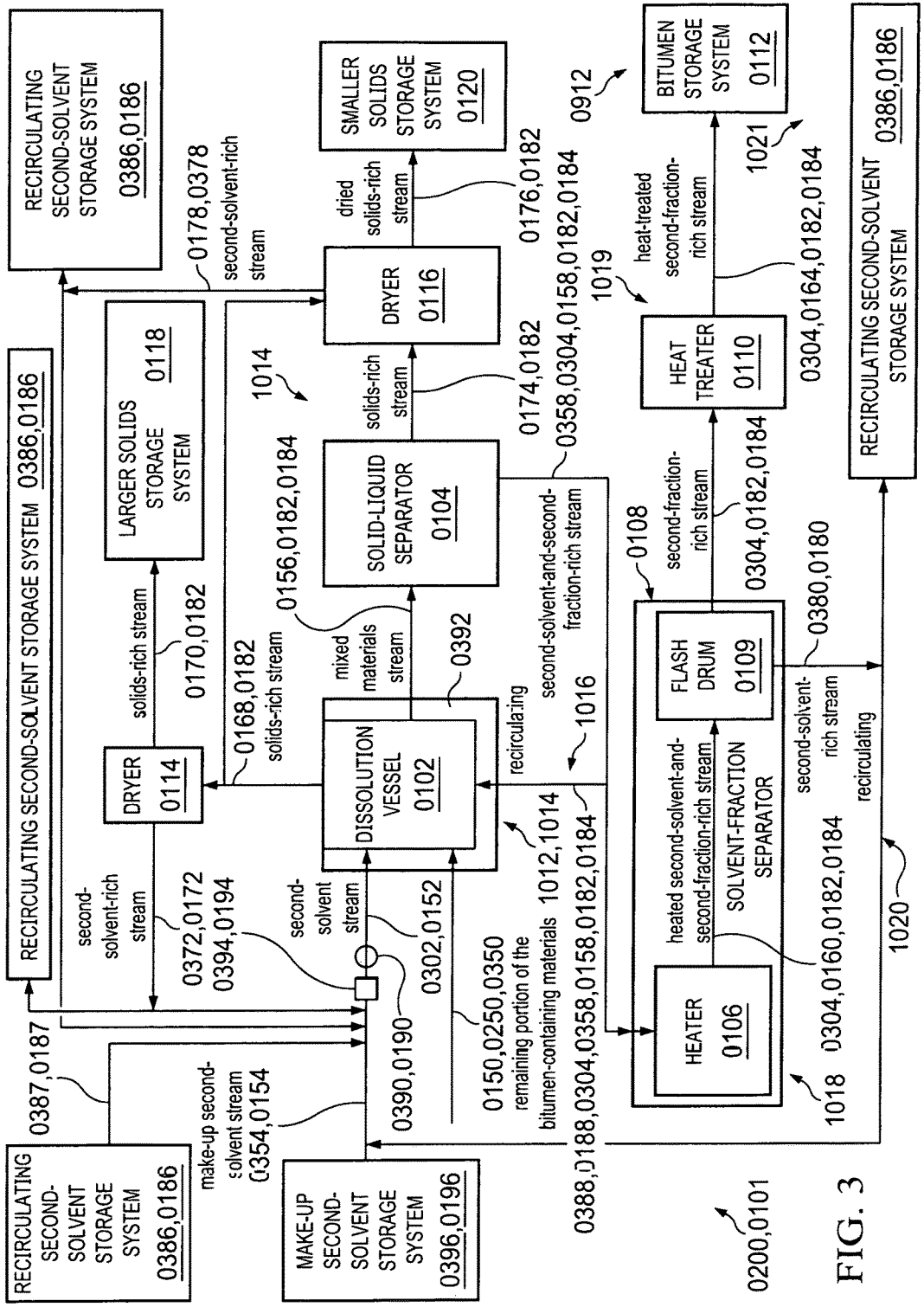
FIG. 3 is a schematic block flow diagram illustrating an embodiment of a system and method for introducing a second solvent, for example, an aromatic compound, a ketone, methyl ethyl ketone (MEK), methyl isobutyl ketone (MIBK) into contact with a portion of the bitumen-containing materials remaining in a dissolution vessel after contacting the bitumen-containing materials with a first solvent and provides a bitumen-rich stream, and in particular, a second-fraction-rich stream (e.g., an asphaltene-rich stream comprising asphaltenes).
Figure 11A:
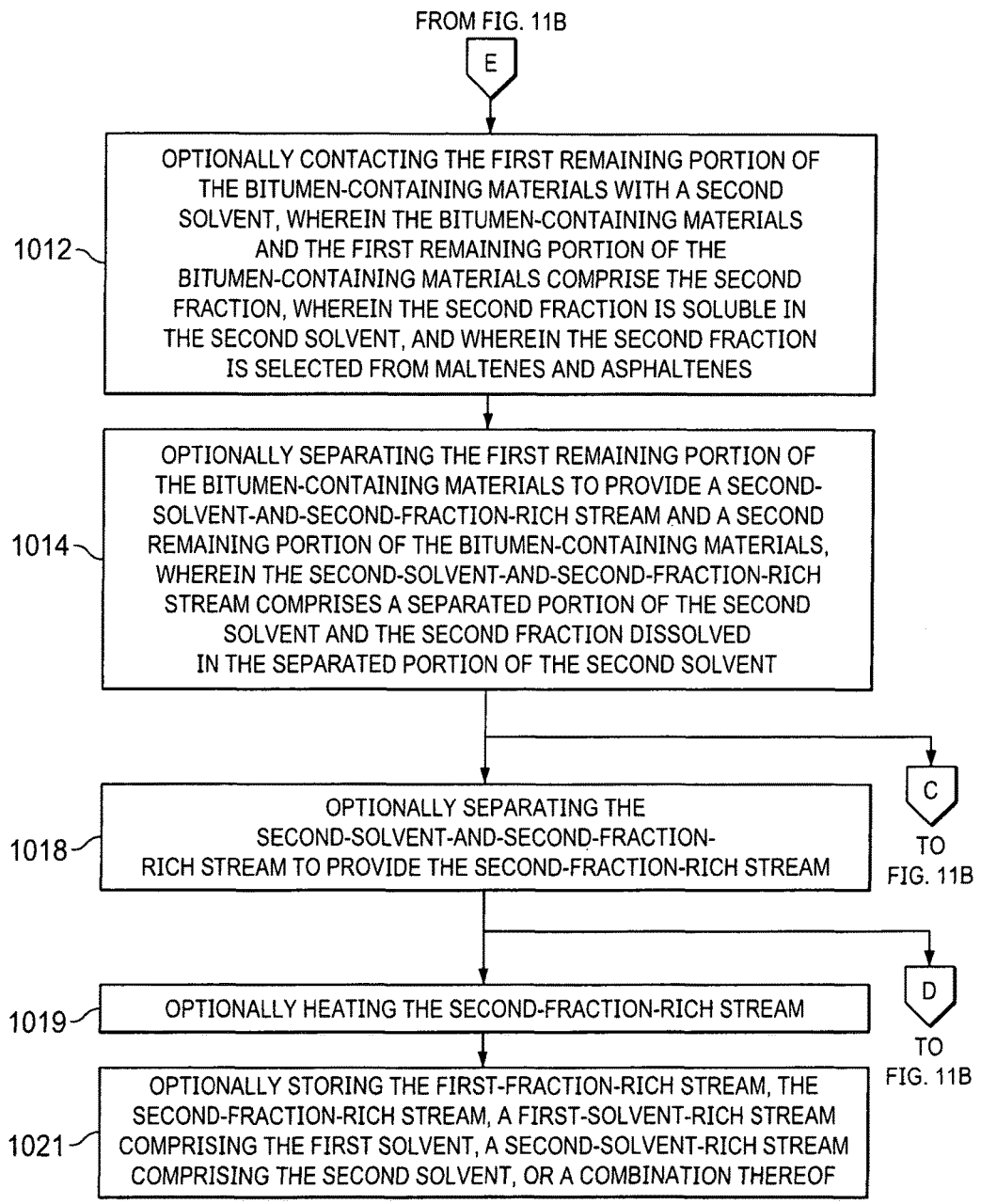

With reference to FIG. 11A, an optional sixth step comprises contacting 1012 the remaining portion 0250, 350 (e.g., the first remaining portion 0250) of the bitumen-containing materials 0150 with a second solvent (e.g., in the second-solvent stream 0302 illustrated in FIG. 3). The remaining portion 0250, 350 (e.g., the first remaining portion 0250) of the bitumen-containing materials 0150 comprises the second fraction, which is soluble in the second solvent. The second fraction can comprise asphaltenes, maltenes, and a combination thereof. The second fraction can comprise a relatively higher mass concentration of asphaltenes compared to the first fraction. The second fraction can also comprise more of the total mass of asphaltenes present in the bitumen-containing materials as compared to the first fraction. The second fraction can comprise a lower molecular weight fraction (e.g., maltenes), a shorter-carbon-chain-length fraction, a higher molecular weight fraction (e.g., asphaltenes), a longer-carbon-chain-length fraction, or a combination thereof. The second fraction can comprise a softer bitumen (e.g., higher penetration value bitumen, maltene), a harder bitumen (e.g., lower penetration value bitumen, asphaltenes), or a combination thereof. With reference to the drawings, although FIG. 3 shows the remaining portion 0250, 350 of the bitumen-containing materials 0150 as a feed stream to the dissolution vessel 0102, this is schematic and illustrative of the fact that the remaining portion 0250, 350 is the feed or starting material for the dissolution process that occurs in the dissolution vessel 0102 as illustrated in FIG. 3. Accordingly, in some embodiments the remaining portion 0250, 350 is the material remaining in the dissolution vessel after a previous dissolution process in the same dissolution vessel 0102, for example, as illustrated in FIG. 2. It is also possible, to remove the remaining portion 0250, 350 of the bitumen-containing materials from the dissolution vessel 0102 for processing outside the dissolution vessel 0102 and then add the remaining portion 0250, 350 back to the dissolution vessel 0102, which is also schematically illustrated by the remaining portion 0250, 350 of the bitumen-containing materials being fed to the dissolution vessel 0102 in FIG. 3. In some embodiments, while few or almost no asphaltenes (e.g., no more than 20, 15, 10, 9, 8, 7, 6 5, 4, 3, 2 or 1 wt. % and down to greater than 0 wt. % or down to 0 wt. % of the asphaltenes present in the bitumen-containing materials) are soluble in the first solvent, both asphaltenes and maltenes remaining in the bitumen-containing materials are soluble in the second solvent (e.g., at least 50, 60, 70, 80, 90, 91, 92, 93, 94, 95, 96, 97, 98, 99 and up to 100 wt. % of the asphaltenes are soluble in the second solvent and at least 1, 2, 3, 4, 5, 10, 15, 20, 30, 40, 50, 60, 70, 80, or 90 and up to 100 wt. % of the maltenes remaining in the bitumen-containing materials are soluble in the second solvent).

It is worthwhile to note that some existing classifications of bitumen as maltenes and asphaltenes are based on the boiling point of the bitumen, the carbon-chain length of the molecules in the bitumen, or a combination thereof. Definitions of maltenes and asphaltenes based on boiling point can be used in place of or in addition to definitions of maltenes, asphaltenes or both based on solubility in a solvent such as pentane, hexane, or heptane at specified conditions.

As a practical matter with respect to the present application, it is often useful to define maltenes as bitumen (e.g., in bitumen-containing materials) having a specified minimum degree of solubility (e.g., 0.1, 1, 10 or 100 grams) in 100 grams of a maltene solvent (e.g., n-hexane, or n-heptane) and define asphaltenes as the remaining bitumen (e.g., in the remaining bitumen-containing materials) that has a specified minimum degree of solubility (e.g., 0.1, 1, 10, or 100 g) in 100 grams of an asphaltene solvent (e.g., toluene, benzene or xylene). These solubility-based definitions of asphaltenes and maltenes are useful because many of the processes described herein involve dissolving bitumen from bitumen-containing material into a solvent. Accordingly, no matter what solvent is used, the materials that are extracted by a solvent can later be classified as a maltenes (e.g., maltenes soluble in n-hexane or maltenes soluble in n-heptane) or asphaltenes (e.g., asphaltenes soluble in toluene but not soluble in n-hexane or n-heptane as applicable).

As an illustration, classifying a bitumen into a maltene fraction, asphaltene fraction or both can be accomplished by taking a representative sample of the materials, determining how much of the materials is made up of maltenes and then, if applicable, determining how much of the remaining materials is made up of asphaltenes.

With reference again to FIG. 11A, an optional seventh step of a method 0200 for separating bitumen-containing materials 0150 comprises separating 1014 the remaining portion 0250, 350 (e.g., first remaining portion 0250) of the bitumen-containing materials 0150 to provide a second-solvent-and-second-fraction-rich stream 0358 comprising a separated portion of the second solvent and the second fraction dissolved in the separated portion of the second solvent.

An optional eighth step comprises separating 1018 the second-solvent-and-second-fraction-rich stream 0358 to provide the second-fraction-rich stream 0304.

Figures 18, 19:
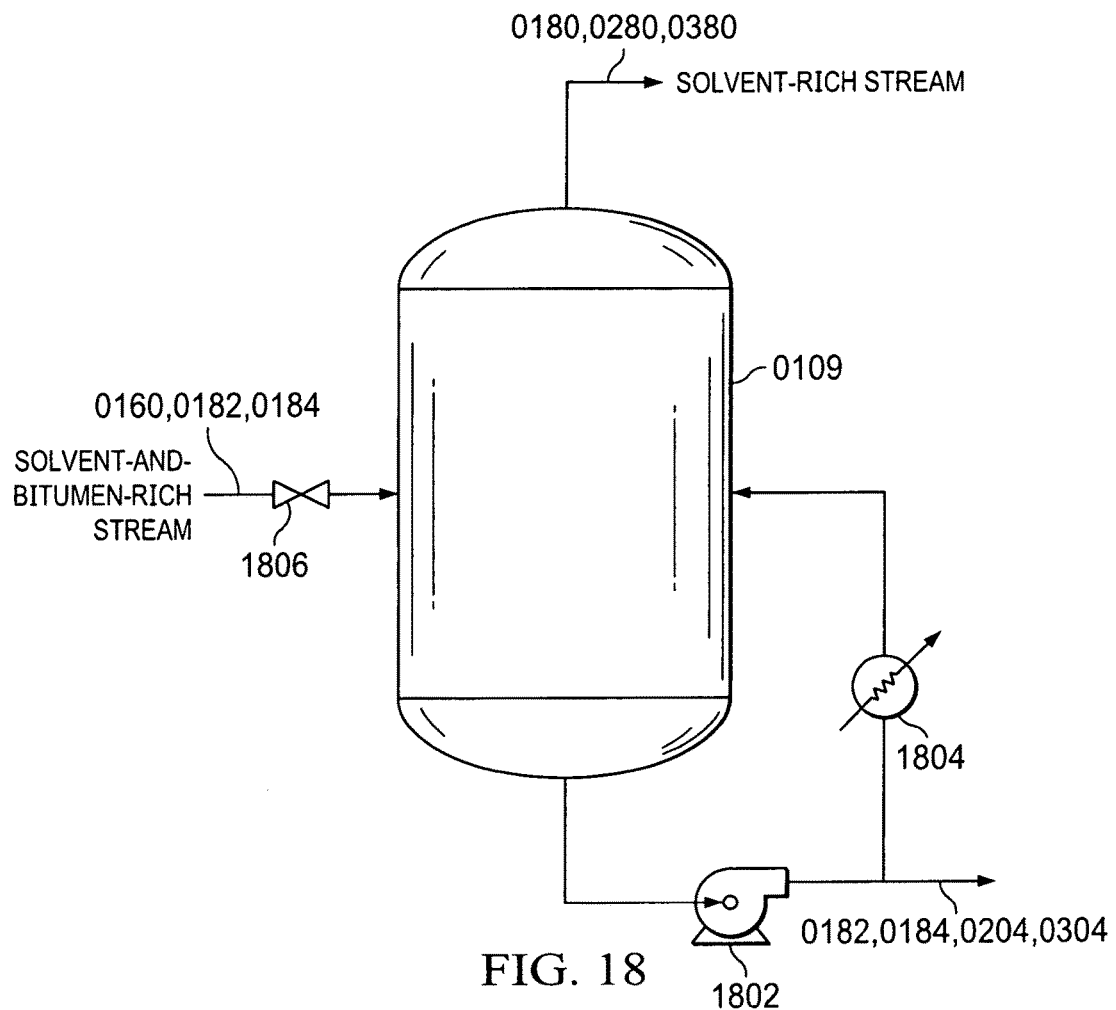
FIG. 18 is a schematic illustration of a flash drum with a flash valve located adjacent to an inlet to the flash drum, a bottom pump to convey liquid from the flash drum, and a recirculation heater to heat some of the liquid discharged from the bottom pump before it is reintroduced into the flash drum.
FIG. 19 is a schematic illustration of a block flow diagram illustrating the blending of a first-component-rich stream and a second-component rich stream to provide a stream comprising a desired bitumen blend.

With reference to FIG. 19, some embodiments can comprise blending 1900 the first-fraction-rich stream 0204 with the second-fraction-rich stream 0304 to provide a bitumen blend 1902.

In some embodiments, the method 0200 can involve recirculating solvent. As a first recirculation option, some embodiments comprise repeating or continuing 1006 the step of contacting 1002 the bitumen-containing materials with a first solvent and repeating or continuing 1006 the step of separating 1004 the bitumen-containing materials to provide a first-solvent-and-first-fraction-rich stream 0258 and remaining portion 0250, 350 (e.g., first remaining portion 0250) of the bitumen-containing materials 0150. As is evident, the repeating or continuing 1006 step can refer, for example, to a batch process in which the first solvent contacts the bitumen-containing materials, the first solvent and the bitumen-containing materials separate to at least some extent, and then the first solvent and the bitumen-containing materials are again brought into contact. Additionally, the repeating or continuing 1006 step can comprise a continuous recirculation of the first solvent which can be carrying significant amounts of bitumen or almost no bitumen depending, for example, on how long the first solvent has spent in contact with the bitumen-containing materials. When the recirculation option (e.g., the recirculating first-solvent-and-first-fraction-rich stream 0288) is pursued, the remaining portion 0250, 350 (e.g., the first remaining portion 0250 of the bitumen-containing materials) can remain in the dissolution vessel 0102 (e.g., in the cage 0414). Furthermore, when the recirculation option is pursued, during the repeated steps 1002, 1004, the remaining portion 0250, 350 (e.g., the first remaining portion 0250) of bitumen-containing materials from a prior step in the method can provide the bitumen-containing materials 0150 used in the repeated steps 1002, 1004. Additionally, when the recirculation option is pursued, the first-solvent-and-first-fraction-rich stream 0258 from a prior step in the method can provide at least a portion of the first solvent (e.g., in the first solvent stream 0202 illustrated in FIG. 2) used for the step of contacting 1002 the bitumen-containing materials 0150 with the first solvent. The optional step of recirculating the first-solvent-and-first-fraction-rich stream 0258 from the solid-liquid separator 0104 to the dissolution vessel 0102, thereby providing a recirculating first-solvent-and-first-fraction-rich stream 0288, is illustrated in FIG. 2. In some embodiments, the optional step of recirculating continues until a desired amount of the first fraction in the bitumen-containing materials 0150 has been dissolved into the first-solvent-and-first-fraction-rich stream 0258. Then, the step of separating 1008 the solvent-and-bitumen-rich stream 0158 to provide a first-fraction-rich stream 0204 can be performed.

As a second recirculation option, some embodiments comprise repeating or continuing 1010 the step of contacting 1002 the bitumen-containing materials 0150 with a first solvent, repeating or continuing 1010 the step of separating 1004 the bitumen-containing materials 0150 to provide a first-solvent-and-first-fraction-rich stream 0258, and repeating or continuing 1010 the step of separating 1008 the first-solvent-and-first-fraction-rich stream 0258. As is evident, the repeating or continuing 1010 step can refer, for example, to a batch process in which the first solvent contacts the bitumen-containing materials, the first solvent and the bitumen-containing materials separate to at least some extent, and then the first solvent and the bitumen-containing materials are again brought into contact. Additionally, the repeating or continuing 1010 step can comprise a continuous recirculation of the first solvent which can be carrying significant amounts of bitumen or almost no bitumen depending, for example, on how long the first solvent has spent in contact with the bitumen-containing materials and the amount of bitumen removed from the first solvent as part of the recirculation option. When the recirculation option is pursued (e.g., when the first-solvent-rich stream 0280 is recirculated to provide at least a portion of the first-solvent stream 0202 as illustrated in FIG. 2), the remaining portion (e.g., the first remaining portion of the bitumen-containing materials 0150) can remain in the dissolution vessel 0102 (e.g., in the cage 0414). Also, in conjunction with the repeated steps 1002, 1004, the step of separating 1008 the first-solvent-and-first-fraction-rich stream 0258 comprises providing a first-solvent-rich stream 0280 in addition to providing a first-fraction-rich stream 0204. Furthermore, when the recirculation option is pursued, during the repeated steps 1002, 1004, the remaining portion (e.g., the first remaining portion) of the bitumen-containing materials from a prior step in the method can provide the bitumen-containing materials 0150 used in the repeated steps 1002, 1004. Additionally, when the recirculation option is pursued, the first-solvent-rich stream 0280 from a prior step in the method can provide at least a portion of the first solvent (e.g., in the first solvent stream 0202 illustrated in FIG. 2) used for the step of contacting 1002 the bitumen-containing materials 0150 with a first solvent. The optional step of recirculating the first-solvent-rich stream 0280 from the solid-liquid separator 0104 to the dissolution vessel 0102, thereby providing a recirculating first-solvent-rich stream 0280, is illustrated in FIG. 2. In some embodiments, the optional step of recirculating continues until a desired amount of the first fraction in the bitumen-containing materials has been dissolved into the first-solvent-and-first-fraction-rich stream 0258.

With reference to FIG. 11B, as a third recirculation option, some embodiments comprise repeating or continuing 1016 the step of contacting 1012 the remaining portion 0250, 350 (e.g., the first remaining portion 0250) of the bitumen-containing materials 0150 with a second solvent and repeating or continuing 1016 the step of separating 1014 the remaining portion 0250, 350 (e.g., first remaining portion 0250) of the bitumen-containing materials to provide a second-solvent-and-second-fraction-rich stream 0358 and second remaining portion 0350 of the bitumen-containing materials. As is evident, the repeating or continuing 1016 step can refer, for example, to a batch process in which the second solvent contacts the bitumen-containing materials, the second solvent and the bitumen-containing materials separate to at least some extent, and then the second solvent and the bitumen-containing materials are again brought into contact. Additionally, the repeating or continuing 1016 step can comprise a continuous recirculation of the second solvent which can be carrying significant amounts of bitumen or almost no bitumen depending, for example, on how long the second solvent has spent in contact with the bitumen-containing materials. When this recirculation option (e.g., the recirculating second-solvent-and-second-fraction-rich stream 0388) is pursued, the second remaining portion 0350 of the bitumen-containing materials can remain in the dissolution vessel 0102 (e.g., in the cage 0414). Furthermore, when the recirculation option is pursued, during the repeated steps 1012, 1014, the second remaining portion 0350 of bitumen-containing materials from a prior step in the method can provide the remaining portion 0250, 350 (e.g., the first remaining portion 0250) of the bitumen-containing materials 0150 used in the repeated steps 1012, 1014.

Additionally, when the recirculation option is pursued, the second-solvent-and-second-fraction-rich stream 0358 from a prior step in the method can provide at least a portion of the second solvent (e.g., in the second solvent stream 0302 illustrated in FIG. 3) used for the step of contacting 1012 the remaining portion 0250, 350 (e.g., the first remaining portion) of the bitumen-containing materials 0150 with the second solvent. The optional step of recirculating the second-solvent-and-second-fraction-rich stream 0358 from the solid-liquid separator 0104 to the dissolution vessel 0102, thereby providing a recirculating second-solvent-and-second-fraction-rich stream 0388, is illustrated in FIG. 3. In some embodiments, the optional step of recirculating continues until a desired amount of the second fraction in the remaining portion 0250, 350 (e.g., first remaining portion 0250) of bitumen-containing materials 0150 has been dissolved into the second-solvent-and-second-fraction-rich stream 0358. Then, the step of separating 1018 the second-solvent-and-second-fraction-rich stream 0358 to provide a second-fraction-rich stream 0304 can be performed.

With reference to FIG. 11B, as a fourth recirculation option, some embodiments comprise repeating or continuing 1020 the step of contacting 1012 the remaining portion 0250, 350 (e.g., the first remaining portion 0250) of the bitumen-containing materials 0150 with a second solvent, repeating or continuing 1020 the step of separating 1014 the remaining portion 0250, 350 (e.g., the first remaining portion 0250) of the bitumen-containing materials 0150 to provide a second-solvent-and-second-fraction-rich stream 0358 and a second remaining portion 0350 of the bitumen-containing materials, and repeating or continuing 1020 the step of separating 1018 the second-solvent-and-second-fraction-rich stream 0358. As is evident, the repeating or continuing 1020 step can refer, for example, to a batch process in which the second solvent contacts the bitumen-containing materials, the second solvent and the bitumen-containing materials separate to at least some extent, and then the second solvent and the bitumen-containing materials are again brought into contact. Additionally, the repeating or continuing 1020 step can comprise a continuous recirculation of the second solvent which can be carrying significant amounts of bitumen or almost no bitumen depending, for example, on how long the second solvent has spent in contact with the bitumen-containing materials and the amount of bitumen removed from the second solvent as part of the recirculation option. When this recirculation option is pursued (e.g., when the second-solvent-rich stream 0380 is recirculated to provide at least a portion of the second-solvent stream 0302 as illustrated in FIG. 3), the second remaining portion 0350 of the bitumen-containing materials 0150 can remain in the dissolution vessel 0102 (e.g., in the cage 0414). Also, in conjunction with the repeated steps 1012, 1014, the step of separating 1018 the second-solvent-and-second-fraction-rich stream 0358 comprises providing a second-solvent-rich stream 0380 in addition to providing a second-fraction-rich stream 0304. Furthermore, when the recirculation option is pursued, during the repeated steps 1012, 1014, the second remaining portion 0350 of the bitumen-containing materials 0150 from a prior step in the method can provide the remaining portion 0250, 350 (e.g., the first remaining portion 0250) of the bitumen-containing materials 0150 used in the repeated steps 1012, 1014. Additionally, when the recirculation option is pursued, the second-solvent-rich stream 0380 from a prior step in the method can provide at least a portion of the second solvent (e.g., in the second solvent stream 0302 illustrated in FIG. 3) used for the step of contacting 1012 the remaining portion 0250, 350 (e.g., the first remaining portion 0250) of the bitumen-containing materials 0150 with a second solvent. The optional step of recirculating the second-solvent-rich stream 0380 from the solid-liquid separator 0104 to the dissolution vessel 0102, thereby providing a recirculating second-solvent-rich stream 0380, is illustrated in FIG. 3. In some embodiments, the optional step of recirculating continues until a desired amount of the second fraction in the remaining portion 0250, 350 (e.g., the first remaining portion 0250) of the bitumen-containing materials has been dissolved into the second-solvent-and-second-fraction-rich stream 0358.

In addition to using a second solvent, additional embodiments of methods and processes described herein can use a plurality of solvents (e.g., a first, a second, a third, a fourth, a fifth solvent, etc.). For example, each solvent can be used to extract a selected fraction or fractions (e.g., a first fraction, a second fraction, a third fraction, a fourth fraction, a fifth fraction, etc.) from the bitumen-containing materials while avoiding other fractions. Accordingly, the method can provide a plurality of product streams (e.g., a first-fraction-rich stream, a second-fraction-rich stream, a third-fraction-rich stream, a fourth-fraction-rich stream, a fifth-fraction-rich stream, etc.), each with a different mass concentration of one or more specified bitumen fractions or components. For example, the mass concentration of a fraction that is present or omitted from each product stream can differ from the mass concentration of the fraction in each other product stream by at least 1, 2, 3, 4, 5, 6, 7, 8, 9, 10, 15, 20, 30, 40, 50, 60, 70, 80 or 90% as measured relative to the mass concentration of the fraction in the product stream having the greatest mass concentration of the fraction.

As a further example of a process described herein, at least one solvent can simply be placed in contact with bitumen-containing materials in a dissolution vessel 0102, with or without a cage 0414 to cause tumbling of the bitumen-containing materials. Such a process could be a batch process and a dynamic (i.e., non-steady state) process.

Figure 21:
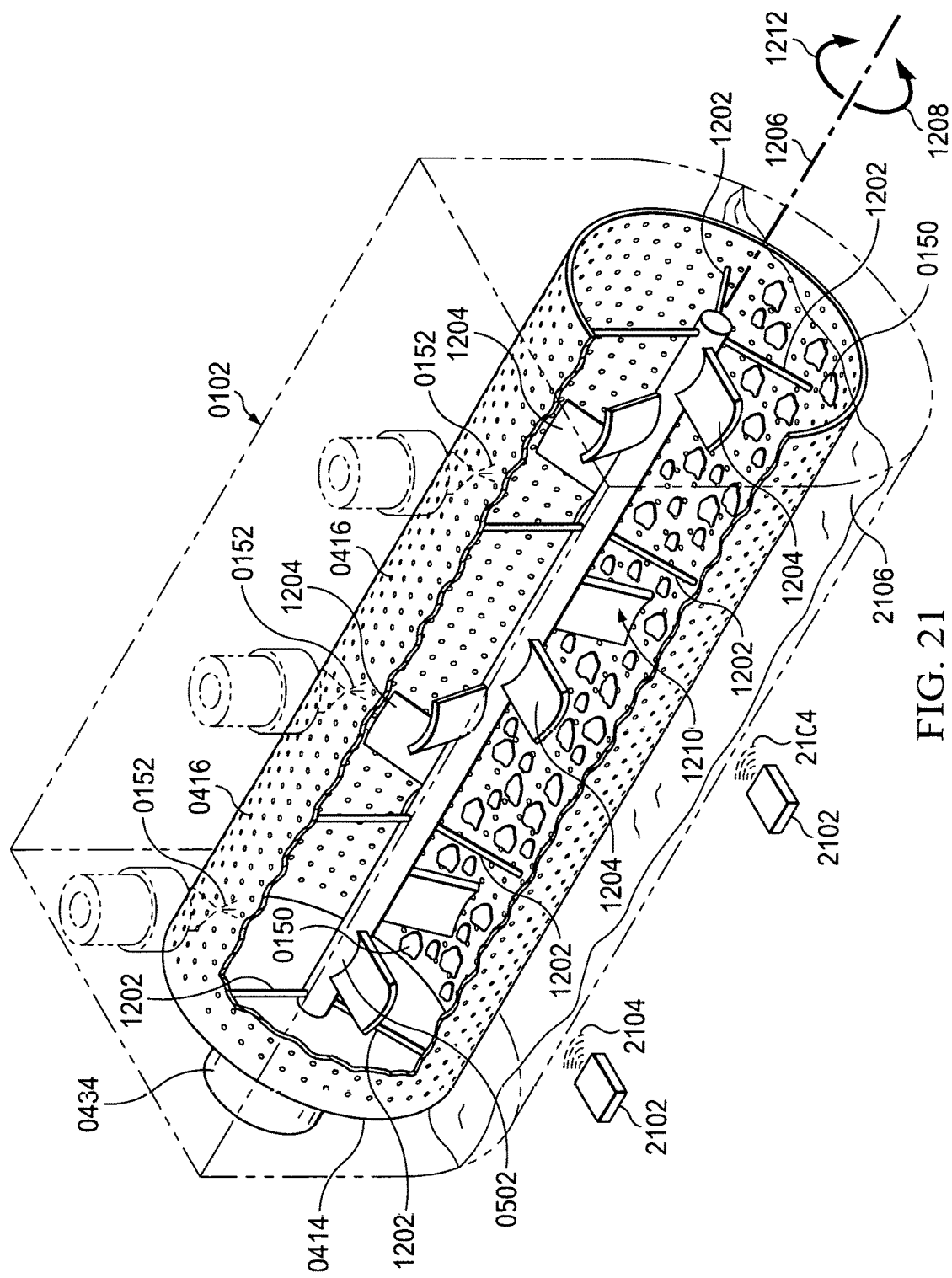
FIG. 21 is a schematic illustration of a system, including the cage of the system illustrated in FIG. 12 and ultrasonic wave generators.

With reference to FIG. 21, as another example of a process described herein, dissolution can occur while ultrasonic waves 2104 impact the bitumen-containing materials 0150. For example, the ultrasonic waves 2104 can propagate through a fluid (e.g., the atmosphere inside the dissolution vessel 0102, through liquid 2106 (e.g., solvent from the at least one solvent stream 0152, the at least one solvent, first solvent, second solvent, plurality of solvents, or a combination thereof) in the dissolution vessel 0102, or some combination thereof to impact the bitumen-containing materials 0150. In some embodiments, the ultrasonic waves 2104 can be provided with a frequency of more than 20,000 Hz and up to 20 MHz, more than 100 kHz and up to 20 MHz, or 1 to 20 MHz. As illustrated in FIG. 21, an ultrasonic wave generator 2102 or a plurality of ultrasonic wave generators 2102 can be used to provide the ultrasonic waves 2104.

As another example of a process described herein, bitumen-containing materials 0150 can be placed in a cage in a dissolution vessel 0102 and contacted with solvent. The solvent, any bitumen in the solvent, and any solids small enough to fall through apertures in the cage can be collected as a mixed-materials stream 0156 and fed to a solid-liquid separator, which provides a solvent-and-bitumen-rich stream 0158. This solvent-and-bitumen-rich stream 0158, can be continuously or intermittently recirculated to contact the bitumen-containing materials 0150 as a recirculating solvent-and-bitumen-rich stream 0188. This process can continue as a dynamic batch process until a desired amount of the bitumen in the bitumen-containing materials 0150 has been dissolved in the solvent-and-bitumen rich stream 0158. Then the solvent-and-bitumen-rich stream 0158 can be fed to a solvent-fraction separator 0108, which provides a bitumen-rich stream 0182 (which can also be a product stream) and a solvent-rich stream 0180. The at least one solvent-fraction separator 0108 (e.g. a solvent-fraction separator, one and only one solvent-fraction separator, or a plurality of solvent-fraction separators) can be run as a continuous process and/or an approximately steady-state process. For example, while a batch of the solvent-and-bitumen-rich stream 0158 is separated or if multiple batches are continuously fed to the at least one solvent-fraction separator, the at least one solvent-fraction separator could run as a continuous (e.g., as opposed to batch) and approximately steady-state process (e.g., as opposed to a dynamic process).

As a variation of the option described above, rather than recirculating the solvent-and-bitumen-rich stream 0158 to contact the bitumen-containing materials 0150, the solvent-and-bitumen-rich stream 0158 can be fed to the at least one solvent-fraction separator 0108, which provides a bitumen-rich stream 0182 and a solvent-rich stream 0180. Furthermore, the solvent-rich stream 0180 can be recirculated to contact the bitumen-containing materials 0150. This would provide a dynamic batch process because the concentration of bitumen in the solvent-and-bitumen-rich stream 0158 can decrease as the bitumen in the bitumen-containing materials 0150 is almost completely extracted. This option can be useful because purer solvent can have a greater carrying capacity for bitumen and contacting the bitumen-containing materials 0150 with purer solvent can result in a faster dissolution process compared to contacting the bitumen-containing materials 0150 with a solvent-and-bitumen-rich stream 0158.

As a further example of a process described herein, bitumen-containing materials 0150 comprising a desired first fraction (e.g., maltenes) can be placed in a cage in a dissolution vessel 0102 and contacted with a first solvent (e.g. comprising an alkane, n-alkane, pentane, hexane, heptane, n-pentane, n-hexane, n-heptane, acid, carboxylic acid, fatty acid, acetic acid, or a combination thereof) in which the first fraction is soluble. The first solvent and any solids small enough to fall through apertures in the cage can be collected as a mixed materials stream 0156 and fed to a solid-liquid separator, which provides a solvent-and-bitumen-rich stream 0158. This solvent-and-bitumen-rich stream 0158, can be continuously or intermittently recirculated to contact the bitumen-containing materials 0150 as a recirculating solvent-and-bitumen-rich stream 0188. This dynamic batch process can continue until a desired amount of the first fraction in the bitumen-containing materials 0150 has been dissolved in the solvent-and-bitumen rich stream 0158. Then the solvent-and-bitumen-rich stream 0158 can be fed to a solvent-fraction separator 0108, which provides a first-fraction-rich stream 0204 and a solvent-rich stream 0180. The at least one solvent-fraction separator could be run as a continuous process and/or steady-state process while a batch of the solvent-and-bitumen-rich stream 0158 is separated or if multiple batches are continuously fed to the at least one solvent-fraction separator.

As another option, rather than recirculating the solvent-and-bitumen-rich stream 0158 to contact the bitumen-containing materials 0150, the solvent-and-bitumen-rich stream 0158 can be fed to the at least one solvent-fraction separator 0108, which provides a first-fraction-rich stream 0204 and a solvent-rich stream 0180. Furthermore, the solvent-rich stream 0180 can be recirculated to contact the bitumen-containing materials 0150. This would provide a batch and dynamic process.

As an additional example, after separating the first fraction (e.g., maltenes) and the first solvent (e.g., alkane, n-alkane, pentane, hexane, heptane, n-pentane, n-hexane, n-heptane, acid, carboxylic acid, fatty acid, acetic acid, or a combination thereof) from a remainder of the bitumen-containing materials 0150, a second solvent (e.g., benzene, toluene, ortho-xylene, meta-xylene, para-xylene, ketone, methyl ethyl ketone (MEK), methyl isobutyl ketone (MIBK), or a combination thereof) can be added to the remainder of the bitumen-containing materials (e.g., in the dissolution vessel, in the cage, with tumbling, without tumbling, or a combination thereof) to extract a second fraction (e.g., asphaltenes). In some embodiments, the second fraction, the first solvent, and the first fraction are all soluble in the second solvent or can all be removed with the second solvent, even if the fractions are not all soluble in the second solvent. Accordingly, the second solvent can be used to recover any remaining first solvent in the dissolution vessel and to extract both the second fraction and any of the first fraction that is remaining in the bitumen-containing materials. As can be seen from the present specification, the methods 0100 herein for separating bitumen-containing materials 0150 to provide at least one product stream 0182 are varied and versatile.

Figure 4:
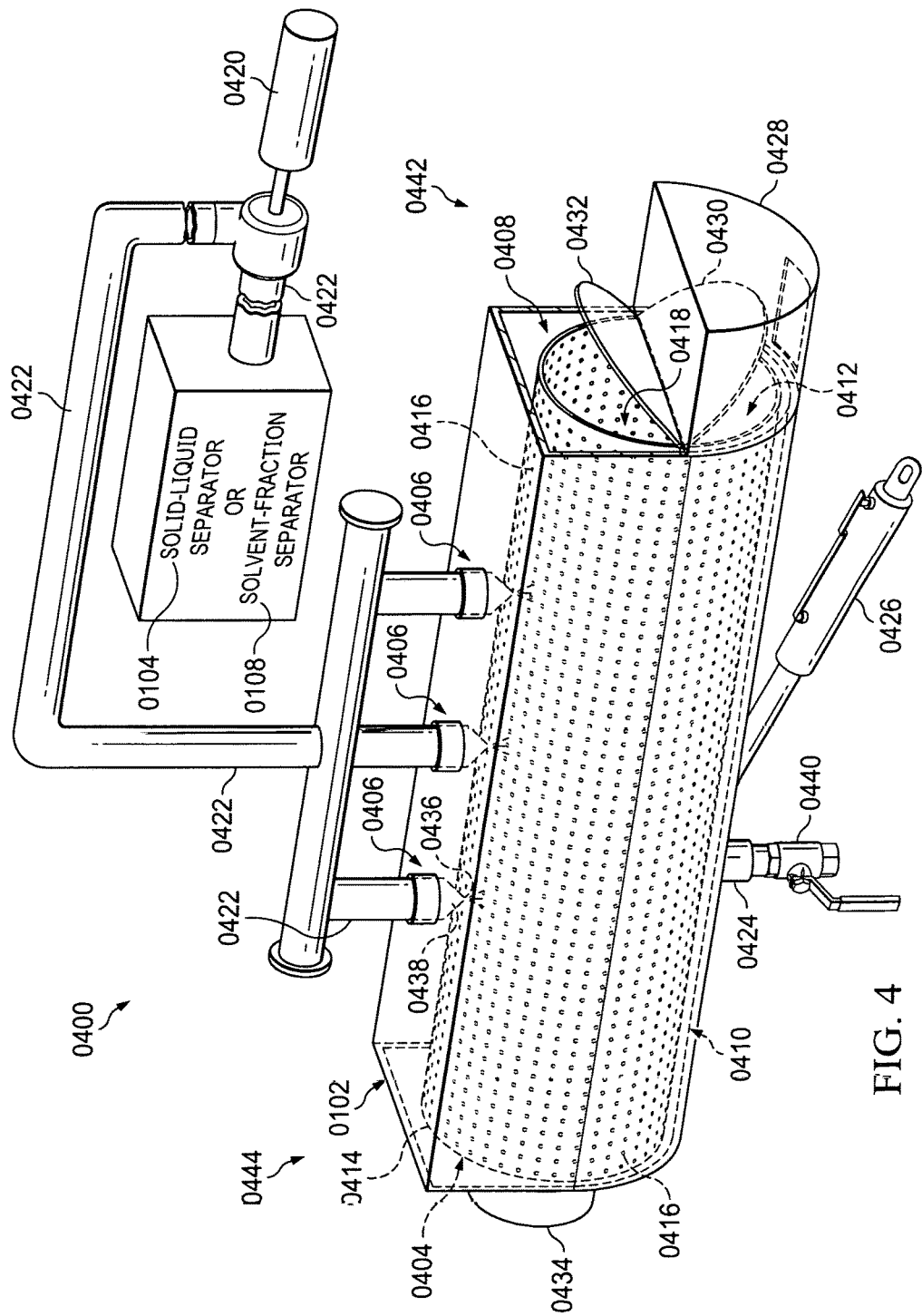
FIG. 4 is a schematic illustration of an embodiment of an apparatus illustrating a cage that can rotate inside a dissolution vessel to facilitate contacting bitumen-containing materials with at least one solvent.

An embodiment of an apparatus, which can be used with or separately from methods described herein, will now be described with reference to FIG. 4. FIG. 4 illustrates an apparatus 0400 to facilitate dissolution of at least one fraction into at least one solvent (e.g., for agitating bitumen-containing materials 0150). An example of facilitating dissolution is increasing the rate of dissolution. As illustrated, the apparatus 0400 comprises a dissolution vessel 0102, a tumbler 0404 and at least one solvent distributor 0406. The dissolution vessel 0102 is be configured to contain the bitumen-containing materials 0150 and the at least one solvent. The tumbler 0404 is configured to agitate the bitumen-containing materials 0150 and facilitate wetting the bitumen-containing materials 0150 with the at least one solvent, and the at least one solvent distributor 0406 is configured to discharge the at least one solvent into the dissolution vessel 0102.

The dissolution vessel 0102 comprises a feed inlet 0408, a catch basin 0410, and at least one discharge outlet 0412, 0424. The feed inlet 0408 of the dissolution vessel 0102 is configured to facilitate feeding the bitumen-containing materials 0150 into the dissolution vessel 0102.

The tumbler 0404 comprises a cage 0414 and a containment space 0418. The cage 0414 of the tumbler 0404 is configured to receive the bitumen-containing materials 0150 comprising larger solid objects and smaller solid objects. The cage 0414 is configured to partially contain the bitumen-containing materials 0150 and to rotate within the dissolution vessel 0102. The cage 0414 comprises cage apertures 0416 configured to retain the larger solid objects that cannot pass through the cage apertures 0416 while allowing liquid and the smaller solid objects to pass through the cage apertures 0416.

The containment space 0418 of the tumbler 0404 is bounded by the cage 0414 and configured to permit the bitumen-containing materials 0150 to tumble within the cage 0414.

The catch basin 0410 of the dissolution vessel 0102 is configured to receive catch basin contents comprising the at least one solvent, the at least one fraction and the smaller solid objects in the bitumen containing materials. Additionally, the catch basin 0410 can be configured to discharge the catch basin contents through the at least one discharge outlet 0412, 0424 (e.g., the at least one mixed-materials discharge outlet 0424, the solids discharge outlet 0412, or a combination thereof), thereby providing a mixed-materials stream 0156. As an illustration, in some embodiments the at least one solvent, the at least one fraction and the smaller objects in the bitumen containing materials can be discharged through the at least one mixed-materials discharge outlet 0424. As a further illustration, in some embodiments the at least one solvent, the at least one fraction and the smaller objects in the bitumen containing materials can be discharged through the solids discharge outlet 0412 of the dissolution vessel, which can occur before, while, or after solids in the dissolution vessel 0102 (e.g., larger solids contained in the cage 0414) are discharged through the solids discharge outlet 0412. For example, this can occur if the entire contents (e.g., bitumen, solvents, solids, etc.) of the dissolution vessel 0102 were discharged through the solids discharge outlet 0412, which can occur as part of a batch process in which the bitumen is dissolved in solvent inside the dissolution vessel 0102. This might be more likely to occur if the resulting product will not be further separated because, for example, the end customer is desirous of purchasing a mixed product without further separation.

In some embodiments, the tumbler 0404 comprises a rotation actuator 0434 to rotate the cage 0414 relative to the dissolution vessel 0102.

Figure 5:
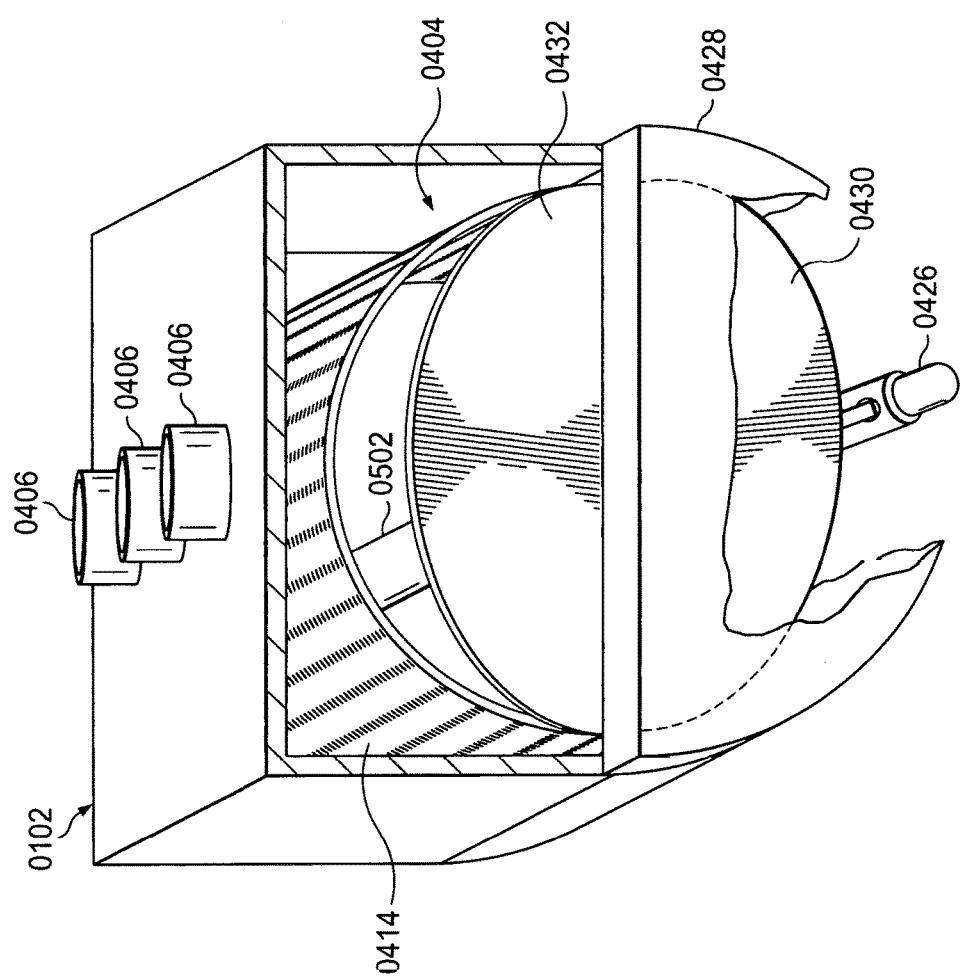
FIG. 5 is a schematic illustration of a cut-away perspective view of the embodiment illustrated in FIG. 4.
Figure 20:
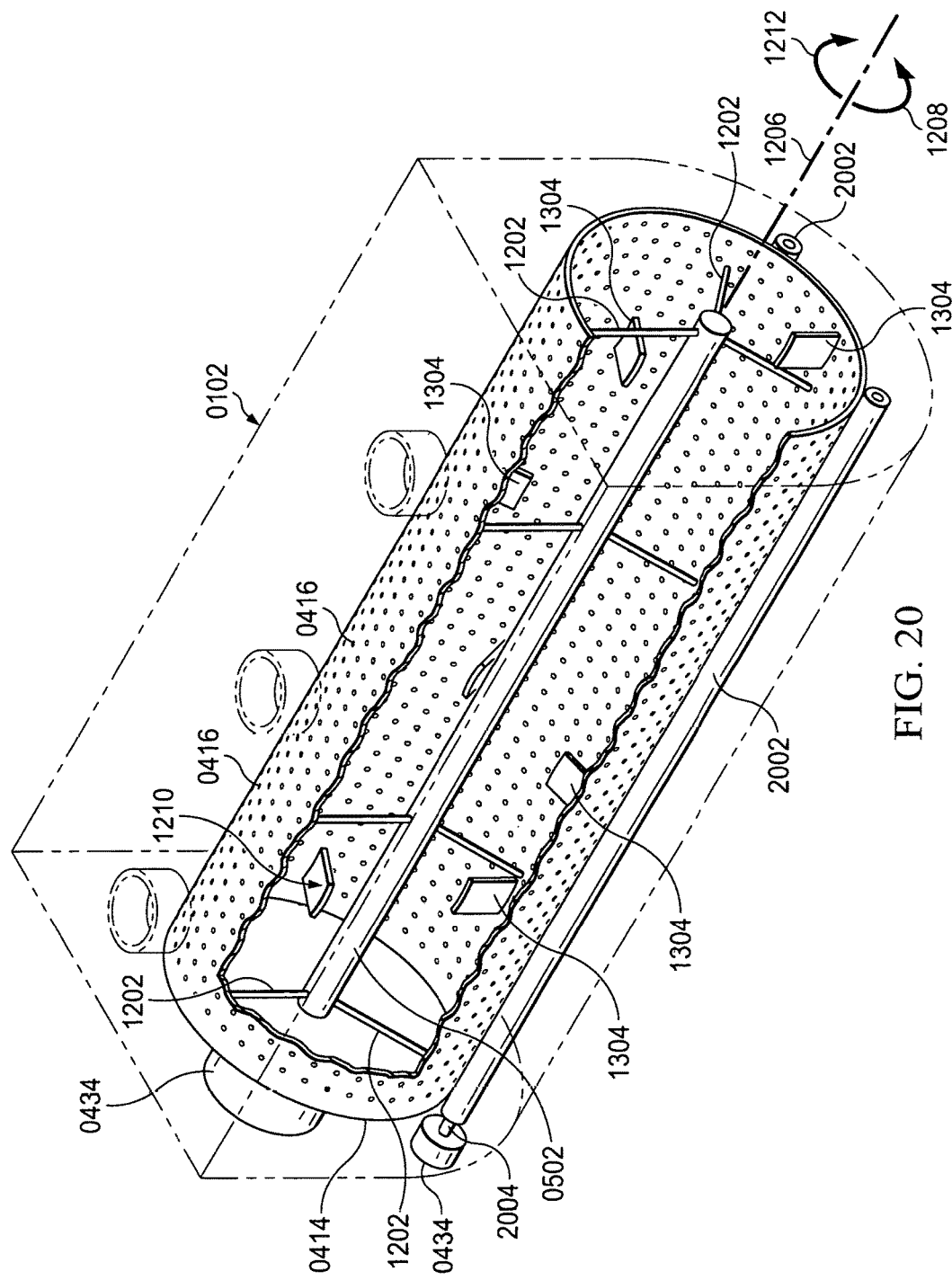
FIG. 20 is a schematic illustration of a system including the cage of FIG. 13, rollers to support the cage and an optional rotation actuator configured to rotate one or more of the rollers.

As illustrated in FIG. 5, in some embodiments, the tumbler 0404 comprises a shaft 0502 configured to provide an axis 1206 of rotation for the cage 0414. In some embodiments, the cage 0414 can be supported from above or below the cage (e.g., via an anchor point above the cage, supported by resting against a surface below the cage, etc.) or a combination thereof. For example, with reference to FIG. 20, in addition to or in place of the cage being supported by a shaft 0502, at least one roller 2002 (a roller, a plurality of rollers) could be placed in contact with the cage (e.g., parallel to an axis of rotation of the cage, contacting a bottom exterior surface of the cage, or a combination thereof) to support the cage. The at least one roller can be directly or indirectly driven. For example, the at least one roller can be powered or passive. In some embodiments, one or more of the at least one roller can be caused to rotate by the rotation actuator 0434 for the shaft 0502, or a rotation actuator 0434 for one or more of the rollers. For example, as a result of the rotation actuator 0434 rotating the cage 0414, which contacts the at least one roller and causes the at least one roller to rotate. As another example, a rotation actuator 0434 can cause a drive shaft 2004 of one or more rollers of the at least one roller, thereby causing the one or more rollers to rotate. Furthermore, any other known mechanism of supporting the cage and/or for rotating the cage 0414 can also be used, for example, using an electric force, magnetic force, at least partially floating the cage in a fluid, sliding the cage against a supporting surface configured to cradle the cage, etc.

With reference again to FIG. 5, in some embodiments, the tumbler 0404 can comprise a rotation actuator 0434 to rotate the shaft 0502 and thereby rotate the cage 0414, and the shaft 0502 can be configured to support the cage 0414 as the cage rotates.

In some embodiments, the shaft 0502 can be rotated by a rotation actuator 0434 and the cage 0414 can be fixed to the shaft 0502.

Figure 12:
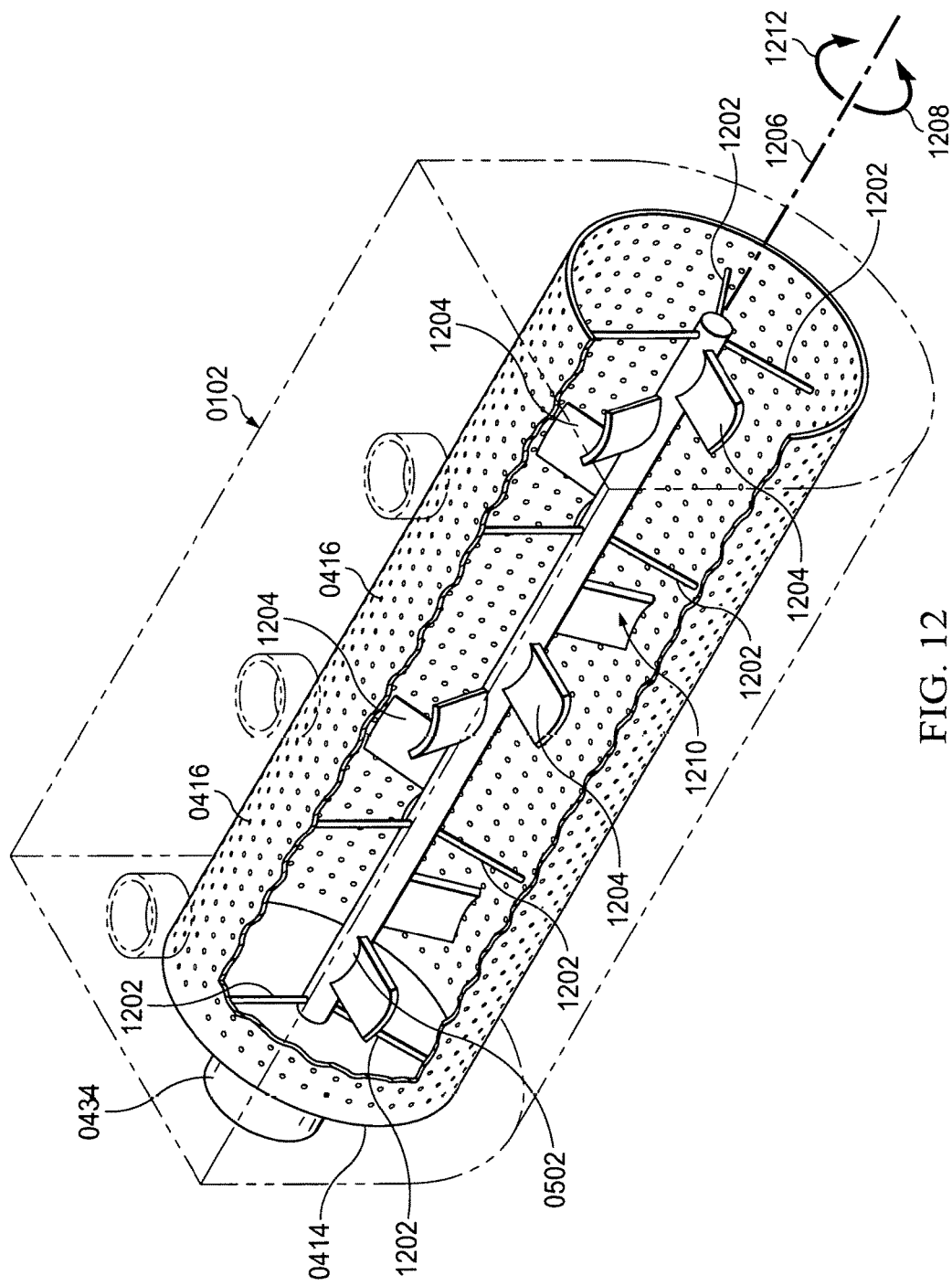
FIG. 12 is a schematic illustration of paddles fixed to a shaft so that as the shaft and the paddles rotate, the paddles facilitate the agitation of the bitumen-containing materials inside the cage, the charging of bitumen-containing materials into the cage or the discharging of materials from the cage.
Figure 13:
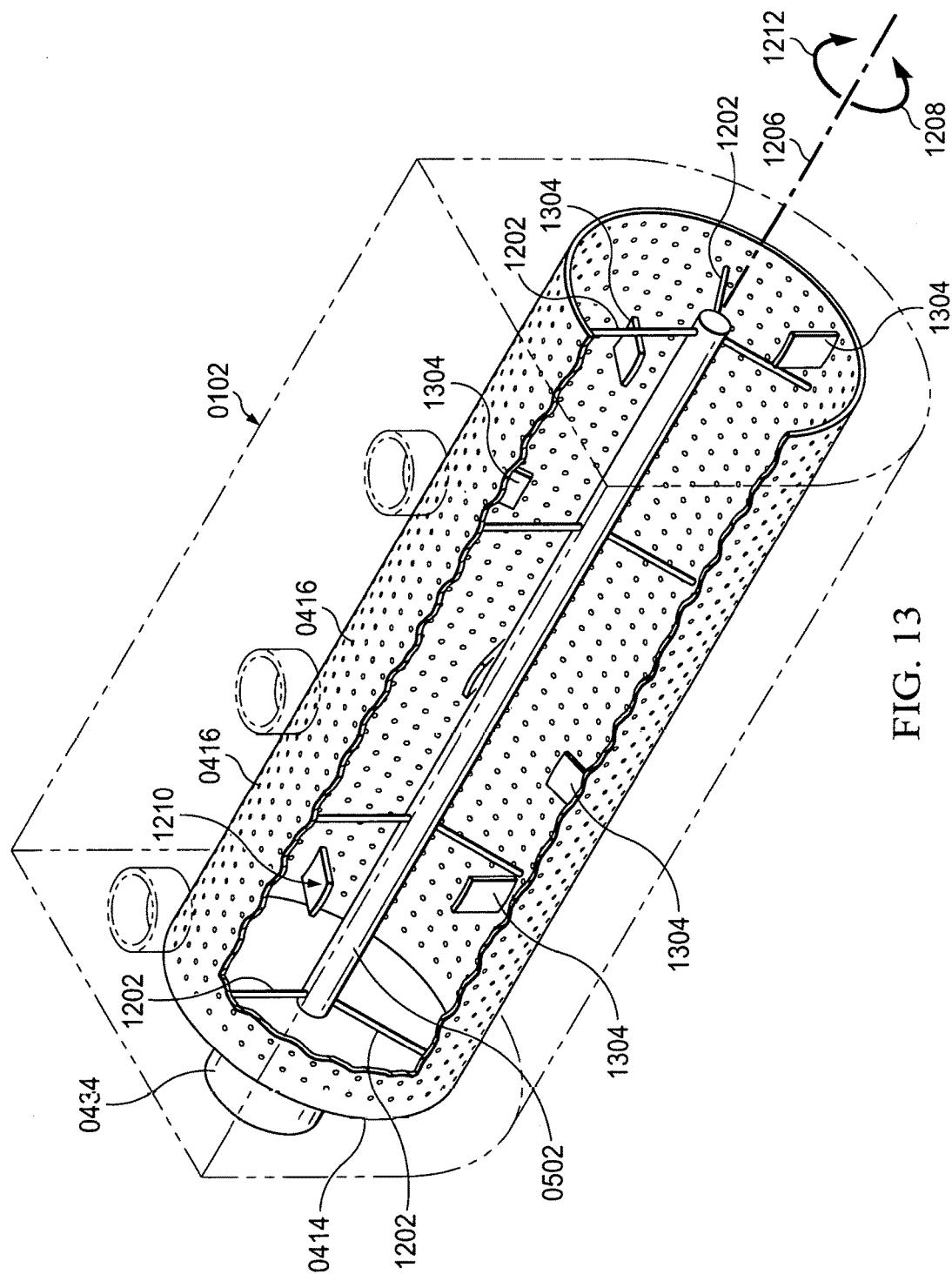
FIG. 13 is a schematic illustration of paddles fixed to an interior of a cage so that as the cage and the paddles rotate, the paddles facilitate the agitation of the bitumen-containing materials inside the cage, the charging of bitumen-containing materials into the cage or the discharging of materials from the cage.
Figure 14:
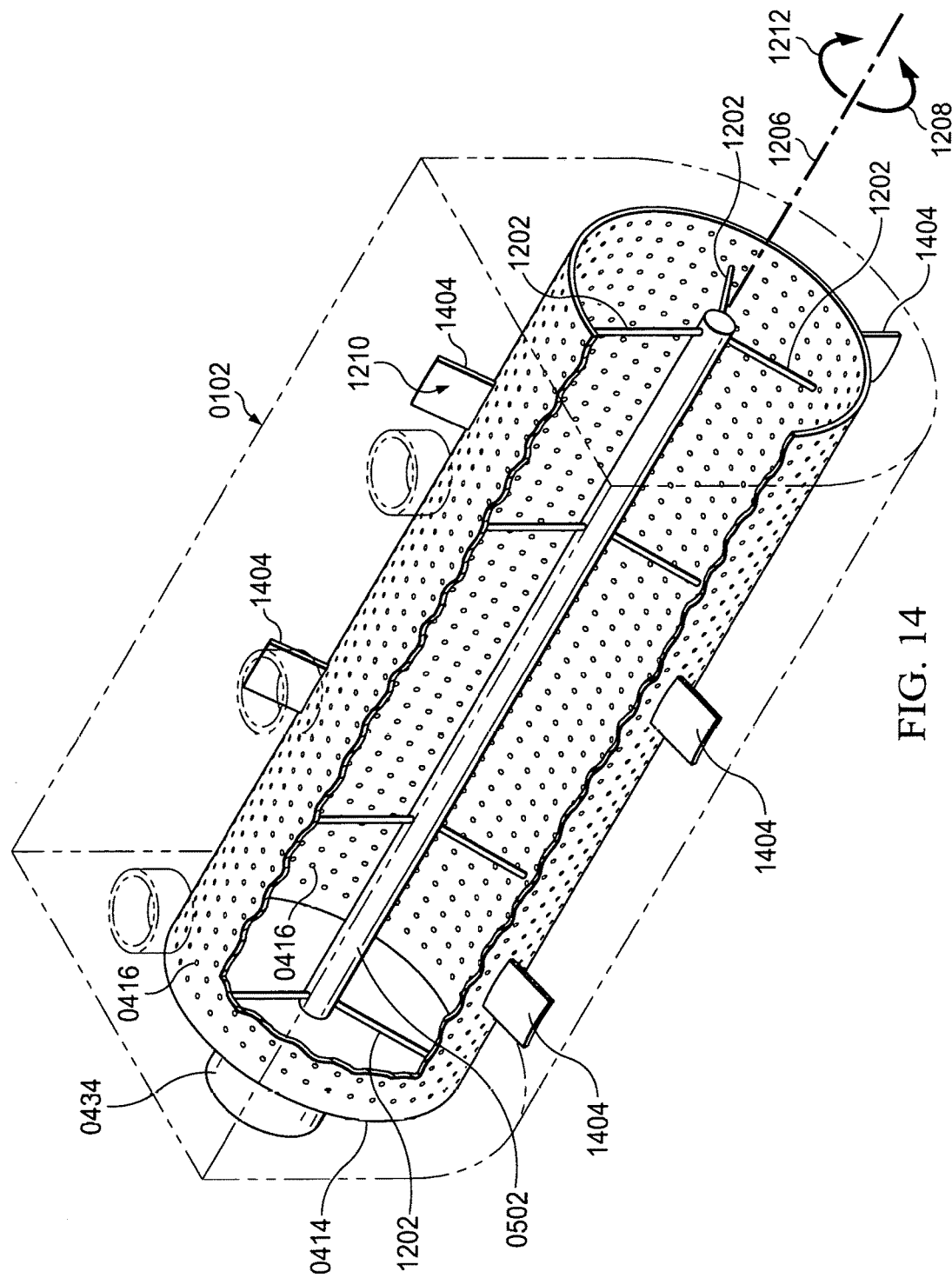
FIG. 14 is a schematic illustration of paddles fixed to an exterior of a cage so that as the cage and the paddles rotate, the paddles facilitate the agitation of solvent and bitumen outside the cage and inside a dissolution vessel, or the discharging of materials from the dissolution vessel.

As illustrated in FIG. 12, FIG. 13, and FIG. 14, in some embodiments, the cage 0414 can be fixed to the shaft 0502 using a plurality of braces 1202. For example, the braces can be arranged like spokes protruding from the shaft 0502 and extending to the cage 0414. If the braces 1202 are connected to both the cage 0414 and the shaft 0502, the braces can help support the cage 0414, help maintain a desired shape of the cage, or both. This can be useful when the cage is made from a heavy material, when the cage is loaded with bitumen-containing material, or a combination thereof.

In some embodiments, the shaft 0502, the cage 0414, or a combination thereof, can be rotatably mounted to dissolution vessel 0102, for example, through the rotation actuator 0434.

As illustrated in FIG. 12, FIG. 13 and FIG. 14, in some embodiments, the cage 0414 comprises at least one paddle (e.g, a paddle, one and only one paddle, or a plurality of paddles) 1204, 1304, 1404. As illustrated in FIG. 12, the at least one paddle 1204 can be fixed to the shaft 0502. This can be used to move (e.g., agitate, mix, charge or discharge the contents of the cage 0414. For example, with reference to FIG. 12, rotating the at least one paddle in a first direction 1208 of rotation can help charge the cage 0414 by moving materials into the cage, and rotating the at least one paddle in a second direction 1212 of rotation opposite the first direction 1208 of rotation can help discharge the cage 0414 by moving materials out of the cage.

In the configuration illustrated in FIG. 12, the paddles are somewhat similar to mixing blades on a mixer or blades on a propeller, although, as described in the present disclosure, the position, orientation and arrangement of the at least one paddle or the plurality of paddles relative to each other, the axis 1206 of rotation (e.g., of the shaft 0502, the cage 0414, the at least one paddle 1204, 1304, 1404, the dissolution vessel 0102, or a combination thereof) and the dissolution vessel can be modified relative to what would be expected in a mixer or propeller.

As illustrated in FIG. 13, the at least one paddle 1304 can be fixed to an interior surface of the cage 0414. This configuration can be used to move (e.g., agitate, mix, charge or discharge the contents of the cage 0414. For example, with reference to FIG. 13, rotating the at least one paddle in a first direction 1208 of rotation can help charge the cage 0414 by moving materials into the cage, and rotating the at least one paddle in a second direction 1212 of rotation opposite the first direction 1208 of rotation can help discharge the cage 0414 by moving materials out of the cage.

As illustrated in FIG. 14, the at least one paddle 1404 can be fixed to an exterior surface of the cage 0414. This can be used to move (e.g., agitate, mix, charge or discharge the contents of the dissolution vessel 0102 outside the cage 0414. For example, with reference to FIG. 14, rotating the at least one paddle in a first direction 1208 of rotation can help charge the cage 0414 by moving materials into the cage, and rotating the at least one paddle in a second direction 1212 of rotation opposite the first direction 1208 of rotation can help discharge the cage 0414 by moving materials out of the cage.

As is evident by comparing FIG. 12, FIG. 13, and FIG. 14, in some embodiments the at least one paddle 1204, 1304, 1404 can be rotated in both a first direction 1208 of rotation, and a second direction 1212 of rotation that is opposite the first direction of rotation. Additionally, when rotated a direction of rotation 1208, 1212, the at least one paddle can be used to either charge or discharge the contents of the cage 0414, the dissolution vessel 0102, or a combination thereof, depending on the position, orientation and arrangement of the at least one paddle or the plurality of paddles relative to each other, the axis of rotation and the dissolution vessel 0102.

In some embodiments a paddle 1204, 1304, 1404 lift portions of the bitumen-containing materials 0150 on leading surface 1210 of the paddle (i.e. surface facing the direction 1208 of rotation about the axis 1206 of rotation for the shaft 0502, the cage 0414, the at least one paddle 1204, 1304, 1404, the dissolution vessel 0102, or a combination thereof) and then release the bitumen-containing materials 0150 to fall. In some embodiments, the at least one paddle or plurality of paddles is arranged relative to an axis 1206 of rotation of the cage 0414. For example, the at least one paddle or the plurality of paddles can be positioned, oriented and arranged relative to each other, the axis 1206 of rotation, and the dissolution vessel 0102 so that rotating the cage 0414 in a first direction causes the at least one paddle to exert a first paddle force (e.g., loading force) on the bitumen-containing materials 0150 inside the cage 0414 that causes the bitumen-containing materials 0150 to move in a first direction along the axis 1206 of rotation (e.g., away from an inlet of the cage 0414, the dissolution vessel 0102 or a combination thereof). Additionally, the at least one paddle or the plurality of paddles can be positioned, oriented and arranged relative to each other, the axis 1206 of rotation, and the dissolution vessel 0102 so that rotating the cage 0414 in a second direction (e.g., reversing the actuator or running the actuator in the opposite direction) causes the at least one paddle to exert a second paddle force (e.g., unloading force) on the bitumen-containing materials 0150 inside the cage 0414 that causes the bitumen-containing materials 0150 (e.g., any remnant of the bitumen-containing materials remaining in the cage, for example, an undissolved portion of the bitumen-containing materials, cellulose, fiberglass, etc.) to move in a second direction along the axis 1206 of rotation (e.g., toward an outlet (e.g., solids discharge outlet 0412) of the cage 0414, the dissolution vessel 0102, or a combination thereof). With reference to FIG. 4, it is worthwhile to point out that an inlet (e.g., feed inlet 0408) and an outlet (e.g., at least one discharge outlet or solids discharge outlet 0412) of the dissolution vessel 0102 can be located adjacent to each other and on the same end 0442, 0444 of the dissolution vessel.

Figure 15:
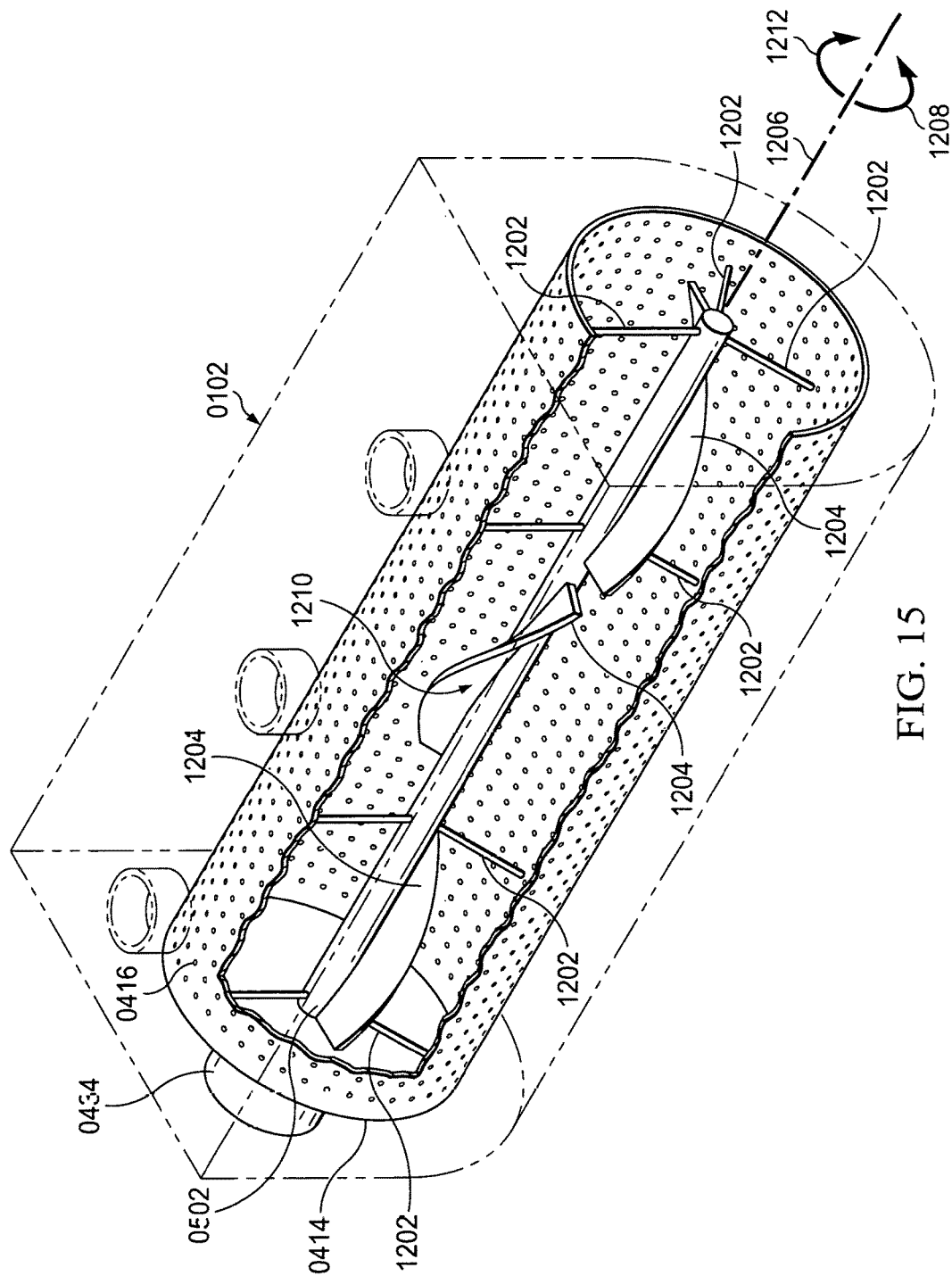
FIG. 15 is a schematic illustration of flights fixed to a shaft so that as the shaft and the flights rotate, the flights facilitate the agitation of the bitumen-containing materials inside the cage, the charging of bitumen-containing materials into the cage or the discharging of materials from the cage.
Figure 16:
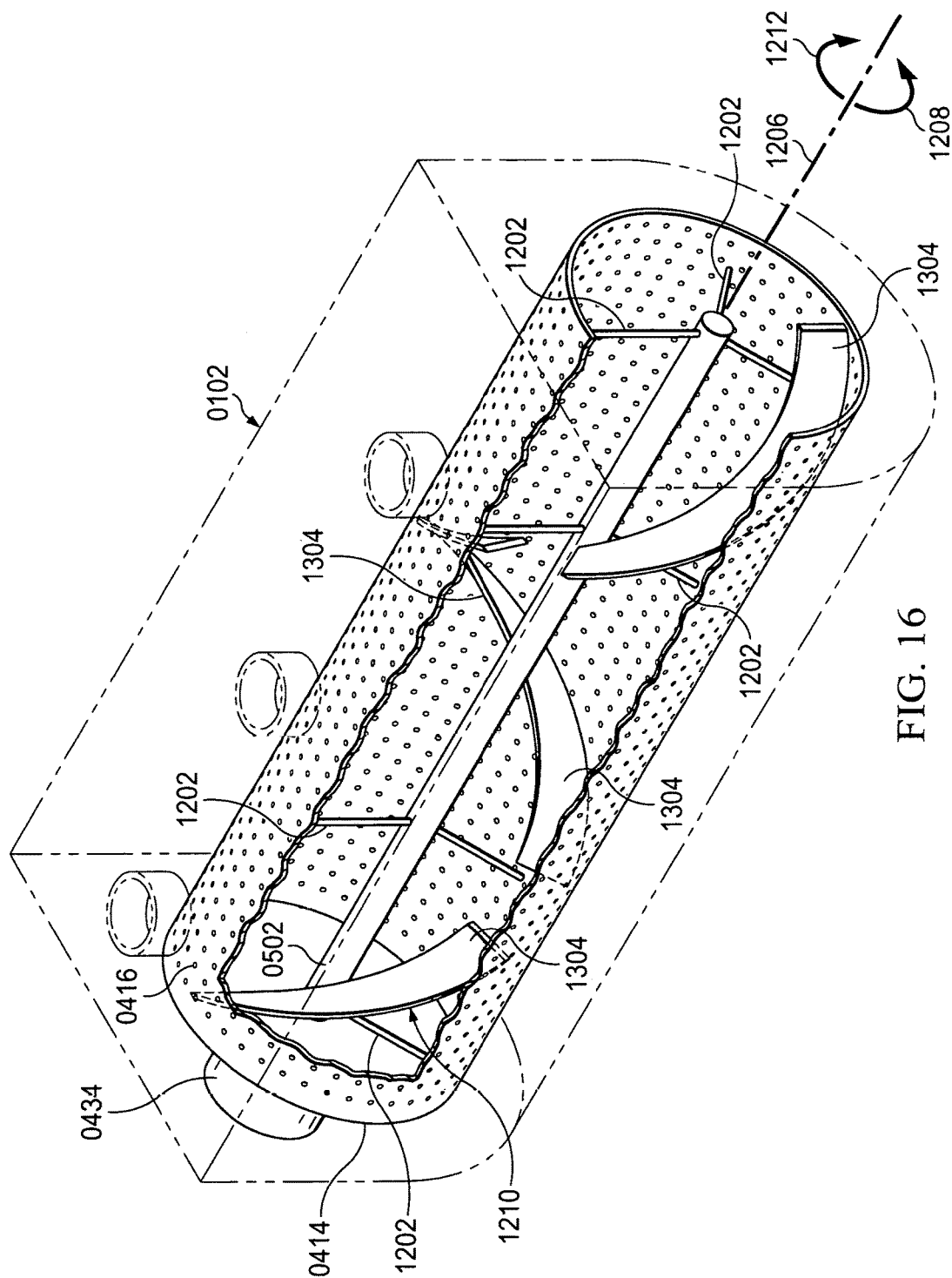
FIG. 16 is a schematic illustration of flights fixed to an interior of a cage so that as the cage and the flights rotate, the flights facilitate the agitation of the bitumen-containing materials inside the cage, the charging of bitumen-containing materials into the cage or the discharging of materials from the cage.
Figure 17:
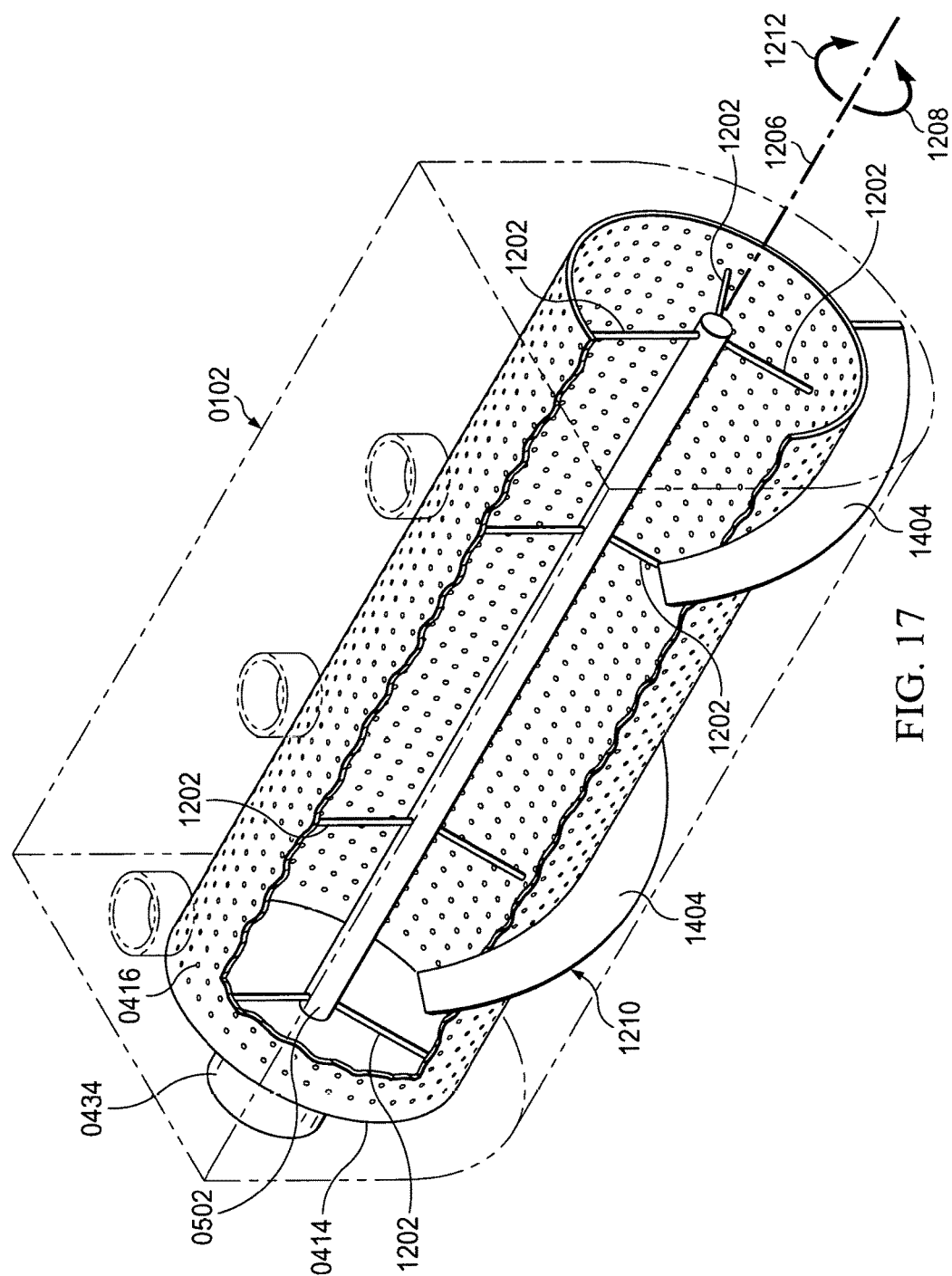
FIG. 17 is a schematic illustration of flights fixed to an exterior of a cage so that as the cage and the flights rotate, the flights facilitate the agitation of solvent and bitumen outside the cage and inside a dissolution vessel, or the discharging of materials from the dissolution vessel.

With reference to FIG. 15, FIG. 16 and FIG. 17, in some embodiments the at least one paddle 1204, 1304, 1404 can be in the form of a flight (e.g., similar to an auger flight, twisted ribbon, a helix, or a screw) or a plurality of flights. Accordingly, FIG. 15, FIG. 16 and FIG. 17 are generally the same as FIG. 12, FIG. 13, and FIG. 14 respectively. For example, FIG. 15 illustrates three paddles 1204, each in the form of a flight. As illustrated, the paddles are fixed to the shaft 0502.

FIG. 16 illustrates two paddles 1204, each in the form of a flight. As illustrated, the paddles are fixed to an interior surface of the cage 0414.

FIG. 17 illustrates two paddles 1204, each in the form of a flight. As illustrated, the paddles are fixed to an exterior surface of the cage 0414.

As a skilled person would understand after reading the present disclosure, depending on the relative rotation of components, in some embodiments the at least one paddle 1204, 1304, 1404 can be discontinuous. For example, this can be useful to avoid impact between the braces 1202 and at least one paddle 1204, 1304, 1404 if the braces do not rotate in the same direction of rotation and at the same rotational speed as the at least one paddle. However, in some embodiments, whether or not braces 1202 are used, a single continuous flight can be used on the exterior surface of the cage 0414, interior surface of the cage 0414, or shaft 0502.

In some embodiments, the dissolution vessel 0102 comprises a closure 0432 for the feed inlet 0408 of the dissolution vessel 0102, a closure 0430 for a solids discharge outlet 0412 of the dissolution vessel 0102, or a combination thereof. In some embodiments, the closure 0430 for the solids discharge outlet 0412 is closed during loading of the dissolution vessel, the cage or a combination thereof. In some embodiments, the closure 0430 for the solids discharge outlet 0412 is closed during (e.g., for the duration of) a process (e.g. separation, dissolution) occurring in the dissolution vessel, the cage or a combination thereof.

In some embodiments, the dissolution vessel 0102 comprises a tilt actuator 0426 configured to tilt the dissolution vessel 0102, the cage 0414, or a combination thereof (e.g., from horizontal to at least 1, 2, 3, 4, 5, 10, 15, 20, 25, 30, 45, 60, or 90 degrees above horizontal, up to 2, 3, 4, 5, 10, 15, 20, 25, 30, 45, 60, 90 degrees or any degrees above horizontal, or a combination thereof). This can be useful, for example, to facilitate loading or unloading of the cage and/or the dissolution vessel. This can also be useful during the process of dissolving a fraction in the bitumen-containing materials so that liquids can be directed by gravity-flow to a desired point of discharge, for separation, recirculating, or a combination thereof. In some embodiments, the feed hopper 0606, the discharge hopper 0604, the motor 0434 or a combination thereof are configured not to move (e.g., remain stationary) while the tilt actuator 0426 tilts the dissolution vessel 0102, the cage 0414 or a combination thereof. In some embodiments, the dissolution vessel, agitator, tumbler, cage, or combination thereof can be provided (e.g., installed) with a fixed (e.g., permanent) angle of tilt (e.g., at any angle of tilt described herein in conjunction with the tilt actuator, 0 to 90 degrees above horizontal, 2 to 45 degrees, or 5 to 30 degrees above horizontal). Providing the dissolution vessel, agitator, tumbler, cage or combination thereof at a fixed angle of tilt can be useful to facilitate loading and unloading while also avoiding the need for a tilt actuator, which could be replaced by a support and/or frame configured to maintain the dissolution vessel, agitator, tumbler, cage or combination thereof at a fixed angle of tilt. Accordingly, the dissolution vessel, agitator, tumbler, cage or combination thereof can be provided at a fixed angle of tilt or at a variable angle of tilt. Additionally, an apparatus or system including the dissolution vessel, agitator, tumbler, cage or combination thereof can be provided with a support, a frame or a tilt actuator configured to maintain the angle of tilt, change the angle of tilt, or a combination thereof.

Figure 6:
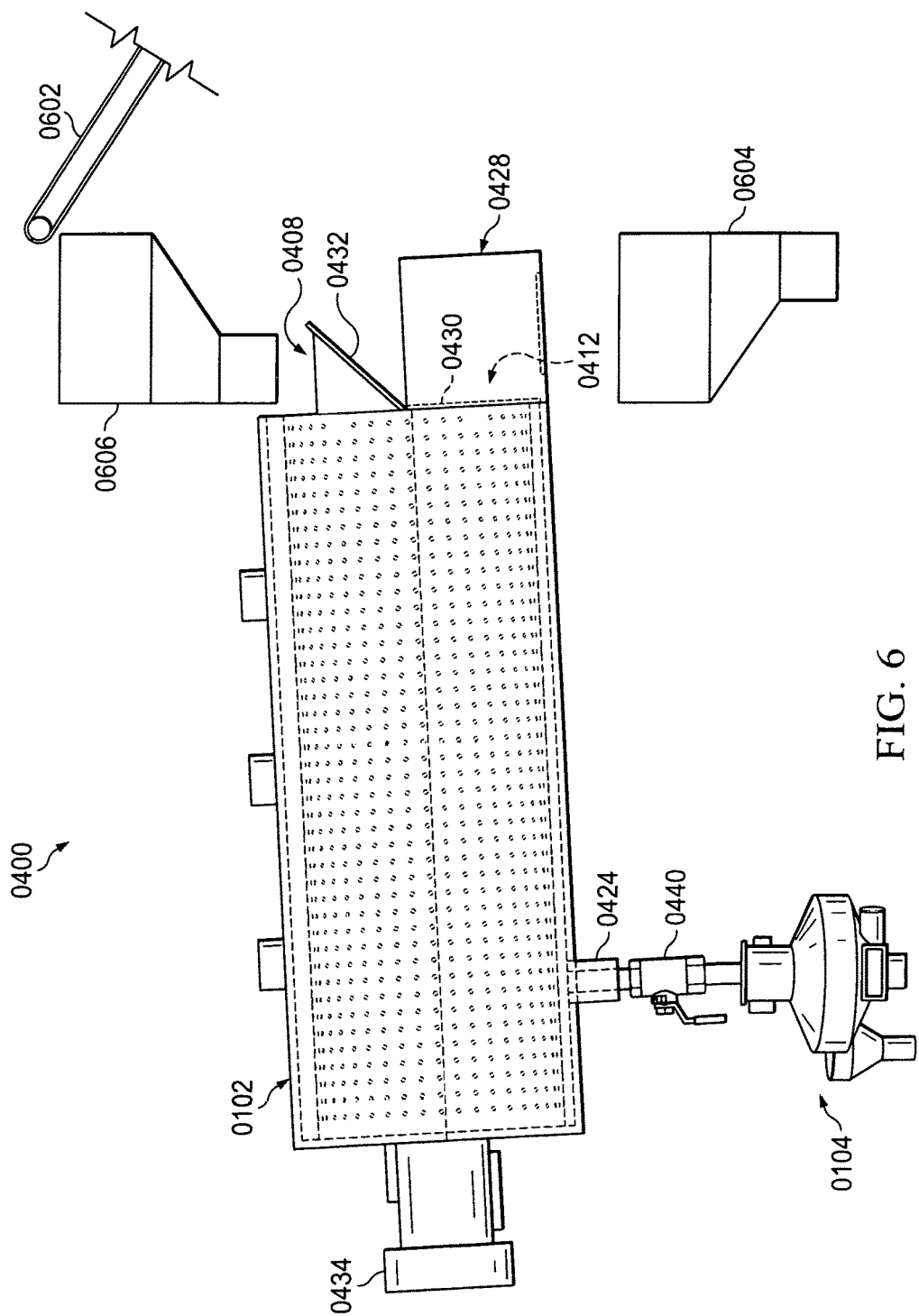
FIG. 6 is a schematic illustration of the embodiment of FIG. 4 and illustrates a configuration of the apparatus that can be used for loading the apparatus with bitumen-containing materials and contacting the bitumen-containing materials with at least one solvent to provide a mixed-materials stream, which can be fed to a solid-liquid-separator.

With reference to FIG. 6, in some embodiments the apparatus 0400 comprises a discharge hopper 0604. The discharge hopper can be configured to receive a solids-rich stream 0168, 0182 or mixed-materials stream 0156 from a solids discharge outlet 0412. For example, the solids discharge outlet 0412 can be used to discharge the larger solid objects retained inside the cage 0414 or all the contents of the dissolution vessel 0102. Additionally, the discharge hopper 0604 can be configured to deliver a solids-rich stream 0168, 0182 or mixed-materials stream 0156 from the cage 0414, the dissolution vessel 0102, or both to a conveyor 0602, which can, in turn, convey the solids-rich stream 0168, 0182 or mixed-materials stream 0156 to a dryer 0114, 0116, or a solid-liquid separator 0104.

In some embodiments, the apparatus 0400 comprises a discharge housing 0428. The discharge housing 0428, in conjunction with a discharge hopper 0604, can be configured to enclose a solids discharge outlet 0412 for the larger solid objects retained inside the cage or all the contents of the dissolution vessel 0102. In some embodiments, the discharge housing is fixed to the dissolution vessel. Additionally, the interface of the discharge hopper 0604 and the discharge housing 0428 can be sealed (e.g., using a rubber seal, etc.). For example, the discharge housing can provide a vapor seal between the dissolution vessel 0102 and the discharge hopper 0604. Furthermore, the discharge housing 0428 can be light-weight (e.g., greater than 0% but no more than 5, 4, 3, 2, or 1% of the weight of the dissolution vessel). For example, if the discharge housing 0428 is used primarily to control vapors, it does not need to be especially heavy.

With reference again to FIG. 6, in some embodiments, the apparatus 0400 comprises a feed hopper 0606. The feed hopper 0606 can be configured to receive bitumen-containing materials 0150 from a conveyor 0602 (e.g. a single conveyor or a plurality of conveyors), and the conveyor can be an endless conveyor (e.g., a belt conveyor). Additionally, the feed hopper 0606 can be configured to deliver the bitumen-containing materials 0150 to the feed inlet 0408 of the dissolution vessel 0102, inside the cage 0414, inside the dissolution vessel 0102, or a combination thereof.

In some embodiments the at least one solvent distributor 0406 comprises a first-solvent distributor, a second-solvent distributor, a conduit 0422 (e.g., pipe, duct, or combination thereof), a nozzle 0438, an aperture 0436, or a combination thereof.

Although an apparatus 0400 to facilitate dissolution of at least one fraction into at least one solvent has been described as comprising a dissolution vessel 0102 and a tumbler 0404, in some embodiments the apparatus does not comprise the tumbler 0404 or the cage 0414. For example, this can be because agitation is not used in some dissolution processes or because a different type of agitation is used, for example, mixing or vibrating.

Additionally, although a dissolution vessel 0102 has been described herein, with a cylindrical shape, other types of dissolution vessels can also be used. For example, the vessel can be designed to withstand full vacuum, halt vacuum, any vacuum occurring during the dissolution process, any pressure occurring during the dissolution process, or a combination thereof. Additionally, the vessel can be any type of container (e.g., tank, pressure vessel, etc.) configured to contain the at least one solvent and bitumen-containing materials, configured to withstand the maximum and minimum operating pressure and temperature that occur during the dissolution process, configured to withstand the mechanical stresses that occur during the dissolution process, configured to avoid adversely reacting with the contents of the dissolution vessel or the atmosphere surrounding the dissolution vessel (e.g., substantially corroding, rusting, etc.) or a combination thereof.

An embodiment of a system 0101 comprising the apparatus 0400 will now be described with reference to FIG. 1, FIG. 2 and FIG. 3. For example, FIG. 1 illustrates a system 0101 comprising an embodiment of the apparatus 0400. The system comprises a solid-liquid separator 0104 and at least one solvent-fraction separator 0108.

The solid-liquid separator 0104 can be configured to receive the mixed-materials stream 0156 from the at least one discharge outlet 0412, 0424. As illustrated in FIG. 1, the solid-liquid separator 0104 separates the mixed-materials stream 0156 into a liquid-rich stream (e.g., the solvent-and-bitumen-rich stream 0158) comprising liquid 0808 from the mixed-materials stream 0156 and a solids-rich stream 0174 comprising solids 0806 from the mixed-materials stream 0156. A schematic illustration of a solid-liquid separator 0104 comprising a vibratory screen is shown in FIG. 8. As illustrated, the solid-liquid separator 0104 comprises at least one screen 0802. The at least one screen 0802 comprises screen apertures 0804 configured to retain larger solid objects 0806 from the bitumen-containing materials 0150 that cannot pass through the screen apertures 0804 while allowing liquid 0808 and smaller solid objects from the bitumen containing materials to pass through the screen apertures 0804.

As illustrated in FIG. 1, the at least one solvent-fraction separator 0108 can be configured to separate the liquid-rich stream into a solvent-rich stream 0180 comprising the at least one solvent and a bitumen-rich stream 0184 comprising the at least one fraction.

In some embodiments, the at least one solvent-fraction separator 0108 comprises a filter (e.g., porous material, membrane, screen, etc.), solvent-fraction heater 0106, a flash drum 0109, or a combination thereof. For example, the solvent-fraction heater 0106 can be configured to receive a solvent-and-bitumen-rich stream 0158 (e.g., liquid-rich stream) and provide a heated solvent-and-bitumen-rich stream UM. Additionally, the flash drum 0109 can be configured to receive a heated solvent-and-bitumen-rich stream 0160 (e.g., heated liquid-rich stream) and provide a bitumen-rich stream 0184 and a solvent-rich stream 0180. Although, in some cases the flash drum may directly receive the solvent-and-bitumen-rich stream 0158 from the solid-liquid separator 0104 without a solvent-fraction heater 0106 located upstream of the flash drum 0109 to heat the feed to the flash drum 0109.

In some embodiments, the system 0101 comprises a conveyor (e.g., pump 0420) for the liquid-rich stream in fluid communication with the at least one solvent distributor 0406. For example, the conveyor for the liquid-rich stream (e.g., solvent-and-bitumen-rich stream 0158) can be configured to receive the liquid-rich stream (e.g., through a conduit 0422) and convey the liquid-rich stream (e.g. through a conduit 0422) to the at least one solvent distributor 0406. Additionally, the conveyor for the liquid-rich stream can be configured to continuously recirculate the liquid-rich stream to the at least one solvent distributor 0406 from the solid-liquid separator 0104. In some embodiments, the system 0101 comprises a dryer 0114, 0116 (e.g., larger-solids dryer 0114, smaller-solids dryer 0116, solids dryer 0116, general purpose dryer 0116, or a combination thereof). As illustrated in FIG. 1, the dryer 0114, 0116 or plurality of dryers 0114, 0116 can receive a solids-rich stream 0168, 0169, (e.g., smaller-solids rich stream 0169, larger-solids-rich stream 0168, or combination thereof). In some embodiments, the dryer 0114, 0116 or plurality of dryers 0114, 0116 discharges a dried solids-rich stream 0170, 0176 (e.g., dried smaller-solids rich stream 0176, dried larger-solids-rich stream 0170, or combination thereof). Additionally, in some embodiments, a dryer 0114, 0116 or plurality of dryers 0114, 0116 can discharge a solvent-rich stream 0172, 0178 (e.g., a solvent-rich stream 0172 from the smaller-solids dryer 0116, a solvent-rich stream 0178 from the larger-solids dryer 0114, or a combination thereof). As a skilled person reading the present disclosure would understand, a plurality of dryers 0114, 0116, a single dryer 0114, 0116 or no dedicated dryers 0114, 0116 can be used in some embodiments. Additionally, in some embodiments, the dissolution vessel 0102 can also be used as a dryer to dry solids (e.g., fiberglass, cellulose, metal, etc.) in the dissolution vessel. For example, after dissolving bitumen-containing materials in the dissolution vessel and discharging liquid (e.g., solvent, dissolved bitumen, etc.) from the dissolution vessel, solids remaining in the dissolution vessel can be dried (e.g., using heat, vacuum, rotation in the cage, which can be similar to a dryer spin cycle, or a combination thereof) before the solids are discharged.

In some embodiments, the system 0101 or apparatus 0400 comprises a flow restrictor 0440, which can be in fluid communication with the at least one mixed-materials discharge outlet 0424. Furthermore, the flow restrictor can be configured to restrict a flow of the mixed-materials stream 0156 from the at least one discharge outlet 0424. Examples of flow restrictors include a valve, ball valve, hemispherical valve, gate valve, gate, sliding gate, rotary gate, hinged gate or a combination thereof. For example, the flow restrictor can be useful for creating a pulsed flow of the mixed-materials stream 0156, which can be accomplished by intermittently opening and then closing the valve to provide a desired mass flowrate of feed to a downstream process unit (e.g., solid-liquid separator 0104). The flow restrictor can also be useful for avoiding an accumulation of solids at the discharge outlet 0424 that can clog the discharge outlet 0424.

Figure 7:
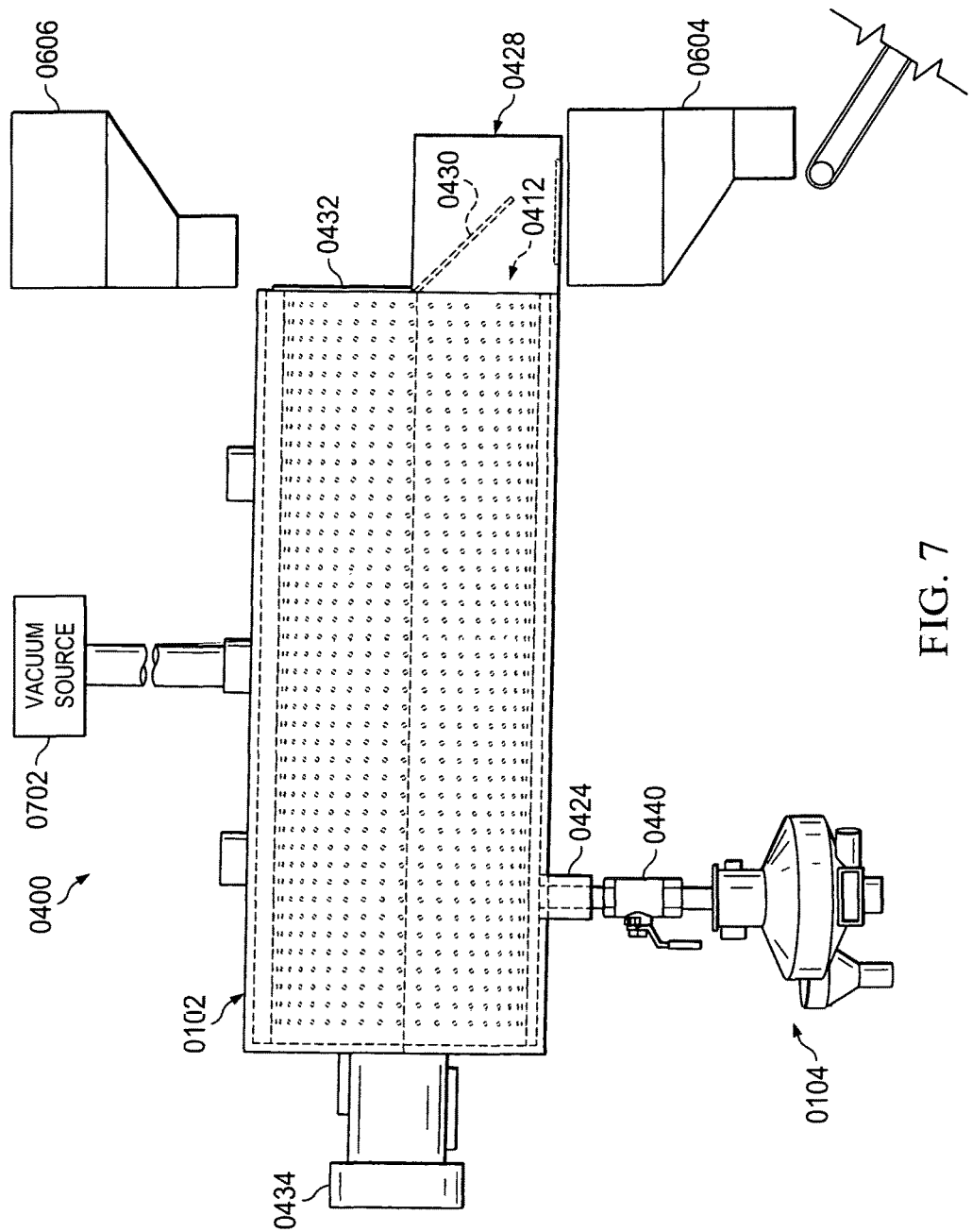
FIG. 7 is a schematic illustration of the embodiment of FIG. 4 and illustrates a configuration of the apparatus that can be used for unloading solids that remain in the cage after bitumen has been removed from the bitumen-containing materials by the at least one solvent.

With reference to FIG. 7, in some embodiments the system 0101 or apparatus 0400 comprises a vacuum source 0702 in fluid communication with the dissolution vessel 0102. In some embodiments, the vacuum source 0702 is configured to provide a vacuum (e.g., at least 3, 10, 20, 30, 40, 50, 60, 70, 80, 90, 100 kPa, less than 101.325, 90, 80, 70, 68, 60, 50, 40, 30, 20, or 10 kPa, or a combination thereof) in the dissolution vessel 0102. For example, this can be used to increase the rate of evaporation of the at least one solvent inside the dissolution vessel 0102. Additionally, the vacuum source 0702 can be configured to provide the vacuum in the dissolution vessel 0102 while the cage 0414 rotates to enhance the rate of evaporation of the at least one solvent inside the dissolution vessel 0102. Furthermore, the vacuum source 0702 can be configured to provide the vacuum in the dissolution vessel 0102 while the contents of the dissolution vessel 0102 are heated. Examples of a vacuum source 0702 include a pump, a fan, a compressor or a combination thereof. As a further example, providing a vacuum inside the dissolution vessel 0102 can be useful to help facilitate more complete removal of a first solvent from the dissolution vessel before contacting remaining bitumen-containing materials with a second solvent.

In some embodiments, the system 0101 comprises a heat treater 0110, which can be configured to heat the at least one product stream 0182 (e.g., bitumen-rich stream 0184) to provide a heat-treated product stream (e.g., heat-treated bitumen-rich stream 0164, heat-treated first-fraction-rich stream, heat-treated second-fraction-rich stream). In some embodiments, the at least one product stream 0182 is heated to at least 204, 232, 260, 287, 315 or 343° C., to within 0.28° C. of the listed temperature, to no more than 233, 260, 288, 316, 344 or 372° C., or a combination thereof to provide the heat-treated product stream. In some embodiments, the heat treater 0110 comprises a heat treat container (e.g., tank, etc.). For example, at least one surface (e.g., wall) of the heat treat container can be in contact with the at least one product and can be heated to at least 260, 287, 315 or 343° C., to no more than 288, 316, 344 or 372° C., or a combination thereof. In some embodiments, the at least one product stream 0182 is agitated (e.g., mixed, stirred, etc.) while it is heated by the heat treater 0110.

In some embodiments, the system 0101 comprises a bitumen-storage system 0112 for storing bitumen (e.g., the bitumen-rich stream 0184, the first-fraction-rich stream 0204, the second-fraction-rich stream 0304 or a combination thereof). As examples, the bitumen can be provided by the at least one solvent-fraction separator 0108, the heat treater 0110, or a combination thereof.

In some embodiments, the system 0101 comprises a larger solids storage system 0118 for storing solids or larger solids retained by the cage. Examples of the solids or larger solids include fiberglass, cellulose, metals, gravel, granules, aggregate, sand or a combination thereof.

In some embodiments, the system 0101 comprises a smaller solids storage system 0120 for storing solids or larger solids provided by the solid-liquid separator. Examples of the solids or smaller solids include sand, gravel, granules, aggregate, metal, fiberglass, cellulose or a combination thereof.

In some embodiments, the system 0101 comprises a recirculating solvent storage system 0186 (e.g., a recirculating first-solvent storage system 0286, a recirculating second-solvent storage system 0386, or combination thereof). The recirculating solvent storage system 0186 can be used, for example, for storing solvent that has been separated from a process stream, solvent that can be recirculated, or has already been recirculated. Examples of solvent streams comprising solvent that has been separated from a process stream include the solvent-rich stream 0180, the first-solvent-rich stream 0280, the second-solvent-rich stream 0380, or combination thereof from the at least one solvent-fraction separator 0108; solvent-rich stream 0178, first-solvent-rich stream 0278, second-solvent-rich stream 0378, or combination thereof from the smaller solids dryer 0116; solvent-rich stream 0172, second-solvent-rich stream 0372, or combination thereof from the larger solids dryer 0114; or a combination thereof.

In some embodiments, the system 0101 comprises a make-up solvent storage system 0196 (e.g., make-up first solvent storage system 0296, make-up second solvent storage system 0396, or combination thereof). For example, the make-up solvent storage system 0196 can provide a source for the make-up solvent stream 0154, make-up first solvent stream 0254, make-up second solvent stream 0354, or a combination thereof.

In some embodiments, the system 0101 comprises a solvent storage system 0194 (e.g., a first-solvent storage system 0294, a second-solvent storage system 0394, or a combination thereof). For example, the solvent storage system 0194 can provide a source for the solvent stream 0152, first-solvent stream 0202, second-solvent stream 0302, or a combination thereof.

In some embodiments, the system 0101 comprises a solvent heater 0190 (e.g., a first-solvent heater 0290, a second-solvent heater 0390, or a combination thereof). For example, the solvent heater 0190 can heat the solvent stream 0152, first-solvent stream 0202, second-solvent stream 0302, or a combination thereof. In some embodiments, the solvent heater 0190 can provide the solvent stream 0152, first-solvent stream 0202, second-solvent stream 0302 or a combination thereof, at a desired temperature equal to at least 25, 40 or 80° C., no more than 200, 190, 180, 170, 160, 150, 125, 100, 90, 80, 70, 60, or 50° C., or a combination thereof.

In some embodiments, the system 0101 comprises a dissolution vessel heater 0192, for example, to heat the dissolution vessel 0102, the contents of the dissolution vessel, or a combination thereof. In some embodiments, the dissolution vessel heater 0192 heats the dissolution vessel to a desired temperature equal to at least 25, 40 or 80° C., no more than 200, 190, 180, 170, 160, 150, 125, 100, 90, 80, 70, 60, or 50 CC, or a combination thereof.

Comparative Examples

In some embodiments, the at least one solvent 0152, 0202, 0302 fed to the dissolution vessel 0102 is provided at a temperature equal to at least 25, 30, 35, 40 or 45° C., no more than 100, 90, 80, 70, 65, 60 or 55° C., or a combination thereof. The pressure in the dissolution vessel 0102 can be at approximately atmospheric pressure (e.g., 101.325 kPa). Furthermore, the at least one solvent 0152, 0202, 0302 fed to the dissolution vessel 0102 can be provided at a pressure equal to approximately atmospheric pressure or a pressure determined by system hydraulics.

In some embodiments, materials leaving the dissolution vessel 0102, for example, the solids-rich stream 0168, 0182, mixed materials stream 0156, 0182, 0184, or a combination thereof, are at a temperature equal to at least 25, 30, 35, 40 or 45° C., no more than 100, 90, 80, 70, 65, 60 or 55° C., or a combination thereof. If net heat loss occurs for the materials in the dissolution vessel 0102, the net heat loss may cause some reduction in the temperature of the materials. The pressure of the materials leaving the dissolution vessel 0102 can be at approximately atmospheric pressure.

In some embodiments, materials fed to the solid-liquid separator 0104, for example, the mixed materials stream 0156, 0182, 0184, is provided at approximately whatever temperature the materials have upon leaving the dissolution vessel 0102, taking into account any heat loss. In some embodiments, materials discharged from the solid-liquid separator 0104, for example, the mixed materials stream 0156, 0182, 0184, is provided at approximately whatever temperature the materials had upon being fed to the solid-liquid separator 0104, taking into account any heat loss. In other words, the solid-liquid separator 0104 does not necessarily involve adding or removing heat to the materials, although it can. The solid-liquid separator 0104 can be operated at approximately atmospheric pressure. The pressure of the materials fed to the solid-liquid separator 0104 can be at approximately atmospheric pressure or a pressure determined by system hydraulics.

In some embodiments, materials fed to the dryer 0114, for example, the solids-rich stream 0168, 0182, are heated in the dryer 0116 to at least 37, 93, 148, 204 or 260° C., no more than 316, 260, 205, 149, or 94° C., or a combination thereof. This can be useful to facilitate the evaporation of solvent or other liquid in the materials fed to the dryer 0114. Depending on the solvents used and whether a vacuum is employed, the materials can also be heated to other temperatures to facilitate drying. The dryer 0114 can be operated at approximately atmospheric pressure. The pressure of the materials fed to the dryer 0114 can be at approximately atmospheric pressure or a pressure determined by system hydraulics.

In some embodiments, materials fed to the dryer 0116, for example, the solids-rich stream 0169, 0174, 0182, are heated in the dryer 0116 to at least 37, 93, 148, 204 or 260° C., no more than 316, 260, 205, 149, or 94° C., or a combination thereof. This can be useful to facilitate the evaporation of solvent or other liquid in the materials fed to the dryer 0116. Depending on the solvents used and whether a vacuum is employed, the materials can also be heated to other temperatures to facilitate drying. The dryer 0116 can be operated at approximately atmospheric pressure. The pressure of the materials fed to the dryer 0116 can be at approximately atmospheric pressure or a pressure determined by system hydraulics.

In some embodiments, materials fed to the at least one solvent-fraction separator 0108, for example, the solvent-and-bitumen-rich stream 0158, 0182, 0184, 0258, 0204, 0358, 0304 is provided at approximately whatever temperature the materials have upon leaving the solid-liquid separator 0104. In some embodiments, the solvent-fraction heater 0106 heats the materials fed to the at least one solvent-fraction separator 0108 to at least 148, 162, 176, 190, 197, 204, 218, or 232° C., no more than 260, 233, 219, 205, 198, 191, 177 or 163° C., or a combination thereof. In some embodiments, materials fed to the flash drum 0109, for example, a solvent-and-bitumen-rich stream 0160, 182, 0184, 0204, 0304, are provided at approximately whatever temperature the materials had upon being discharged from the solvent-fraction heater 0106, taking into account any heat loss, for example, at least 148, 162, 176, 190, 197, 204, 218, or 232° C., no more than 260, 233, 219, 205, 198, 191, 177 or 163° C., or a combination thereof. In some embodiments, the at least one solvent-fraction separator is operated at a pressure determined by system hydraulics, at atmospheric pressure or at a vacuum. As illustrated in FIG. 18, in some embodiment, the materials fed to the flash drum 0109 pass through a pressure reducer (e.g., flash valve 1806, orifice, flow restrictor, etc.) before entering the flash drum 0109. For example, in some embodiments the materials are provided (e.g., fed) to the pressure reducer (e.g., flash valve 1806) at a pressure of at least 206, 306, 413, 445, 514, 583 or 652 kPa, no more than 722, 653, 584, 517, 414 or 307 kPa, or a combination thereof. In some embodiments, the materials provided to the pressure reducer can be provided at a pressure sufficient to provide all or most of the materials (e.g., at least 100, 99, 98, 97, 96, 95, 90, 80, 70, 60 or 50 wt. % of the materials, no more than 60, 70, 80, 90, 95, 96, 97, 98, 99 or 100 wt. % of the materials, or a combination thereof) in a liquid phase. In some embodiments, the materials are discharged from the pressure reducer (e.g., flash valve 1806) at a reduced pressure equal to at least 33, 39, 47, 53, 59, 66, 73, 79, 86 or 93 kPa, no more than 722, 653, 584, 517, 414, 307, 207, 150, 125, 101.325, 94, 87, 80, 74, 67, 60, 54, 48, or 40 kPa, or a combination thereof. In some embodiments, the materials discharged from the pressure reducer can be provided at a pressure sufficiently low to vaporize a substantial amount of the materials (e.g., at least 100, 99, 98, 97, 96, 95, 90, 80, 70, 60, 50, 40, 30, 20 or 10 wt. % of the materials, no more than 20, 30, 40, 50, 60, 70, 80, 90, 95, 96, 97, 98, 99 or 100 wt. % of the materials, or a combination thereof). In some embodiments, a recirculation heater 1804 can be used to vaporize a substantial amount of the materials exiting the pressure reducer (e.g., at least 100, 99, 98, 97, 96, 95, 90, 80, 70, 60, 50, 40, 30, 20 or 10 wt. % of the materials, no more than 20, 30, 40, 50, 60, 70, 80, 90, 95, 96, 97, 98, 99 or 100 wt. % of the materials, or a combination thereof). In some embodiments, the flash drum 0109 operates at a pressure provided to the materials by the pressure reducer, taking into account system hydraulics. In some embodiments, the flash drum 0109 operates at a pressure equal to at least 33, 39, 47, 53, 59, 66, 73, 79, 86 or 93 kPa, no more than 722, 653, 584, 517, 414, 307, 207, 150, 125, 101.325, 94, 87, 80, 74, 67, 60, 54, 48, or 40 kPa, or a combination thereof. Similarly, in some embodiments, a bitumen-rich stream 0182, 0184, 0204, 0304, a solvent-rich stream 0180, 0280, or a combination thereof can be discharged from the at least one solvent-fraction separator 0108 (e.g., flash drum 0109) at a pressure equal to at least 33, 39, 47, 53, 59, 66, 73, 79, 86 or 93 kPa, no more than 722, 653, 584, 517, 414, 307, 207, 150, 125, 101.325, 94, 87, 80, 74, 67, 60, 54, 48, or 40 kPa, or a combination thereof.

As illustrated in FIG. 18, in some embodiments, the flash drum 0109 can be associated with an auxiliary pump 1802 and a recirculation heater 1804. For example, the materials fed to the flash drum 0109 can be flashed (e.g., reduced in pressure) to a saturated condition, thereby providing a liquid phase (which can provide a bitumen-rich stream 0182, 0184, 0204, 0304) and a vapor phase (which can provide a solvent-rich stream 0180, 0280, 0380) in the flash drum. Furthermore, the liquid phase can be fed to the bottoms pump 1802 (e.g., as a bitumen-rich stream 0182, 0184, 0204, 0304) and split to provide both a first portion and a second portion. The first portion of the liquid phase from the bottoms pump 1802 can be fed to the recirculation heater 1804 and recirculated back to the flash drum 0109 (e.g., somewhat similar to a single stage distillation column with reflux). Additionally, the second portion of the liquid phase from the bottoms pump 1802 can be sent as a bitumen-rich stream 0182, 0184, 0204, 0304 to the heat treater 0110 or the bitumen storage system 0112, or both. The bitumen-rich stream 0182, 0184, 0204, 0304 discharged from the flash drum 0109 can be provided at the saturation temperature of the solvent-and-bitumen-rich stream 0160, 0182, 0184 (which can be heated) after the solvent-and-bitumen-rich stream is flashed (e.g., after its pressure is reduced at the inlet to the flash drum 0109). If the recirculation heater 1804 is used, the temperature of the bitumen-rich stream 0182, 0184, 0204, 0304 and solvent-rich stream 0180, 0280, 0380 leaving the flash drum 0109 can be higher than would otherwise be expected if the pressure of the solvent-and-bitumen-rich stream 0160, 0182, 0184, 0204, 0304 were reduced but no recirculation heater 1804 were used. Accordingly, in some embodiments, the bitumen-rich stream 0182, 0184, 0204, 0304 discharged from the flash drum is provided at a temperature equal to at least 148, 162, 176, 190, 197, 204, 218, 232 or 260° C., no more than 288, 260, 233, 219, 205, 198, 191, 177 or 163° C., or a combination thereof. Similarly, in some embodiments, the solvent-rich stream 0180, 0280, 0380 discharged from the flash drum is provided at a temperature equal to at least 148, 162, 176, 190, 197, 204, 218, 232 or 260° C., no more than 288, 260, 233, 219, 205, 198, 191, 177 or 163° C., or a combination thereof. Additionally, in some embodiments, a bitumen-rich stream 0182, 0184, 0204, 0304, a solvent-rich stream 0180, 0280, or a combination thereof can be discharged from the at least one solvent-fraction separator 0108 (e.g., flash drum 0109) at a pressure equal to at least 33, 39, 47, 53, 59, 66, 73, 79, 86 or 93 kPa, no more than 722, 653, 584, 517, 414, 307, 207, 150, 125, 101.325, 94, 87, 80, 74, 67, 60, 54, 48, or 40 kPa, or a combination thereof. The bottoms pump 1802 and recirculation heater 1804 can each be operated at a temperature and pressure determined by system hydraulics in conjunction with the operating temperature and pressure of the at least one solvent-fraction separator 0108 (e.g., flash drum 0109).

In some embodiments, the system 0101 comprises a condenser (e.g., cooler, not shown) for the vapor phase from the flash drum 0109 (e.g., vapor-rich stream, solvent-rich stream 0180, first-solvent-rich stream 0280, second-solvent-rich stream 0380, or a combination thereof) in fluid communication with the at least one solvent distributor 0406, the dissolution vessel 0102, the recirculating solvent storage system 0186, 0286, 0386, the solvent storage system 0194, or a combination thereof. The condenser can be useful to condense the vapor so it can be conveyed by a pump. Accordingly, in addition to a condenser, in some embodiments, the system 0101 comprises a conveyor (e.g., pump, compressor, not shown) for the vapor phase from the flash drum 0109 For example, the conveyor for the vapor phase can be configured to receive the vapor or condensed vapor phase from the flash drum (e.g., through a conduit) and convey the vapor phase (e.g. through a conduit) to the at least one solvent distributor 0406, the dissolution vessel 0102, the recirculating solvent storage system 0186, 0286, 0386, the solvent storage system 0194, or a combination thereof. Additionally, the conveyor for the condensed vapor phase can be configured to continuously recirculate the liquid-rich stream to the at least one solvent distributor 0406 from the condenser for the vapor phase from the flash drum 0109, to continuously recirculate solvent to the flash drum 0109, or a combination thereof.

In some embodiments, the bitumen-rich stream 0182, 0184, 0204, 0304 fed to the heat treater 0110 is provided at the temperature of the bitumen-rich stream 0182, 0184, 0204, 0304 discharged from the at least one solvent-fraction separator 0108 (e.g., flash drum 0109), taking into account any heat losses, for example, at a temperature equal to at least 148, 162, 176, 190, 197, 204, 218, 232 or 260° C., no more than 288, 260, 233, 219, 205, 198, 191, 177 or 163° C., or a combination thereof. In some embodiments, the heat treater 0110 heats the bitumen-rich stream 0182, 0184 to at least 287, 301, 315, 329, 343, 357, 371, 385, or 398° C., no more than 413, 399, 385, 372, 358, 344, 330, 316 or 302° C., or a combination thereof. In some embodiments, the heat treater 0110 operates at approximately atmospheric pressure or at a pressure determined by system hydraulics.

In some embodiments, the bitumen-rich stream 0182, 0184, 0204, 0304 is discharged from the heat treater 0110 and stored in a bitumen storage system 0112 at ambient temperature to 316° C., at a temperature equal to at least 0, 10, 23, 37, 93, 148, 204 or 260° C., at no more than 316, 260, 205° C., or a combination thereof. In some embodiments, the bitumen storage system 0112 operates at approximately atmospheric pressure or at a pressure determined by system hydraulics.

As a skilled person would understand after reading the present disclosure, the pressures employed for fluids in various units used in the process can be influenced by system hydraulics so that the pressures selected are sufficient to convey fluids from one unit to another unit. Additionally, the pressures and temperatures employed can be used to achieve a desired mass concentration of one fraction in a stream leaving a unit, to provide a composition in a desired state (e.g., liquid, gas or saturated liquid and gas), to avoid pressures much greater than or less than atmospheric pressure, or a combination thereof.

If not specifically described herein, process units (e.g., storage units, separation systems, etc.) can operate at approximately ambient temperature (e.g., 25° C.) or the temperatures of the incoming feed materials as determined by operating conditions in an upstream unit. Similarly, if not specifically described herein, process units can operate at approximately atmospheric pressure (101.325 kPa) or a pressure determined by system hydraulics. Additionally, in some embodiments, process units are provided at a temperature and pressure sufficient to maintain the materials in the process unit in a specified phase, which can be selected from liquid, vapor, or saturated liquid and vapor.

Additional Embodiments

The following clauses are offered as further description of the disclosed invention:

1. An apparatus 0400 to facilitate dissolution of at least one fraction of bitumen-containing materials into at least one solvent (e.g., for agitating bitumen-containing materials 0150), the apparatus 0400 comprising:

a dissolution vessel 0102 (e.g., configured to contain the bitumen-containing materials 0150 and the at least one solvent);

optionally an agitator (e.g., tumbler 0404) configured to agitate the bitumen-containing materials 0150 and facilitate wetting the bitumen-containing materials 0150 with the at least one solvent; and at least one solvent distributor 0406 configured to discharge the at least one solvent into the dissolution vessel 0102;

wherein the dissolution vessel 0102 comprises:

a feed inlet 0408 of the dissolution vessel 0102 configured to facilitate feeding the bitumen-containing materials 0150 into the dissolution vessel 0102;

a catch basin 0410 of the dissolution vessel 0102; and at least one discharge outlet 0412, 0424 of the dissolution vessel 0102;

optionally wherein the agitator (e.g., tumbler 0404) comprises:

a cage 0414 configured to receive the bitumen-containing materials 0150, wherein the bitumen-containing materials 0150 comprise larger solid objects and smaller solid objects, wherein the cage 0414 is configured to partially contain the bitumen-containing materials 0150 and optionally to rotate within the dissolution vessel 0102, wherein the cage 0414 comprises cage apertures 0416 configured to retain the larger solid objects that cannot pass through the cage apertures 0416 and allow liquid 0808 and the smaller solid objects to pass through the cage apertures 0416; and a containment space 0418 bounded by the cage 0414, wherein the containment space 0418 is configured to permit the bitumen-containing materials 0150 to be agitated (e.g., tumble) within the cage 0414;

optionally wherein the agitator (e.g., tumbler 0404) is configured to cause the bitumen-containing materials 0150 to be agitated (e.g. to tumble) within the cage 0150, optionally wherein the agitator (e.g., tumbler 0404) comprises at least one paddle (e.g., at least one paddle located inside the cage 0414 and fixed to a rotatable shaft 0502 that extends into the interior of the cage, at least one paddle fixed to an interior of the cage 0414, or at least one paddle fixed to an exterior of the cage 0414) that rotate within the dissolution vessel (e.g., to agitate the bitumen-containing materials 0150 inside the cage, outside the cage, or a combination thereof);

wherein the catch basin 0410 is configured to receive catch basin contents, wherein the catch basin contents comprise the at least one solvent, the at least one fraction and the smaller solid objects in the bitumen containing materials, and wherein the catch basin 0410 is configured to discharge the catch basin contents through the at least one discharge outlet 0412, 0424, thereby providing a mixed-materials stream 0156.

2. The apparatus of clause 1, wherein the apparatus of clause 1 comprises an element selected from the group consisting of:

wherein the at least one solvent distributor 0406 is configured to discharge the at least one solvent (i) in a location that enables the at least one solvent to contact the bitumen-containing materials 0150 in the dissolution vessel 0102, (ii) into contact with the bitumen-containing materials 0150 in the dissolution vessel 0102, (iii) into contact with bitumen-containing materials 0150 contained (e.g., partially or completely contained, enclosed, or bounded) by the tumbler 0404 when the tumbler 0404 is in a loaded configuration, or a combination thereof;

wherein the apparatus 0400 is for agitating bitumen-containing materials 0150 to facilitate dissolution of a first fraction into a first solvent, dissolution of a second fraction into a second solvent, dissolution of a plurality of fractions in a plurality of solvents, or a combination thereof;

wherein the at least one solvent distributor 0406 comprises at least one solvent distributor 0406 selected from the group consisting of: a solvent distributor configured to discharge the first solvent into contact with bitumen-containing materials 0150 enclosed by the tumbler 0404 when the tumbler 0404 is in a loaded configuration, a solvent distributor configured to discharge the second solvent into contact with bitumen-containing materials 0150 contained (e.g., partially or completely contained, enclosed, or bounded) by the tumbler 0404 when the tumbler 0404 is in a loaded configuration, a solvent distributor configured to discharge the first solvent and the second solvent into contact with the bitumen-containing materials 0150, a plurality of solvent distributors 0406 configured to discharge the plurality of solvents into contact with bitumen-containing materials 0150 contained by the tumbler 0404 when the tumbler 0404 is in a loaded configuration, and a combination thereof;

wherein the dissolution vessel 0102 comprises a closure 0432 for the feed inlet 0408 of the dissolution vessel 0102;

wherein the dissolution vessel 0102 comprises a closure 0430 for a solids discharge outlet 0412 of the dissolution vessel 0102;

wherein the at least one discharge outlet 0412, 0424 comprises (i) at least one mixed-materials discharge outlet 0424 (e.g., for mixed-materials, liquid 0808 from the dissolution vessel 0102, recirculating liquid 0808 from the dissolution vessel to the at least one solvent distributor 0406, liquid 0808 and smaller solid objects contained by the dissolution vessel 0102, the catch basin contents, or a combination thereof); (ii) at least one solids discharge outlet 0412 (e.g., for any contents of the dissolution vessel 0102, a mixed materials stream 0156, solids, a solids-rich stream 0174, 0176, the larger solid objects retained inside the cage, contents of the cage 0414 that have not been dissolved by the at least one solvent when the solvent is discharged from the dissolution vessel 0102, or a combination thereof); or a combination of (i) and (ii);

wherein at least 50, 60, 70, 80, 90, 91, 92, 93, 94, 95, 96, 97, 98, or 99% and up to 100% by area or number of the cage apertures 0416 have an equivalent spherical diameter equal to or greater than 1 micron, 0.039, 0.79, 0.15, 0.31, 0.63, 1.2, 1.9 or 2.5 cm (1 micron, 1/64, 1/32, 1/16, 1/8, 1/4, 1/2, 3/4, or 1 inch), wherein at least 50, 60, 70, 80, 90, 91, 92, 93, 94, 95, 96, 97, 98, or 99% and up to 100% by area or number of the cage apertures 0416 have an equivalent spherical diameter equal to or less than 200 micron, 0.79, 0.15, 0.31, 0.63, 1.2, 1.9 or 2.5 cm (1/64, 1/32, 1/16, 1/8, 1/4, 1/2, 3/4, or 1, 2 inch), or a combination thereof, wherein the equivalent spherical diameter of an aperture is the diameter of a circle having the same area as the aperture;

wherein the dissolution vessel comprises a solids discharge outlet 0412, and wherein the solids discharge outlet 0412, the at least one feed inlet 0408 are configured (e.g., positioned and oriented) so that a single conveyor 0602 (e.g., belt conveyor, endless conveyor, auger) can convey material to the at least one feed inlet and remove material from the solids discharge outlet 0412 of the dissolution vessel 0102;

wherein a solids discharge outlet 0412 and the at least one feed inlet 0408 are configured (e.g., positioned and oriented) so that a solids conveyor 0602 (e.g., belt conveyor, endless conveyor, auger) does not need to be provided at a first end

0442 of the dissolution vessel adjacent to the at least one feed inlet 0408 and a second end 0444 of the dissolution vessel adjacent to a solids discharge outlet 0412 and opposite the first end 0442 of the dissolution vessel;

wherein a solids discharge outlet 0412 is located at a first end 0442 of the dissolution vessel 0102 and wherein the at least one feed inlet 0408 is also located at the first end 0442 of the dissolution vessel 0102;

wherein a solids discharge outlet 0412 is located adjacent to the at least one feed inlet 0408;

wherein the dissolution vessel 0102 comprises an angle of title, optionally wherein the dissolution vessel comprises a tilt actuator 0426 configured to tilt the dissolution vessel 0102, the cage 0414, an inlet of the dissolution vessel, an outlet of the dissolution vessel, an inlet of the cage, and outlet of the cage, or a combination thereof (e.g., to facilitate loading the bitumen-containing materials into the dissolution vessel and/or cage, to facilitate discharging any undissolved portion of the bitumen-containing materials from the dissolution vessel and/or cage), optionally wherein the dissolution vessel 0102, the cage 0414, an inlet of the dissolution vessel, an outlet of the dissolution vessel, an inlet of the cage, and outlet of the cage, or a combination thereof can tilt over a range that comprises or consists of tilting from horizontal, 1, 2, 3, 4, 5, 10, 15, 20, 25, 30, 45, 60, or 90 degrees above horizontal, tilting up to 1, 2, 3, 4, 5, 10, 15, 20, 25, 30, 45, 60, 90 or any degrees above horizontal, tilting from horizontal, 1, 2, 3, 4, 5, 10, 15, 20, 25, 30, 45, 60, or 90 degrees below horizontal, tilting to 2, 3, 4, 5, 10, 15, 20, 25, 30, 45, 60, or 90 degrees below horizontal, or a combination thereof;

wherein the apparatus 0400 comprises a discharge hopper 0604, optionally wherein the discharge hopper is configured to receive a solids-rich stream 0168, 0182 or mixed-materials stream 0156 from a solids discharge outlet 0412 (e.g., the solids discharge outlet 0412 for the larger solid objects retained inside the cage, the general solids discharge outlet 0412 for all contents of the cage 0414, the dissolution vessel 0102 or a combination thereof), inside of the cage 0414, inside the dissolution vessel 0102; optionally wherein the discharge hopper 0604 is configured to deliver the solids-rich stream 0168, 0182 or mixed-materials stream to a solids conveyor 0602, a dryer 0114, 0116, a mixed-materials conveyor, a solid-liquid separator 0104 or a combination thereof;

wherein the apparatus 0400 comprises a discharge housing 0428, optionally wherein the discharge housing 0428, in conjunction with a discharge hopper 0604, is configured to enclose (e.g., substantially, essentially completely, or completely) a solids discharge outlet 0412 (e.g., the solids discharge outlet 0412 for the larger solid objects retained inside the cage, the general solids discharge outlet 0412 for all contents of the dissolution vessel 0102), optionally wherein the interface of the discharge hopper 0604 and the discharge housing 0428 is sealed (e.g., using a gasket, seal, etc., which can be made of Teflon, rubber, etc.);

wherein the apparatus 0400 comprises a feed hopper 0606, optionally wherein the feed hopper 0606 is configured to receive bitumen-containing materials 0150 from the conveyor 0602 (e.g., solids conveyor), optionally wherein the feed hopper is configured to deliver the bitumen-containing materials 0150 to the feed inlet 0408 of the dissolution vessel 0102, inside the cage 0414, inside the dissolution vessel 0102, or a combination thereof;

wherein the apparatus 0400 comprises a vacuum source 0702 in fluid communication with the dissolution vessel 0102; optionally wherein the vacuum source 0702 is configured to provide a vacuum (e.g., at least 3, 10, 20, 30, 40, 50, 60, 70, 80, 90, 100 kPa, less than 101.325, 90, 80, 70, 68, 60, 50, 40, 30, 20, or 10 kPa, or a combination thereof) in the dissolution vessel 0102 and increase the rate of evaporation of the at least one solvent inside the dissolution vessel 0102; optionally wherein the vacuum source 0702 is configured to provide the vacuum in the dissolution vessel 0102 while the cage 0414 rotates to enhance the rate of evaporation of the at least one solvent inside the dissolution vessel 0102; optionally wherein the vacuum source 0702 is configured to provide the vacuum in the dissolution vessel 0102 while the contents of the dissolution vessel 0102 are heated; optionally wherein the vacuum source is selected from a pump, a fan, a compressor or a combination thereof;

wherein the apparatus comprises a heater (e.g., solvent heater 0190, dissolution vessel heater 0192) configured to heat the contents of the dissolution vessel 0102; optionally wherein the heater is configured to provide the contents of the dissolution vessel 0102 (e.g., as measured in the vapor space, as measured in a pool of liquid 0808 in the dissolution vessel 0102, as measured in the contents of the catch basin 0410, as measured in the mixed-materials stream 0156 leaving the dissolution vessel 0102, or a combination thereof) at a desired temperature (e.g., at least 25, 30, 35, 40, 45, 50, 60, 70, 80 90, 100° C., no more than 200, 195, 190, 185, 180, 175, 170, 160, 150, 140, 130, 120, 110, 100° C., or a combination thereof) and increase the rate of evaporation of the at least one solvent inside the dissolution vessel 0102; optionally wherein the heater is configured to provide the desired temperature for the contents in the dissolution vessel 0102 while the cage 0414 rotates to enhance the rate of evaporation of the at least one solvent inside the dissolution vessel 0102; optionally wherein the heater is configured to maintain the desired temperature in the dissolution vessel 0102 while a vacuum is provided inside the dissolution vessel 0102, optionally wherein the heater comprises a heating jacket for a tank, the dissolution vessel, or a conduit, optionally wherein the heater comprises a heat exchanger, burner, jacket, hot fluid jacket, hot-liquid jacket, hot-water jacket, hot gas jacket, steam jacket or combination thereof);

wherein the cage 0414 is configured to receive the bitumen-containing materials 0150 in a loading configuration of the cage 0414, to partially contain the bitumen-containing materials 0150 in a loaded configuration of the cage 0414 and to rotate within the dissolution vessel 0102 while in the loaded configuration;

wherein the tumbler 0404 is configured to increase the wetted area of the bitumen-containing materials 0150 by disturbing components of the bitumen-containing materials 0150 having adjacent surfaces that are packed closely enough to impede wetting by the at least one solvent (e.g., the first solvent, the second solvent, the plurality of solvents, or a combination thereof);

wherein the tumbler 0404 facilitates wetting an increased surface area of the bitumen-containing materials 0150, wherein the increased surface area of the bitumen-containing materials 0150 is greater than a reference surface area that would be wetted if the bitumen-containing materials 0150 were placed in the same dissolution vessel 0102 without a cage 0414;

wherein the tumbler 0404 facilitates the introduction of space between directly adjacent surfaces of the bitumen-containing materials 0150 to enable the at least one solvent to contact the directly adjacent surfaces;

wherein the tumbler 0404 or cage 0414 comprises at least one paddle, optionally to lift portions of the bitumen-containing materials 0150 on a leading surface 1210 of the paddle and then release the bitumen-containing materials 0150 to fall, optionally wherein the tumbler (e.g., at least one paddle or plurality of paddles) is configured (e.g., the at least one paddle or plurality of paddles are positioned, oriented and arranged relative to each other, the axis 1206 of rotation (e.g., of the cage 0414), and the dissolution vessel 0102) so that rotating the at least one paddle in a first direction causes the at least one paddle to exert a first paddle force (e.g., loading force) on the bitumen-containing materials 0150 inside the cage 0414, wherein the first paddle force causes the bitumen-containing materials 0150 to move in a first direction along the axis 1206 of rotation (e.g., away from an inlet of the cage 0414, the dissolution vessel 0102 or a combination thereof), and optionally wherein the tumbler (e.g., the at least one paddle or plurality of paddles are configured (e.g., positioned, oriented and arranged relative to each other, the axis 1206 of rotation, and the dissolution vessel 0102) so that rotating the at least one paddle in a second direction (e.g., opposite the first direction) causes the at least one paddle to exert a second paddle force (e.g., unloading force) on the bitumen-containing materials 0150 inside the cage 0414, wherein the second paddle force causes the bitumen-containing materials 0150 (e.g., any remnant of the bitumen-containing materials remaining in the cage, for example, an undissolved portion of the bitumen-containing materials, cellulose, fiber glass, etc.) to move in a second direction along the axis 1206 of rotation (e.g., toward an outlet (e.g., solids discharge outlet 0412) of the cage 0414, the dissolution vessel 0102, or a combination thereof), optionally wherein the solids discharge outlet 0412 of the cage is configured to discharge any remnant (e.g., an undissolved portion) of the solid bitumen-containing materials remaining in the cage;

wherein the cage 0414 is rotatably mounted to the dissolution vessel 0102, optionally wherein the cage has an axis 1206 of rotation located within the dissolution vessel 0102, optionally wherein cage is approximately cylindrically shaped, optionally wherein the dissolution vessel comprises a portion that is approximately cylindrically shaped, optionally wherein the cage has an axis 1206 of rotation that is concentric with a central axis of a portion (e.g., approximately cylindrically shaped portion) of the dissolution vessel where the cage is located to within 30, 25, 20, 15, 10, 5, 4, 3, 2, or 1% of the length of the radius of the portion of the dissolution vessel;

wherein the tumbler 0404 comprises a rotation actuator 0434 to rotate the cage 0414 relative to the dissolution vessel;

wherein the tumbler 0404 comprises a shaft 0502 configured to provide an axis 1206 of rotation for the cage 0414, optionally wherein the tumbler 0404 comprises a rotation actuator 0434 (optionally mounted to the dissolution vessel) to rotate the shaft 0502 and thereby rotate the cage 0414, optionally wherein the shaft 0502 is configured to support the cage 0414 as the cage rotates, optionally wherein the shaft 0502 is rotated by a rotation actuator 0434 and wherein the cage 0414 is fixed to the shaft;

wherein the shaft, the cage, or a combination thereof is rotatably mounted to dissolution vessel 0102 (e.g., through the rotation actuator 0434);

wherein the cage 0414 is supported from above or below the cage;

wherein the cage 0414 is supported by a roller or rollers 2002;

wherein one, a selection of, or each of the solvent distributors 0406 in the at least one solvent distributor 0406 comprises: (i) a conduit 0422 in fluid communication with a solvent source, (ii) a conduit 0422 for at least one solvent stream, or a combination thereof; optionally wherein the solvent source is selected from the group consisting of a first solvent source, a second solvent source, a third solvent source, a fourth solvent source, a fifth solvent source, a solvent source for a plurality of solvents, solvent storage system 0194, first solvent storage system 0294, second solvent storage system 0394, make-up solvent storage system 0196, make-up first solvent storage system 0296, make-up second solvent storage system 0396, recirculating solvent storage system 0186, recirculating first solvent storage system 0286, recirculating second solvent storage system 0386, and a combination thereof, optionally wherein any storage system comprises a tank, tanks, a vessel, vessels, a container, containers, a basin, basins, or a combination thereof;

wherein the at least one solvent distributor 0406 comprises a first-solvent distributor, a second-solvent distributor, a conduit 0422 (e.g., pipe, duct, or combination thereof), a nozzle 0438, an aperture 0436, or a combination thereof.

wherein the first-solvent distributor comprises (i) a conduit 0422 in fluid communication with a first solvent source, (ii) a nozzle 0438 to spray the first solvent into contact with the bitumen-containing materials 0150, or a combination thereof;

wherein the second-solvent distributor comprises (i) a conduit 0422 in fluid communication with a second solvent source, (ii) a nozzle 0438 to spray the second solvent into contact with the bitumen-containing materials 0150, or a combination thereof;

wherein one, a selection of, or all of the solvent distributors 0406 in the at least one solvent distributor 0406 comprise a nozzle to spray one, a selection of, or all of the solvents in the at least one solvent onto the bitumen-containing materials 0150;

and a combination thereof.

3. A system 0101 comprising the apparatus 0400 of clause 1 or 2, the system comprising:

a solid-liquid separator 0104 configured to receive the mixed-materials stream 0156 from the at least one discharge outlet 0412, 0424, wherein the solid-liquid separator 0104 is configured to separate the mixed-materials stream 0156 into a liquid-rich stream (e.g., the solvent-and-bitumen-rich stream 0158) comprising liquid 0808 from the mixed-materials stream 0156 and a solids-rich stream 0174 comprising solids 0806 from the mixed-materials stream 0156; and at least one solvent-fraction separator 0108, wherein the at least one solvent-fraction separator 0108 is configured to separate the liquid-rich stream into a solvent-rich stream 0180 comprising the at least one solvent and a bitumen-rich stream 0184 comprising the at least one fraction.

4. The system 0101 of clause 3, wherein the system comprises an element selected from the group consisting of:

a conveyor for the liquid-rich stream (e.g., pump 0420) in fluid communication with the at least one solvent distributor 0406, wherein the conveyor for the liquid-rich stream (e.g., solvent-and-bitumen-rich stream 0158) is configured to receive the liquid-rich stream (e.g., through a conduit 0422, from the solid-liquid separator 0104, or a combination thereof) and convey the liquid-rich stream (e.g. through a conduit 0422) to the at least one solvent distributor 0406, optionally wherein the conveyor for the liquid-rich stream is configured to continuously recirculate the liquid-rich stream to the at least one solvent distributor 0406 from the solid-liquid separator 0104;

a conveyor for the solvent-rich stream (e.g., pump 0420) in fluid communication with the at least one solvent distributor 0406, wherein the conveyor for the solvent-rich stream (e.g., solvent-rich stream 0180, first-solvent-rich stream 0280, second-solvent-rich stream 0380, or a combination thereof) is configured to receive the solvent-rich stream 0180, 0280, 0380 (e.g., through a conduit 0422, from the at least one solvent-fraction separator 0108, or a combination thereof) and convey the solvent-rich stream (e.g. through a conduit 0422) to the at least one solvent distributor 0406, optionally wherein the conveyor for the solvent-rich stream is configured to continuously recirculate the solvent-rich stream to the at least one solvent distributor 0406 from the at least one solvent-fraction separator 0108;

a dryer 0114, 0116 (e.g., larger-solids dryer 0114, smaller-solids dryer 0116, solids dryer 0116, general purpose dryer 0116, or a combination thereof), optionally wherein the dryer 0114, 0116 receives a solids-rich stream 0168, 0169, (e.g., smaller-solids rich stream 0169, larger-solids-rich stream 0168, or combination thereof), discharges a dried solids-rich stream 0170, 0176 (e.g., dried smaller-solids rich stream 0176, dried larger-solids-rich stream 0170, or combination thereof), and optionally discharges a solvent-rich stream 0172, 0178 from the dryer (e.g., a solvent-rich stream 0172 from the smaller-solids dryer 0116, a solvent-rich stream 0178 from the larger-solids dryer 0114, or a combination thereof);

wherein the at least one solvent-fraction separator 0108 comprises a filter (e.g., porous material, membrane, screen, etc.), solvent-fraction heater 0106, a pressure reducer (e.g., flash valve 1806), a flash drum 0109, a bottoms pump 1802, a recirculation heater 1804, or a combination thereof, optionally wherein the system is configured to convey fluid from one unit to the next unit in the listed order, optionally wherein the filter is configured to remove undesired material (e.g., fine solids) from the solvent-and-bitumen rich stream to provide a filtered solvent-and-bitumen-rich stream for feeding to downstream components of the solvent-fraction separator 0108, optionally wherein the solvent-fraction heater 0106 is configured to receive a solvent-and-bitumen-rich stream 0158 (e.g., the liquid-rich stream from the solid-liquid separator 0104) and provide a heated solvent-and-bitumen-rich stream 0160 (e.g., heated liquid-rich stream), optionally wherein the pressure reducer (e.g., flash valve 1806) is configured to receive the solvent-and-bitumen-rich stream 0158 (whether heated or not) and reduce the pressure of the solvent-and-bitumen-rich stream to provide a reduced-pressure-solvent-and-bitumen-rich stream (e.g., saturated solvent-and-bitumen-rich stream, saturated stream), optionally wherein the flash drum 0109 is configured to receive the solvent-and-bitumen-rich stream 0160 (whether heated or not) from the pressure reducer (e.g. flash valve 1806) and provide (e.g., separate) a bitumen-rich stream 0182, 0184, 0204, 0304 (e.g., liquid phase) and a solvent-rich stream 0180, 0280, 0380 (e.g., vapor phase), optionally wherein the at least one solvent-fraction separator 0108 comprises a flash drum 0109, optionally wherein the flash drum is configured to receive a solvent-and-bitumen-rich stream 0158 directly from the solid-liquid separator 0104 and through the pressure reducer (e.g., flash valve 1806), optionally wherein the bottoms pump 1802 is configured to receive a bitumen-rich stream 0182,0184, 0204, 0304 from the flash drum 0109 and the bottoms pump and the system (e.g., through a conduit, valve, or combination thereof) are configured to convey a portion (e.g., first portion, second portion, etc.) or all the bitumen-rich stream to the recirculation heater 1804, the flash drum 0109 (e.g., via the recirculation heater 1804), a bitumen storage system 0112, the dissolution vessel 0102 (e.g., via the at least one solvent distributor), or a combination thereof, and optionally wherein the recirculation heater 1804 is configured to receive a first portion of the bitumen-rich stream 0182, 0184, 0204, 0304 from the bottoms pump 1802 and discharge a heated bitumen-rich stream 0182, 0184, 0204, 0304 to the flash drum 0109, optionally wherein the bottoms pump 1802 and the system (e.g., through a conduit, valve, or combination thereof) are configured to convey a second portion of the bitumen-rich stream to a heat treater 0110, a bitumen storage system 0112, or a combination thereof;

a bitumen-storage system 0112 for storing bitumen (e.g., from the at least one solvent-fraction separator 0108, from the heat treater 0110, or a combination thereof);

a larger solids storage system 0118 for storing solids or larger solids retained by (e.g., that cannot pass through the cage apertures of) the cage (e.g., fiberglass, cellulose, metals, gravel, granules, aggregate, sand or a combination thereof);

a smaller solids storage system 0120 for storing solids or larger solids provided by (e.g., retained by a screen of) the solid-liquid separator (e.g., sand, gravel, granules, aggregate, metal, fiberglass, cellulose or a combination thereof);

a recirculating solvent storage system 0186 (e.g., a recirculating first-solvent storage system 0286, a recirculating second-solvent storage system 0386, or combination thereof) for storing solvent that has been separated from a process stream discharged from the at least one solvent-fraction separator 0108 (e.g., solvent-rich stream 0180, first-solvent-rich stream 0280, second-solvent-rich stream 0380, or combination thereof); for storing solvent discharged from the smaller solids dryer 0116 (e.g., solvent-rich stream 0178, first-solvent-rich stream 0278, second-solvent-rich stream 0378, or combination thereof); for storing solvent discharged from the larger solids dryer 0114 (e.g., solvent-rich stream 0172, first-solvent-rich stream 0272, second-solvent-rich stream 0372, or combination thereof); solvent that has been separated from any process stream described herein; or a combination thereof;

a make-up solvent storage system 0196 (e.g., make-up first solvent storage system 0296, make-up second solvent storage system 0396, or combination thereof) to provide a source for the make-up solvent stream 0154, make-up first solvent stream 0254, make-up second solvent stream 0354, or a combination thereof;

a solvent storage system 0194 (e.g., a first-solvent storage system 0294, a second-solvent storage system 0394, or a combination thereof) to provide a source for the solvent stream 0152, first-solvent stream 0202, second-solvent stream 0302, or a combination thereof;

a solvent heater 0190 (e.g., a first-solvent heater 0290, a second-solvent heater 0390, or a combination thereof) to heat the at least one solvent stream 0152, first-solvent stream 0202, second-solvent stream 0302, or a combination thereof and optionally provide the solvent stream 0152, first-solvent stream 0202, second-solvent stream 0302, or a combination thereof at a desired temperature equal to at least 25, 40, 45 or 80° C., no more than 200, 190, 180, 170, 160, 150, 125, 100, 90, 80, 70, 60, or 50° C., or a combination thereof;

a dissolution vessel heater 0192 to heat the dissolution vessel 0102, the contents of the dissolution vessel, or a combination thereof, optionally to a desired temperature equal to at least 25, 40, 45 or 80° C., no more than 200, 190, 180, 170, 160, 150, 125, 100, 90, 80, 70, 60, or 50° C., or a combination thereof;

insulation for one, a selection of, or all process units (including, e.g., storage systems) described herein;

optionally, wherein the solid-liquid separator 0104 comprises at least one screen 0802 (e.g., to receive the mixed-materials stream 0156 from the at least one mixed-materials discharge outlet 0424); optionally, wherein the at least one screen 0802 comprises screen apertures 0804 configured to retain larger solid objects from the bitumen-containing materials 0150 that cannot pass through the screen apertures 0804 while allowing liquid 0808 and smaller solid objects from the mixed-materials stream 0156 to pass through the screen apertures 0804; optionally, wherein the at least one screen 0802 comprises screen apertures 0804 configured to retain solid objects (e.g., larger solid objects, smaller solid objects, or a combination thereof) from the bitumen-containing materials 0150 that cannot pass through the screen apertures 0804 while allowing liquid 0808 (e.g., from the mixed-materials stream 0156) to pass through the screen apertures 0804, optionally wherein the solids-rich stream comprises at least a portion (e.g., all, substantially all, most, or at least 90, 80, 70, 60, 50, 40, 30, 20 or 10 wt. %) of the solid objects (e.g., larger solid objects, smaller solid objects, or a combination thereof) and wherein the liquid-rich stream comprises at least a portion (e.g., all, substantially all, most or at least 90, 80, 70, 60, 50, 40, 30, 20, or 10 wt. %) of the liquid;

optionally wherein the at least one mixed-materials discharge outlet 0424 comprises a plurality of discharge outlets 0424 and the at least one screen 0802 comprises a plurality of screens 0802; optionally wherein the solid-liquid separator 0104 is configured to receive a mixed materials stream 0156 from a mixed-materials discharge outlet 0424, a solids discharge outlet 0412, or a combination thereof; optionally wherein the solid-liquid separator 0104 is configured to receive a mixed materials stream 0156 from a plurality of discharge outlets in the at least one discharge outlet 0412, 0424; optionally wherein the solid-liquid separator 0104 is configured to receive a mixed materials stream 0156 from each discharge outlet in the at least one discharge outlet 0412, 0424; optionally wherein at least 50, 60, 70, 80, 90, 91, 92, 93, 94, 95, 96, 97, 98, or 99% and up to 100% by area or number of the screen apertures 0804 for one, a plurality of, or each screen 0802 have an equivalent spherical diameter equal to or greater than 1 micron, 0.039, 0.79, 0.15, 0.31, 0.63, 1.2, 1.9 or 2.5 cm (1 micron, 1/64, 1/32, 1/16, 1/8, 1/4, 1/2, 3/4, or 1 inch), wherein at least 50, 60, 70, 80, 90, 91, 92, 93, 94, 95, 96, 97, 98, or 99% and up to 100% by area or number of the screen apertures 0804 for one, a plurality of, or each screen 0802 have an equivalent spherical diameter equal to or less than 200 micron, 0.79, 0.15, 0.31, 0.63, 1.2, 1.9 or 2.5 cm (1/64, 1/32, 1/16, 1/8, 1/4, 1/2, 3/4, or 1, 2 inch); optionally wherein the equivalent spherical diameter of at aperture is the diameter of a circle having the same area as the aperture; optionally wherein the average equivalent spherical diameter, screen size, mesh size or aperture size of the screen apertures 0804 for one, a plurality of, or each screen 0802 is smaller than the corresponding average equivalent spherical diameter, screen size, mesh size or aperture size of the cage apertures 0416;

a flow restrictor 0440 (e.g., valve, ball valve, hemispherical valve, gate valve, gate, sliding gate, rotary gate, hinged gate or a combination thereof) in fluid communication with the at least one mixed-materials discharge outlet 0424 and configured to restrict a flow of the mixed-materials stream 0156 from the at least one discharge outlet 0424;

at least one mixed-materials tank to receive the mixed-materials stream 0156 from the catch basin 0410;

wherein the solid-liquid separator 0104 comprises a screen 0802 (e.g., vibratory screen), a solvent filter, a centrifugal separator, or a combination thereof;

wherein the solid-liquid separator 0104 is configured to receive the mixed-materials stream 0156 from the at least one discharge outlet 0412, 0424 (e.g., at least one mixed-materials discharge outlet 0424) and wherein the solid-liquid separator 0104 is configured to separate the mixed-materials stream 0156 into a solids-rich stream 0174 (e.g., gravel, granules, aggregate, sand, fiberglass, cellulose, metal, nails or a combination thereof) and liquid-rich stream (e.g., the at least one solvent, the at least one fraction, and any solids 0806 that are small enough to pass through the solid-liquid separator 0104); optionally wherein the solid-liquid separator 0104 is configured so that the liquid-rich stream is reintroduced into the dissolution vessel 0102 to provide a recirculating solvent-and-bitumen-rich stream 0188, optionally wherein the solid-liquid separator 0104 is configured so that the solids-rich stream 0174 is discarded or further processed to separate the solids-rich stream 0174 into solid-rich fractions to provide a plurality of solid product streams in the at least one product stream 0182;

optionally wherein the solid-liquid separator 0104 comprises a screen 0802, wherein the screen 0802 is configured to retain a retentate of the screen 0802 (e.g. solids-rich stream 0174, stream comprising solids 0806 from the mixed-materials stream 0156, gravel, granules, aggregate, sand, fiberglass, cellulose, metal, nails or a combination thereof) and wherein the screen 0802 is configured to pass a permeate of the screen 0802 (e.g., solvent-and-bitumen-rich stream 0185, stream comprising liquid 0808 (e.g., the at least one solvent and the at least one fraction), any solids 0806 that are small enough to pass through the screen 0802 or a combination thereof); optionally wherein the screen 0802 is configured so that the permeate of the screen 0802 is reintroduced into the dissolution vessel 0102 to provide a recirculating solvent-and-bitumen-rich stream 0188; optionally wherein the screen 0802 is configured so that the retentate of the screen 0802 is discarded or further processed to separate the retentate of the screen 0802 into retentate fractions to provide at least one product stream 0182;

wherein the system 0101 is configured to separate at least one product stream 0182 (e.g., bitumen stream, maltene-rich bitumen stream, asphaltene-rich bitumen stream, first fraction, second fraction or a combination thereof) from the mixed-materials stream 0156;

wherein the system 0101 comprises a heat treater 0110 configured to heat the at least one product stream 0182 (e.g., bitumen-rich stream 0184) to provide a heat-treated product stream (e.g., heat-treated bitumen-rich stream 0164, heat-treated first-fraction-rich stream, heat-treated second-fraction-rich stream), optionally wherein the at least one product stream 0182 is heated to at least 204, 232, 260, 287, 315 or 343° C., to within 0.28° C. of the listed temperature, to no more than 233, 260, 288, 316, 344 or 372° C., or a combination thereof to provide the heat-treated product stream, optionally wherein the heat treater 0110 comprises a heat treat container (e.g., tank, etc.), optionally wherein at least one surface (e.g., wall) of the heat treat container is in contact with the at least one product and is heated to at least 260, 287, 315 or 343° C., to no more than 288, 316, 344 or 372° C., or a combination thereof, optionally wherein the heat treater is configured to agitate (e.g., mix, stir, etc., for example, using an impeller, stirrer, etc.) the at least one product stream 0182 while the at least one product stream is heated by the heat treater 0110;

wherein the at least one solvent-fraction separator 0108 is selected from the group consisting of: at least one solvent extractor, at least one fraction extractor, or a combination thereof;

wherein the at least one solvent-fraction separator 0108 is at least one solvent extractor (e.g., flash drum, distillation column, etc.), optionally, wherein the at least one solvent extractor is configured to separate a solvent-rich stream 0180 (e.g., the at least one solvent, the first solvent, the second solvent, the plurality of solvents, or combination thereof) from the mixed-materials stream 0156 comprising the at least one solvent, the at least one fraction, smaller solid objects from the bitumen-containing materials 0150 that have passed through the cage apertures 0416 and any screen apertures 0804, or a combination thereof; optionally wherein the at least one solvent extractor is configured to separate the solvent-rich stream 0180 from the permeate of the solid-liquid separator 0104, optionally wherein the separated portion of the mixed-materials stream 0156 or the separated portion of the permeate of the solid-liquid separator 0104 is reintroduced into the dissolution vessel 0102 to provide a recirculating solvent stream; optionally wherein the at least one solvent separator comprises a flash drum; optionally wherein the flash drum is configured to provide a flashed vapor stream that is the solvent-rich stream 0180 and a flashed liquid stream that is one of the at least one product stream 0182, a first-fraction-rich stream 0204, a second-fraction-rich stream 0304, a bitumen-rich stream 0184, a maltene-rich stream, an asphaltene rich stream, or a combination thereof; optionally wherein the remaining portion of the mixed-materials stream 0156 or the remaining portion of the permeate of the solid-liquid separator 0104 provides one of the at least one product stream 0182, a fraction rich stream (e.g., a bitumen-rich stream 0184, maltene-rich stream, asphaltene-rich stream, or combination thereof), or a combination thereof;

wherein the at least one solvent-fraction separator 0108 is at least one fraction extractor, wherein the at least one fraction extractor is configured to separate one of the at least one product streams 0182, a bitumen-rich stream 0184 (e.g., a first-fraction-rich stream 0204, a second-fraction-rich stream 0304, a maltene-rich stream, an asphaltene-rich stream, or combination thereof), or a combination thereof from a mixed-materials stream 0156 comprising the at least one solvent, the at least one fraction, smaller solid objects from the bitumen-containing materials 0150 that have passed through the cage apertures 0416 and any screen apertures 0804, or a combination thereof; optionally wherein the at least one fraction separator is configured to separate a bitumen-rich stream 0184, maltene-rich stream, asphaltene-rich stream, or combination thereof from the permeate of the solid-liquid separator 0104; optionally wherein the remaining portion of the mixed-materials stream 0156 or the remaining portion of the permeate of the solid-liquid separator 0104 is reintroduced into the dissolution vessel 0102 to provide a recirculating solvent stream;

a separator or plurality of separators, optionally wherein the separator or each separator in the plurality of separators is selected from the group consisting of: a solid-solid separator, the solid-liquid separator 0104, a solid-gas separator, a liquid-liquid separator, a liquid-gas separator, a gas-gas separator, a magnetic separator, a size-based separator, a density-based separator, a solvent-based separator, a chemical separator, an electric-charge-based separator, and a combination thereof;

wherein the solid-solid separator, the solid-liquid separator 0104, the solid-gas separator, and a combination thereof is each selected from the group consisting of: a magnetic separator, a size-based separator, a density-based separator, a solvent-based separator, a chemical separator, an electric-charge-based separator, and a combination thereof;

wherein the liquid-liquid separator, the liquid-gas separator, the gas-gas separator and a combination thereof is each selected from the group consisting of: a size-based separator, a density-based separator, a solvent-based separator, a chemical separator, an electric-charge-based separator, and a combination thereof;

wherein the magnetic separator uses a magnetic field to attract or repel magnetic fractions to separate the magnetic fractions from other magnetic fractions or nonmagnetic fractions;

wherein the size-based separator is each selected from the group consisting of: a screen 0802, a filter, and a combination thereof;

wherein the density-based separator is selected from the group consisting of: a gravity-based settler, a density-based phase separator, a centrifugal separator, and a combination thereof;

wherein the solvent-based separator adds a solvent to fractions comprising a solute and other fractions, thereby dissolving the solute in the solvent to permit the separation of the solute and solvent from the other fractions;

wherein the chemical separator is fed fractions comprising a reagent and other fractions and wherein the chemical separator causes a chemical reaction (e.g., reversible or irreversible) involving the reagent to produce a chemical product and separates the chemical product from the other fractions;

wherein the electric-charge-based separator uses an electromagnetic field, electric field, magnetic field, or combination thereof to attract or repel a charged molecule and separate the charged molecule from other fractions having different charges;

wherein the density-based phase separator uses differences in the densities of gas, fluid and solid phases to separate the phases into phase layers with each phase layer being arranged from top to bottom in order of smallest to largest density, optionally wherein the phase separator comprises a two-phase separator for separating a first phase (e.g., liquid phase, vapor phase, or solid phase) from a second phase (e.g., liquid phase, vapor phase, or solid phase) with a different density, so that a first outlet is configured to receive material from the first phase and a second outlet is configured to receive material from the second phase;

and a combination thereof.

5. A method 0100 for separating bitumen-containing materials 0150 to provide at least one product stream 0182, wherein the at least one product stream 0182 comprises a bitumen-rich stream 0184, wherein the bitumen-rich stream 0184 comprises at least one fraction selected from the group consisting of asphaltenes, maltenes and a combination thereof, the method comprising:

contacting 0902 the bitumen-containing materials 0150 with at least one solvent (e.g., in at least one solvent stream 0152) while optionally agitating the bitumen-containing materials 0150, wherein the bitumen-containing materials 0150 comprise the at least one fraction, and wherein the at least one fraction is soluble in the at least one solvent;

separating 0904 the bitumen-containing materials 0150 to provide a solvent-and-bitumen-rich stream 0158 comprising a separated portion of the at least one solvent and the at least one fraction dissolved in the separated portion of the at least one solvent;

separating 0908 the solvent-and-bitumen-rich stream 0158 to provide the bitumen-rich stream 0184 comprising the at least one fraction (e.g., from the solvent-and-bitumen-rich stream), which can optionally be at least a portion (e.g., 10 to 100, 20 to 100, 30 to 100, 40 to 100, 50 to 100, 60 to 100, 70 to 100, 80 to 100, 90 to 100, or 95 to 100% by weight) of a total amount of materials equivalent to the at least one fraction in the solvent-and-bitumen-rich stream 0158, optionally wherein the bitumen-rich stream comprises at least 1, 2, 3, 4, 5, 6, 7, 8, 9, 10, 20, 30, 40, 50, 60, 70, 80, 90, 91, 92, 93, 94, 95, 96, 97, 98, or 99 wt. % and up to 100 wt. % bitumen.

6. A method 0200 for separating bitumen-containing materials 0150 to provide at least one product stream 0182, wherein the bitumen-containing materials 0150 comprise a first fraction and optionally a second fraction, and wherein the at least one product stream 0182 comprises a first-fraction-rich stream 0204 comprising the first fraction and optionally a second-fraction-rich stream 0304 comprising the second fraction, the method comprising:

contacting 1002 the bitumen-containing materials 0150 with a first solvent (e.g., in a first-solvent stream 0202), wherein the first fraction is soluble in the first solvent, and wherein the first fraction comprises maltenes, asphaltenes, or a combination thereof, optionally wherein the first fraction comprises at least 1, 2, 3, 4, 5, 6, 7, 8, 9, 10, 20, 30, 40, 50, 60, 70, 80, 90, 91, 92, 93, 94, 95, 96, 97, 98, or 99 wt % and optionally up to 100 wt. % maltenes, asphaltenes or a combination thereof;

separating 1004 the bitumen-containing materials 0150 to provide a first-solvent-and-first-fraction-rich stream 0258 and a remaining portion 0250, 350 of the bitumen-containing materials 0150 (e.g., first remaining portion 0250 of the bitumen-containing materials 0150), wherein the first-solvent-and-first-fraction-rich stream 0258 comprises a separated portion of the first solvent and the first fraction dissolved in the separated portion of the first solvent;

separating 1008 the first-solvent-and-first-fraction-rich stream 0258 to provide the first-fraction-rich stream 0204, optionally wherein the first-fraction-rich stream comprises a greater mass concentration of maltenes, asphaltenes or a combination thereof than was present in the bitumen-containing materials, optionally wherein the first-fraction-rich stream comprises at least 1, 2, 3, 4, 5, 6, 7, 8, 9, 10, 20, 30, 40, 50, 60, 70, 80, 90, 91, 92, 93, 94, 95, 96, 97, 98, or 99 wt. % and optionally up to 100 wt. % maltenes, asphaltenes or a combination thereof;

optionally contacting 1012 the remaining portion 0250, 350 (e.g., the first remaining portion 0250) of the bitumen-containing materials 0150 with a second solvent (e.g., in a second-solvent stream 0302), wherein the remaining portion 0250, 350 (e.g., the first remaining portion 0250) of the bitumen-containing materials 0150 comprises the second fraction, wherein the second fraction is soluble in the second solvent, and wherein the second fraction comprises asphaltenes, maltenes, or a combination thereof, optionally wherein the second-fraction-rich stream comprises a greater mass concentration of asphaltenes, maltenes or a combination thereof than was present in the bitumen-containing materials, optionally wherein the second fraction comprises at least 1, 2, 3, 4, 5, 6, 7, 8, 9, 10, 20, 30, 40, 50, 60, 70, 80, 90, 91, 92, 93, 94, 95, 96, 97, 98, or 99 wt. % and optionally up to 100 wt. % asphaltenes, maltenes or a combination thereof;

optionally separating 1014 the remaining portion 0250, 350 (e.g., first remaining portion 0250) of the bitumen-containing materials 0150 to provide a second-solvent-and-second-fraction-rich stream 0358 comprising a separated portion of the second solvent and the second fraction dissolved in the separated portion of the second solvent; and optionally separating 1018 the second-solvent-and-second-fraction-rich stream 0358 to provide the second-fraction-rich stream 0304, optionally wherein the second-fraction-rich stream comprises at least 1, 2, 3, 4, 5, 6, 7, 8, 9, 10, 20, 30, 40, 50, 60, 70, 80, 90, 91, 92, 93, 94, 95, 96, 97, 98, or 99 wt. % and optionally up to 100 wt. % asphaltenes, maltenes or a combination thereof.

7. The method of clause 5 or 6, wherein the method comprises an element selected from the group consisting of:

wherein separating 1014 the remaining portion (e.g., the first remaining portion of the bitumen-containing materials 0150 with a second solvent comprises: providing a second remaining portion 0350 of the bitumen-containing materials 0150;

wherein the first fraction, the first solvent or a combination thereof is soluble in the second solvent;

wherein the second-solvent-and-second-fraction-rich stream 0358 comprises a separated portion of the second solvent, the second fraction dissolved in the separated portion of the second solvent, the first fraction dissolved in the separated portion of the second solvent, the first solvent dissolved in the separated portion of the second solvent, or a combination thereof;

feeding the bitumen-containing materials 0150 into a dissolution vessel 0102, optionally before contacting the bitumen-containing materials with the at least one solvent;

feeding the bitumen-containing materials 0150 into a tumbler 0404, optionally wherein the feeding the bitumen-containing materials 0150 into the tumbler 0404 occurs while the tumbler 0404 is located within the dissolution vessel 0102 or optionally wherein the feeding the bitumen-containing materials 0150 into the tumbler 0404 occurs while the tumbler 0404 is located outside the dissolution vessel 0102;

feeding the bitumen-containing materials 0150 (e.g., the first remaining portion 0250 of the bitumen-containing materials, the second remaining portion of the bitumen containing materials, or a combination thereof) into a tumbler 0404 located within a dissolution vessel 0102 before the step of contacting the bitumen-containing materials 0150 with the first solvent;

agitating the bitumen-containing materials 0150 (e.g., the first remaining portion 0250 of the bitumen-containing materials, the second remaining portion of the bitumen containing materials, or a combination thereof) to facilitate dissolution of the bitumen in the at least one solvent, the first fraction in the first solvent, the second fraction in the second solvent, or a combination thereof; optionally wherein the agitating the bitumen-containing materials 0150 (e.g., the first remaining portion 0250 of the bitumen-containing materials 0150, the second remaining portion 0250 of the bitumen-containing materials 0150, or a combination thereof) occurs in the tumbler 0404; optionally wherein the contacting the bitumen-containing materials 0150 with the at least one solvent (e.g., the first solvent, the second solvent, or a combination thereof) occurs in the tumbler 0404;

positioning the tumbler 0404 within the dissolution vessel 0102;

agitating the bitumen-containing materials 0150 to facilitate dissolution of the at least one fraction in the at least one solvent, dissolution of the first fraction into the first solvent, dissolution of the second fraction into the second solvent, or a combination thereof, optionally wherein the agitating the bitumen-containing materials 0150 comprises causing the bitumen-containing materials 0150 to tumble in a tumbler 0404; optionally wherein the agitating the bitumen-containing materials 0150 occurs contemporaneously with the contacting the bitumen-containing materials with the at least one solvent, the contacting the bitumen-containing materials 0150 with the first solvent, the contacting the bitumen-containing materials 0150 with the second solvent, or a combination thereof;

wherein the agitating the bitumen containing-materials comprises tumbling the bitumen-containing materials 0150 in a tumbler;

discharging a remaining portion (e.g., an undissolved portion, non-bitumen portion, non-first-fraction portion, non-second-fraction portion, or combination thereof) of the bitumen-containing materials 0150 from the tumbler 0404;

discharging a remaining portion (e.g., an undissolved portion, non-bitumen portion, non-first-fraction portion, non-second-fraction portion, or combination thereof) the bitumen-containing materials 0150 from the dissolution vessel 0102;

wherein the contacting the bitumen-containing materials 0150 with the at least one solvent comprises: spraying the at least one solvent into contact with the bitumen-containing materials 0150, optionally while the bitumen-containing materials 0150 are agitated, tumbled, or a combination thereof;

wherein the contacting the bitumen-containing materials 0150 with the first solvent comprises: spraying the first solvent onto the bitumen-containing materials 0150, optionally while the bitumen-containing materials 0150 are agitated, tumbled, or a combination thereof;

wherein the contacting the bitumen-containing materials 0150 with the second solvent comprises: spraying the second solvent onto the bitumen-containing materials 0150, optionally while the bitumen-containing materials 0150 are agitated, tumbled, or a combination thereof;

wherein separating 0904 the bitumen-containing materials 0150 provides the solvent-and-bitumen-rich stream 0158 and a remaining portion of the bitumen-containing materials 0150, and wherein the method comprises recirculating (e.g., step 0906 in FIG. 9) the solvent-and-bitumen-rich stream 0158 into contact with the remaining portion of the bitumen-containing materials 0150 (e.g., inside the dissolution vessel 0102, inside the cage 0414, or a combination thereof), optionally before separating 0908 the solvent-and-bitumen-rich stream;

recirculating (e.g., step 1006 in FIG. 10B) the first-solvent-and-first-fraction-rich stream 0258 into contact with the first remaining portion of the bitumen-containing materials 0150 (e.g., inside the dissolution vessel 0102, inside the cage 0414, or a combination thereof) optionally before separating 1008 the first-solvent-and-first-fraction-rich stream;

wherein the separating 1014 the first remaining portion 0250 of the bitumen-containing materials 0150 provides the second-solvent-and-second-fraction-rich stream 0358 and a second remaining portion 0350 of the bitumen-containing materials, wherein the method comprises recirculating (e.g., step 1016 in FIG. 10B) the second-solvent-and-second-fraction-rich stream 0358 into contact with the second remaining portion 0350 of the bitumen-containing materials 0350 (e.g., inside the dissolution vessel 0102, inside the cage 0414, or a combination thereof), optionally before separating 1018 the second-solvent-and-second-fraction-rich stream;

wherein the separating 0904 the bitumen-containing materials 0150 provides the solvent-and-bitumen-rich stream 0158 and a remaining portion (e.g., first remaining portion 0250, or second remaining portion 0350) of the bitumen-containing materials 0150, wherein the separating 0908 the solvent-and-bitumen-rich stream 0158 provides the bitumen-rich stream 0184 comprising the at least one fraction (e.g., which can be at least 10, 20, 30, 40, 50, 60, 70, 80, 90, 95, 96, 97, 98 or 99 wt. % and up to 100 wt. % of the mass of compounds equivalent to the at least one fraction in the solvent-and-bitumen-rich stream 0158) and a solvent-rich stream comprising the separated portion of the at least one solvent (e.g., which can be at least 10, 20, 30, 40, 50, 60, 70, 80, 90, 95, 96, 97, 98 or 99 wt. % and up to 100 wt. % of the mass of compounds equivalent to the separated portion of the at least one solvent in the solvent-and-bitumen-rich stream), wherein the method comprises recirculating (e.g., step 0910 in FIG. 9) the solvent-rich stream into contact with the remaining portion (e.g., first remaining portion 0250, or second remaining portion 0350) of the bitumen-containing materials 0150;

wherein the separating 1008 the first-solvent-and-first-fraction-rich stream 0258 provides the first-fraction-rich stream 0204 comprising the first fraction (e.g., the first fraction provides at least 1, 2, 3, 4, 5, 6, 7, 8, 9, 10, 20, 30, 40, 50, 60, 70, 80, 90, 95, 96, 97, 98 or 99 wt. % and up to 100 wt. % of the first-fraction-rich stream) and a first-solvent-rich stream 0280 comprising the separated portion of the first solvent (e.g., which can be at least 1, 2, 3, 4, 5, 6, 7, 8, 9, 10, 20, 30, 40, 50, 60, 70, 80, 90, 95, 96, 97, 98 or 99 wt. % and up to 100 wt. % of the mass of compounds equivalent to the separated portion of the first solvent in the first-solvent-and-first-fraction-rich stream), wherein the method comprises recirculating (e.g., step 1010 in FIG. 10B) the first-solvent-rich stream 0280 into contact with the first remaining portion 0250 of the bitumen-containing materials 0150;

wherein the separating 1014 the first remaining portion 0250 of the bitumen-containing materials 0150 provides the second-solvent-and-second-fraction-rich stream 0358 and a second remaining portion 0350 of the bitumen-containing materials, wherein the separating 1018 the second-solvent-and-second-fraction-rich stream 0358 provides the second-fraction-rich stream 0304 comprising the second fraction (e.g., the second-fraction provides at least 1, 2, 3, 4, 5, 6, 7, 8, 9, 10, 20, 30, 40, 50, 60, 70, 80, 90, 95, 96, 97, 98 or 99 wt. % and up to 100 wt. % of the second-fraction-rich stream) and a second-solvent-rich stream 0380 comprising the separated portion of the second solvent (e.g., which can be at least 1, 2, 3, 4, 5, 6, 7, 8, 9, 10, 20, 30, 40, 50, 60, 70, 80, 90, 95, 96, 97, 98 or 99 wt. % and up to 100 wt. % of the mass of compounds equivalent to the separated portion of the second solvent in the second-solvent-and-second-fraction-rich stream), wherein the method comprises recirculating (e.g., step 1020 in FIG. 11B) the second-solvent-rich stream 0380 into contact with the second remaining portion 0350 of the bitumen-containing materials 0350;

reintroducing the separated portion of the at least one solvent into contact with the bitumen-containing materials 0150 (e.g., inside the dissolution vessel 0102, inside the cage 0414, or a combination thereof);

reintroducing the separated portion of the first solvent into contact with the bitumen-containing materials 0150 (e.g., inside the dissolution vessel 0102, inside the cage 0414, or a combination thereof);

reintroducing the separated portion of the second solvent into contact with the bitumen-containing materials 0150 (e.g., inside the dissolution vessel 0102, inside the cage 0414, or a combination thereof);

wherein the bitumen-containing materials 0150 have not been comminuted;

wherein the at least one product stream 0182 (e.g., bitumen stream, maltene-rich bitumen stream, asphaltene-rich bitumen stream, first-fraction-rich stream 0204, first fraction, second-fraction-rich stream 0304, second fraction or a combination thereof) is heat treated by heating 0911 the at least one product stream 0182 to at least 204, 232, 260, 287, 315 or 343° C., within 0.28° C. of the listed temperature, no more than 233, 260, 288, 316, 344 or 372° C., or a combination thereof, optionally wherein the heating occurs in a heat treat container (e.g., tank, vessel, etc.), optionally wherein at least one wall of the heat treat container is contact with the at least one product and is heated to at least 260, 287, 315 or 343° C. and no more than 288, 316, 344 or 372° C., optionally wherein the at least one product stream 0182 is agitated (e.g., mixed, stirred, etc.) while the at least one product stream is heated by the heat treater 0110;

blending 1900 the first fraction and the second fraction (e.g., blending the first-fraction-rich stream 0204 and the second-fraction-rich stream 0304 as illustrated in FIG. 19) to provide a bitumen blend 1902; optionally wherein the bitumen blend comprises at least 50, 60, 70, 80, 90, 91, 92, 93, 94, 95, 96, 97, 98 or 99 and up to 100 wt. % asphaltenes and maltenes; optionally wherein the bitumen blend comprises at least 1, 2, 3, 4, 5, 6, 7, 8, 9, 10, 15, 20, 30, 40, 50, 60, 70, 80, 90, 91, 92, 93, 94, 95, 96, 97, 98 or 99 wt. % asphaltenes; optionally wherein the bitumen blend comprises no more than 1, 2, 3, 4, 5, 6, 7, 8, 9, 10, 15, 20, 30, 40, 50, 60, 70, 80, 90, 91, 92, 93, 94, 95, 96, 97, 98 or 99 wt. % asphaltenes; optionally wherein the bitumen blend comprises at least 1, 2, 3, 4, 5, 6, 7, 8, 9, 10, 15, 20, 30, 40, 50, 60, 70, 80, 90, 91, 92, 93, 94, 95, 96, 97, 98 or 99 wt. % maltenes; optionally wherein the bitumen blend comprises no more than 1, 2, 3, 4, 5, 6, 7, 8, 9, 10, 15, 20, 30, 40, 50, 60, 70, 80, 90, 91, 92, 93, 94, 95, 96, 97, 98 or 99 wt. % maltenes, or a combination thereof; optionally wherein a harder fraction (e.g., second fraction, asphaltenes) makes up at least 80 or 85 wt. % and less than 100 or 95 wt. % of the bitumen blend and wherein a softer fraction (e.g. first fraction, maltenes) makes up more than 0 wt. % or at least 5 wt. % and no more than 20 or 15 wt. % of the bitumen blend; optionally wherein a harder fraction (e.g., second fraction, asphaltenes) makes up at least 65 or 70 wt. % and less than 85 or 80 wt. % of the bitumen blend and wherein a softer fraction (e.g. first fraction, maltenes) makes up at least 15 or 20 wt. % and no more than 35 or 30 wt. % of the bitumen blend; optionally wherein the bitumen blend 1902 comprises a penetration value equal to at least 0, 1, 2, 3, 4, 5, 6, 7, 8, 9, 10, 20, 30, 40, 50, 60, 70, 80, 90, 100, 150, 200, 250, 300 or 350 dmm, equal to greater than 20 dmm, equal to no more than the maximum value of a penetration test, 600, 500, 400, 350, 300, 250, 200, 150, 100, 90, 80, 70, 60, 50, 40, 30, 20, 10, 9, 8, 7, 6, 5, 4, 3, 2 or 1 dmm, or a combination thereof; optionally wherein a penetration test is calibrated to provide results ranging from 0 to 400 dmm and the bitumen blend comprises a softness that is at or below the measurable bounds of the penetration test and thus reported as 0 dmm; optionally wherein the bitumen blend comprises a hardness that is at or above the measurable bounds of a penetration test and thus reported as the maximum value for the test (e.g., 400 dmm, 500 dmm, 600 dmm, etc.);

wherein the first solvent comprises a lighter-hydrocarbon solvent (e.g., lighter alkane, 1- to 7-carbon-chain-length alkane, lighter n-alkane, 1- to 7-carbon-chain-length n-alkane, hexane, heptane, xylene, pentane, n-hexane, n-heptane, n-pentane, or a combination thereof) for dissolving lighter hydrocarbons, optionally wherein the first solvent comprises a lighter-and-heavier-hydrocarbon solvent (e.g., substantially universal hydrocarbon solvent, toluene) for dissolving lighter and heavier hydrocarbons; optionally wherein the first solvent comprises a mass ratio of the lighter-hydrocarbon solvent to the lighter-and-heavier-hydrocarbon solvent that ranges from at least 5:95, 10:90, 20:80, 30:70, 40:60, 50:50, 60:40, 70:30, 80:20, 90:10 or 95:5 to no more than 100:0, 95:5, 90:10; 80:20, 70:30, 60:40, 50:50, 40:60, 30:70, 20:80, 10:90, or a combination thereof;

wherein the first fraction comprises components of a first kind (e.g., first set of types of molecular species, ranges of molecular weights, functionally classified molecular groups, or a combination thereof), wherein the mass ratio of the first solvent to recoverable components of the first kind in the bitumen-containing materials is at least 1:10, 1:9, 1:8, 1:7, 1:6, 1:5, 1:4, 1:3, 1:2 or 1:1, up to 10000:1, 1000:1, 100:1, 90:1, 80:1, 70:1, 60:1, 50:1, 40:1, 30:1, 20:1, 10:1, 9:1, 8:1, 7:1, 6:1, 5:1, 4:1, 3:1, 2:1 1:1, or a combination thereof;

wherein the first solvent is brought into contact with the bitumen-containing materials while the first solvent is at a temperature equal to at least ambient temperature, 0, 10, 20, 30, 40 or 50° C., no more than 10, 20, 30, 40, 50, 60, 70, 80, 90, or 100° C., or a combination thereof;

wherein the contacting the bitumen-containing materials with the first solvent, agitating the bitumen-containing materials, or a combination thereof lasts for at least 10, 11, 12, 13, 14, 15, 20, 25, 30, 60, 120, 180, 240, 300, 360 or 420 minutes, no more than 1 week, 48 hours, 36 hours, 24 hours, 12 hours, 8 hours, 4 hours, 3 hours, 2, hours, 60 minutes, 50 minutes, 40 minutes, 30 minutes, or 20 minutes, or a combination thereof;

wherein the first-solvent-rich stream is recovered (e.g., for storage, for reuse, or a combination thereof);

wherein the first-fraction-rich stream comprises a softer bitumen product; optionally wherein the softer bitumen product can be used to produce roofing shingles, cold patch, a sealant, a coating, or an emulsion composition; optionally wherein the softer bitumen product has a penetration value equal to greater than 20 dmm and optionally up to 400, 500, or 600 dmm or the maximum value of a penetration test;

wherein the first-fraction-rich stream is a product that has a penetration value equal to at least or greater than 0, 1, 2, 3, 4, 5, 6, 7, 8, 9, 10, 20, 30, 40, 50, 60, 70, 80, 90, 100, 150, 200, 250, 300 or 350 dmm to no more than the maximum value of a penetration test, 600, 500, 400, 350, 300, 250, 200, 150, 100, 90, 80, 70, 60, 50, 40, 30, 20, 15, 14, 13, 12, 11, 10, 9, 8, 7, 6, 5, 4, 3, 2 or 1 dmm, or a combination thereof;

wherein during the step of contacting the first remaining portion of the bitumen-containing materials with a second solvent, the second solvent comprises a heavier-hydrocarbon solvent (e.g., heavier-and-lighter hydrocarbon solvent, substantially universal hydrocarbon solvent, toluene) for dissolving heavier hydrocarbons, optionally wherein the second solvent comprises a lighter-hydrocarbon solvent (e.g., hexane, heptane, xylene, pentane or a combination thereof) for dissolving lighter hydrocarbons; optionally wherein the second solvent comprises a mass ratio of the heavier-hydrocarbon solvent to the lighter-hydrocarbon solvent that ranges from at least 50:50, 60:40, 70:30, 80:20 to no more than 100:0, 95:5, 90:10; or 80:20, or a combination thereof;

wherein the second fraction comprises components of a second kind (e.g., second set of types of molecular species, ranges of molecular weights, functionally classified molecular groups, or a combination thereof), wherein the mass ratio of the second solvent to recoverable components of the second kind in the first remaining portion of the bitumen-containing materials is at least 1:10, 1:9, 1:8, 1:7, 1:6, 1:5, 1:4, 1:3, 1:2 or 1:1, up to 10000:1, 1000:1, 100:1, 90:1, 80:1, 70:1, 60:1, 50:1, 40:1, 30:1, 20:1, 10:1, 9:1, 8:1, 7:1, 6:1, 5:1, 4:1, 3:1, 2:1 1:1, or a combination thereof;

wherein the second solvent is brought into contact with the first remaining portion of the bitumen-containing materials while the second solvent is at a temperature equal to at least ambient temperature, 0, 10, 20, 30, 40 or 50° C., no more than 10, 20, 30, 40, 50, 60, 70, 80, 90, or 100° C., or a combination thereof;

wherein the contacting the bitumen-containing materials with the first solvent, agitating the bitumen-containing materials, or a combination thereof lasts for at least 10, 11, 12, 13, 14, 15, 20, 25, 30, 60, 120, 180, 240, 300, 360 or 420 minutes, no more than 1 week, 48 hours, 36 hours, 24 hours, 12 hours, 8 hours, 4 hours, 3 hours, 2, hours, 60 minutes, 50 minutes, 40 minutes, 35 minutes or 30 minutes, or a combination thereof;

wherein separating the second-solvent-and-second-fraction-rich stream provides the second-fraction-rich stream and a second solvent-rich stream; optionally wherein the second-solvent-rich stream is recovered (e.g., for storage, for reuse, or a combination thereof);

wherein the second-fraction-rich stream comprises a harder bitumen product; optionally wherein the harder bitumen product has a penetration value equal to 0 dmm to 20 dmm;

wherein the second-fraction-rich stream is a product that has a penetration value equal to at least or greater than 0, 1, 2, 3, 4, 5, 6, 7, 8, 9, 10, 20, 30, 40, 50, 60, 70, 80, 90, 100, 150, 200, 250, 300 or 350 dmm to no more than the highest value of a penetration test, 600, 500, 400, 350, 300, 250, 200, 150, 100, 90, 80, 70, 60, 50, 40, 30, 20, 15, 14, 13, 12, 11, 10, 9, 8, 7, 6, 5, 4, 3, 2 or 1 dmm, or a combination thereof;

wherein the second-fraction-rich stream can be used to produce an emulsion composition;

wherein separating the first remaining portion of the bitumen-containing materials provides the second-solvent-and-second-fraction-rich stream and a second remaining portion of the bitumen-containing materials; optionally wherein the second remaining portion of the bitumen-containing materials comprises sand, gravel, granules, aggregate, fiberglass, cellulose, metal, or a combination thereof; optionally wherein the second remaining portion of the bitumen-containing materials are separated to provide a plurality of product streams (e.g., sand-rich stream, gravel-rich stream, granule-rich stream, aggregate-rich stream, fiberglass-rich stream, cellulose-rich stream, metal-rich stream, or a combination thereof);

wherein the bitumen (e.g., first fraction, second fraction, or a combination thereof) recovered from the bitumen-containing materials is at least 10, 20, 30, 40, 50, 60, 70, 80, 90, 91, 92, 93, 94, 95, 96, 97, 98, 99, 99.1, 99.2, 99.3, 99.4, 99.5, 99.6, 99.7, 99.8 or 99.9 wt. % of bitumen in the bitumen-containing materials, up to 100, 99. 9, 99.8, 99.7, 99.6, 99.5, 99.4, 99.3, 99.2, 99.1, 99, 98, 97, 96, 95, 94, 93, 92, 91 or 90 wt. % of bitumen in the bitumen-containing materials, or a combination thereof;

and a combination thereof.

8. The apparatus of clauses 1 or 2, the system 0101 of clause 3 or 4, the method of clause 5, 6 or 7, or a combination thereof, wherein the apparatus, system, method, or combination thereof comprises an element selected from the group consisting of:

wherein the bitumen-containing materials 0150 comprise materials selected from the group consisting of: solids, asphalt, roofing shingles, asphalt-roofing shingles, rolled roofing, asphalt rolled roofing, asphalt pavement, water-proofing materials, a material that uses asphalt cement as a binder, a material that uses bitumen as a binder, and a combination thereof;

wherein the bitumen-containing materials 0150 comprises a first fraction, a second fraction, a plurality of fractions, fiberglass, cellulose, gravel, granules, aggregate, sand, metal, or a combination thereof;

wherein the at least one fraction comprises a fraction selected from the group consisting of a first fraction, a second fraction, a third fraction, a plurality of fractions, bitumen, maltenes, asphaltenes, and a combination thereof;

wherein the at least one product stream 0182 comprises streams selected from the group consisting of: a vapor-rich stream, a liquid-rich stream, a bitumen-rich stream 0184, a first-fraction-rich stream, a second-fraction-rich stream, an asphaltene-rich bitumen stream, a maltene-rich bitumen stream, a first fraction, a second fraction, a solids-rich stream 0174, a solid-metal-rich stream (e.g., nails, staples, screws), a fiberglass-rich stream, a cellulose-rich stream, a gravel-rich stream, granule-rich stream, aggregate-rich stream, a sand-rich stream, a limestone-rich stream, a retentate stream, a permeate stream, a higher density stream, a lower density stream, a plurality of any streams listed in this clause, and a combination of any stream or plurality of streams listed in this clause with any other stream or plurality of streams listed in this clause;

wherein the bitumen comprises any compound, fraction, plurality of compounds or plurality of fractions soluble in the at least one solvent, wherein a compound or fraction is soluble in the at least one solvent if at least 0.1 g (optionally 1, 10 or 100 g) of the compound or fraction is soluble in 100 g of the solvent at 25° C. and 101.325 kPa after 48 hours of non-agitated contact with the solvent or at the operating conditions of a dissolution process described herein and after the duration of the dissolution process;

wherein the bitumen (e.g., first fraction, second fraction, or a combination thereof) recovered from the bitumen-containing materials is at least 10, 20, 30, 40, 50, 60, 70, 80, 90, 91, 92, 93, 94, 95, 96, 97, 98, 99, 99.1, 99.2, 99.3, 99.4, 99.5, 99.6, 99.7, 99.8 or 99.9 wt. % of bitumen in the bitumen-containing materials, up to 100, 99. 9, 99.8, 99.7, 99.6, 99.5, 99.4, 99.3, 99.2, 99.1, 99, 98, 97, 96, 95, 94, 93, 92, 91 or 90 wt. % of bitumen in the bitumen-containing materials, or a combination thereof;

wherein the at least one fraction makes up at least 1, 2, 3, 4, 5, 6, 7, 8, 9, 10, 20, 30, 40, 50, 60, 70, 80, 90 or 95 wt. % of the bitumen-rich stream 0184, no more than 50, 60, 70, 80, or 100 wt. % of the bitumen-rich stream 0184, or a combination thereof;

wherein the total amount of the at least one fraction provided in the bitumen-rich stream 0184 over the duration of the method comprises at least a portion (e.g., at least 1, 2, 3, 4, 5, 6, 7, 8, 9, 10, 20, 30, 40, 50, 60, 70, 80, 90 or 95% and up to 100% by weight) of the at least one fraction in the bitumen-containing materials 0150;

wherein the first fraction is the fraction (e.g., of bitumen) in the bitumen-containing materials that is soluble in the first solvent under dissolution conditions according to a process described herein;

wherein the first fraction comprises a fraction soluble in the first solvent, wherein a fraction is soluble in the first solvent if at least 0.1 g (optionally 1, 10 or 100 g) of the compound is soluble in 100 g of the first solvent at 25° C. and 101.325 kPa after 48 hours of non-agitated contact with the solvent or at the operating conditions of a dissolution process described herein and after the duration of the dissolution process;

wherein the first fraction is selected from a fraction soluble in at least one solvent selected from the group consisting of at least one normal (i.e., straight-chain) alkane, maltenes, asphaltenes, and a combination thereof;

wherein the first fraction comprises maltenes, asphaltenes, or a combination thereof;

wherein the first fraction comprises at least 0, 1, 2, 3, 4, 5, 6, 7, 8, 9, 10, 15, 20, 25, 30, 40, 50, 60, 70, 80, 90, 91, 92, 93, 94, 95, 96, 97, 98 or 99 wt. % maltenes, asphaltenes, or a combination thereof, wherein the first fraction comprises no more than 1, 2, 3, 4, 5, 6, 7, 8, 9, 10, 15, 20, 25, 30, 40, 50, 60, 70, 80, 90, 91, 92, 93, 94, 95, 96, 97, 98, 99 or 100 wt. % maltenes, asphaltenes, or a combination thereof;

wherein the first fraction comprises a relatively higher mass concentration of maltenes compared to the second fraction;

wherein the first fraction comprises more of the total mass of maltenes present in the bitumen-containing materials as compared to the second fraction;

wherein the first fraction comprise a lower molecular weight fraction (e.g., maltenes), a shorter-carbon-chain-length fraction, a higher molecular weight fraction (e.g., asphaltenes), a longer-carbon-chain-length fraction, or a combination thereof;

wherein the first fraction can comprise a softer bitumen (e.g., higher penetration value bitumen, a maltene-rich fraction, maltenes, or a combination thereof), a harder bitumen (e.g., lower penetration value bitumen, an asphaltene-rich stream, asphaltenes, or a combination thereof), or a combination thereof;

wherein the first fraction has a solubility in the first solvent selected from the group consisting of: at least 0.1, 0.2, 0.3, 0.4, 0.5, 0.6, 0.7, 0.8, 0.9, 1, 2, 3, 4, 5, 6, 7, 8, 9, 10, 20, 30, 40, 50, 60, 70, 80, 90, 100 grams first fraction per 100 grams first solvent;

wherein the first fraction is fully miscible in the first solvent;

wherein the first fraction is soluble in the first solvent; wherein the first fraction makes up at least at least 1, 2, 3, 4, 5, 6, 7, 8, 9, 10, 20, 30, 40, 50, 60, 70, 80, 90 or 95 wt. % of the first-fraction-rich stream 0204, no more than 50, 60, 70, 80, or 90 100 wt. % of the first-fraction-rich stream 0204, or a combination thereof;

wherein the first solvent comprises a lighter-hydrocarbon solvent (e.g., lighter alkane, 1- to 7-carbon-chain-length alkane, lighter n-alkane, 1- to 7-carbon-chain-length n-alkane, hexane, heptane, xylene, pentane, n-hexane, n-heptane, n-pentane or a combination thereof) for dissolving lighter hydrocarbons, optionally wherein the first solvent comprises a lighter-and-heavier-hydrocarbon solvent (e.g., substantially universal hydrocarbon solvent, toluene) for dissolving lighter and heavier hydrocarbons; optionally wherein the first solvent comprises a mass ratio of the lighter-hydrocarbon solvent to the lighter-and-heavier-hydrocarbon solvent that ranges from at least 5:95, 10:90, 20:80, 30:70, 40:60, 50:50, 60:40, 70:30, 80:20, 90:10 or 95:5 to no more than 100:0, 95:5, 90:10; 80:20, 70:30, 60:40, 50:50, 40:60, 30:70, 20:80, 10:90, or a combination thereof;

wherein the first solvent comprises a lighter-and-heavier-hydrocarbon solvent (e.g., substantially universal hydrocarbon solvent, toluene) for dissolving lighter and heavier hydrocarbons;

wherein the first fraction comprises components of a first kind (e.g., first set of types of molecular species, ranges of molecular weights, functionally classified molecular groups, or a combination thereof), wherein the mass ratio of the first solvent to recoverable components of the first kind in the bitumen-containing materials is at least 1:10, 1:9, 1:8, 1:7, 1:6, 1:5, 1:4, 1:3, 1:2 or 1:1, up to 10000:1, 1000:1, 100:1, 90:1, 80:1, 70:1, 60:1, 50:1, 40:1, 30:1, 20:1, 10:1, 9:1, 8:1, 7:1, 6:1, 5:1, 4:1, 3:1, 2:1 1:1, or a combination thereof;

wherein the total amount of the first fraction provided in the first-fraction-rich stream 0204 over the duration of the method comprises at least a portion (e.g., at least 1, 2, 3, 4, 5, 6, 7, 8, 9, 10, 20, 30, 40, 50, 60, 70, 80, 90 or 95% and up to 100% by weight) of the first fraction in the bitumen-containing materials 0150;

wherein the first-fraction-rich stream comprises a softer bitumen product; optionally wherein the softer bitumen product can be used to produce roofing shingles, cold patch, a sealant, a coating, or an emulsion composition; optionally wherein the softer bitumen product has a penetration value equal to greater than 20 dmm and optionally up to 400, 500 or 600 dmm or the maximum value of a penetration test, optionally wherein the softer bitumen product has a penetration value from at least 10, 15, 20, 30, 40, 50, 60, 70, 80, 90, 100, 150, 200, 250, 300, 350 or 400 dmm to no more than 400, 350, 300, 250, 200, 150, 100, 90, 80, 70, 60, 50, 40, 30, 20 or 15 dmm, or a combination thereof;

wherein the second fraction is the fraction (e.g., of bitumen) in the bitumen-containing materials that is soluble in the second solvent under dissolution conditions according to a process herein, optionally wherein the second fraction comprises material (e.g., bitumen) remaining in the bitumen-containing materials after the bitumen-containing materials have been contacted by the first solvent under dissolution conditions according to a process herein;

wherein the second fraction comprises a fraction soluble in the second solvent, wherein a fraction is soluble in the second solvent if at least 0.1 g (optionally 1, 10 or 100 g) of the compound is soluble in 100 g of the second solvent at 25° C. and 101.325 kPa after 48 hours of non-agitated contact with the solvent or at the operating conditions of a dissolution process described herein and after the duration of the dissolution process;

wherein the second fraction comprises a fraction soluble in a at least one solvent selected from the group consisting of at least one aromatic compound, asphaltenes, maltenes and a combination thereof;

wherein the second fraction comprises asphaltenes, maltenes, and a combination thereof;

wherein the second fraction comprises a relatively higher mass concentration of asphaltenes compared to the first fraction;

wherein the second fraction comprises more of the total mass of asphaltenes present in the bitumen-containing materials as compared to the first fraction;

wherein the second fraction comprises a lower molecular weight fraction (e.g., maltenes), a shorter-carbon-chain-length fraction, a higher molecular weight fraction (e.g., asphaltenes), a longer-carbon-chain-length fraction, or a combination thereof;

wherein the second fraction can comprise a softer bitumen (e.g., higher penetration value bitumen, maltene), a harder bitumen (e.g., lower penetration value bitumen, asphaltenes), or a combination thereof;

wherein the second fraction has a solubility in the second solvent selected from the group consisting of: at least 0.1, 0.2, 0.3, 0.4, 0.5, 0.6, 0.7, 0.8, 0.9, 1, 2, 3, 4, 5, 6, 7, 8, 9, 10, 20, 30, 40, 50, 60, 70, 80, 90, 100 grams second fraction per 100 grams second solvent;

wherein the second fraction is fully miscible in the second solvent;

wherein the second fraction is soluble in the second solvent;

wherein the second fraction makes up at least at least 1, 2, 3, 4, 5, 6, 7, 8, 9, 10, 20, 30, 40, 50, 60, 70, 80, 90 or 95 wt. % of the second-fraction-rich stream 0304, no more than 50, 60, 70, 80, 90 or 100 wt. % of the second-fraction-rich stream 0304, or a combination thereof;

wherein the second fraction comprises components of a second kind (e.g., second set of types of molecular species, ranges of molecular weights, functionally classified molecular groups, or a combination thereof), wherein the mass ratio of the second solvent to recoverable components of the second kind in the first remaining portion of the bitumen-containing materials is at least 1:10, 1:9, 1:8, 1:7, 1:6, 1:5, 1:4, 1:3, 1:2 or 1:1, up to 10000:1, 1000:1, 100:1, 90:1, 80:1, 70:1, 60:1, 50:1, 40:1, 30:1, 20:1, 10:1, 9:1, 8:1, 7:1, 6:1, 5:1, 4:1, 3:1, 2:1 1:1, or a combination thereof;

wherein the second-fraction-rich stream comprises a harder bitumen product; optionally wherein the harder bitumen product has a penetration value equal to at least 0, 1, 2, 3, 4, 5, 6, 7, 8, 9, 10, 15, 20, 25, 30 or 35 dmm, equal to no more than 40, 35, 30, 25, 20, 15, 10, 9, 8, 7, 6, 5, 4, 3, 2, or 1 dmm, or a combination thereof;

wherein the first-fraction-rich stream, the second-fraction-rich stream, a plurality of fraction-rich streams, or a combination thereof can be used to produce an emulsion composition;

wherein the total amount of the second fraction provided in the second-fraction-rich stream 0304 over the duration of the method comprises at least a portion (e.g., at least 1, 2, 3, 4, 5, 6, 7, 8, 9, 10, 20, 30, 40, 50, 60, 70, 80, 90 or 95% and up to 100% by weight) of the second fraction in the bitumen-containing materials 0150;

wherein organic compounds are compounds in which at least one carbon atom is covalently linked to an atom of another element, optionally wherein organic compounds excludes carbides, carbonates and cyanides;

wherein maltenes are organic compounds soluble in at least one alkane solvent or in at least one normal (i.e., straight-chain) alkane solvent, or a combination thereof;

wherein maltenes are organic compounds (e.g., from petroleum, bitumen, tar, pitch, asphalt, hydrocarbons, crude oil, the heaviest fraction produced by distillation of crude oil, the heaviest fraction produced by atmospheric distillation of crude oil, the heaviest fraction produced by vacuum distillation of crude oil, or a combination thereof), wherein at least 0.1 g (optionally 1, 10 or 100 g) of the organic compound is soluble in 100 g of an alkane solvent selected from the group consisting of n-pentane, n-hexane, and n-heptane at 25° C. and 101.325 kPa after 48 hours of non-agitated contact with the solvent or at the operating conditions of a dissolution process described herein and after the duration of the dissolution process;

wherein maltenes are organic compounds (e.g., from petroleum, bitumen, tar, pitch, asphalt, hydrocarbons, crude oil, the heaviest fraction produced by distillation of crude oil, the heaviest fraction produced by atmospheric distillation of crude oil, the heaviest fraction produced by vacuum distillation of crude oil, or a combination thereof), wherein at least 0.1 g (optionally 1, 10 or 100 g) of the organic compound is soluble in 100 g of n-heptane at 25° C. and 101.325 kPa after 48 hours of non-agitated contact with the solvent or at the operating conditions of a dissolution process described herein and after the duration of the dissolution process;

wherein maltenes are extracted from bitumen using a first solvent (e.g., alkane, n-alkane, pentane, hexane, heptane, n-pentane, n-hexane, n-heptane, acid, carboxylic acid, fatty acid, acetic acid, or a combination thereof) according to a process described herein (e.g., under the conditions used in a process described herein), and asphaltenes are a second fraction of the bitumen that is insoluble in the first solvent and remains after the first fraction soluble in the first solvent has been removed according to the process described herein, optionally wherein the asphaltenes are soluble in toluene according to a process described herein;

wherein maltenes are defined as a first fraction extracted from bitumen using a first solvent (e.g., alkane, pentane, hexane, heptane, n-alkane, n-pentane, n-hexane, n-heptane, acid, carboxylic acid, fatty acid, acetic acid, or a combination thereof at 25° C. and 101.325 kPa after 48 hours of non-agitated contact between the first solvent and the bitumen or bitumen-containing materials or at the operating conditions of a dissolution process described herein and after the duration of the dissolution process), and asphaltenes are defined as a second fraction of the bitumen that is insoluble in the first solvent (e.g., at 25° C. and 101.325 kPa after 48 hours of non-agitated contact between the first solvent and the bitumen or bitumen-containing materials or at the operating conditions of a dissolution process described herein and after the duration of the dissolution process) and remains after the first fraction soluble in the first solvent (e.g., at 25° C. and 101.325 kPa after 48 hours of non-agitated contact between the first solvent and the bitumen or bitumen-containing materials or at the operating conditions of a dissolution process described herein and after the duration of the dissolution process) has been removed, optionally wherein the asphaltenes are soluble in toluene at 25° C. and 101.325 kPa after 48 hours of non-agitated contact between the first solvent and the bitumen or bitumen-containing materials or at the operating conditions of a dissolution process described herein and after the duration of the dissolution process);

wherein asphaltenes are organic compounds (e.g., from petroleum, bitumen, tar, pitch, asphalt, hydrocarbons, crude oil, the heaviest fraction produced by distillation of crude oil, the heaviest fraction produced by atmospheric distillation of crude oil, the heaviest fraction produced by vacuum distillation of crude oil, or a combination thereof);

wherein asphaltenes are organic compounds soluble in at least one aromatic solvent;

wherein asphaltenes are organic compounds wherein at least 0.1 g (optionally 1, 10 or 100 g) of each of the organic compounds are soluble in 100 g of an aromatic solvent selected from the group consisting of benzene, toluene, ortho-xylene, meta-xylene, or para-xylene at 25° C. and 101.325 kPa after 48 hours of non-agitated contact with the solvent or at the operating conditions of a dissolution process described herein and after the duration of the dissolution process;

wherein asphaltenes are organic compounds in which less than 0.1 g (optionally 1, 10 or 100 g) of the organic compound is soluble in 100 g of an alkane solvent selected from the group consisting of n-propane, n-butane, n-pentane, n-hexane, and n-heptane at 25° C. and 101.325 kPa after 48 hours of non-agitated contact with the solvent or at the operating conditions of a dissolution process described herein and after the duration of the dissolution process;

wherein the at least one solvent comprises at least one solvent selected from the group consisting of: the first solvent, the second solvent, a third solvent, a plurality of solvents, alkanes, pentane, hexane, heptane, n-alkanes, n-pentane, n-hexane, n-heptane, cyclohexane, acids, carboxylic acids, fatty acids, acetic acids, aromatic compounds, xylene, ortho-xylene, meta-xylene, para-xylene, toluene, benzene, gasoline, diesel, kerosene, carboxylic acids, fatty acids, ketones, tetrachloroethylene, methylene chloride, carbon tetrachloride, turpentine, methanol, ethanol, propanol, butanol, 1,2-dioxane, 1,3-dioxane, 1,4-dioxane, acetone, butanone (also known as methyl ethyl ketone (MEK)), methyl isobutyl ketone (MIBK), ethers, methyl tert-butyl ether (MTBE), diethyl ether, formic acid, isophthalic acid (iPA), acetic acid, methyl acetate, ethyl acetate, coconut oil, sesame oil, chloroform (also known as trichloromethane), and a combination thereof;

wherein the at least one solvent (e.g., first solvent, second solvent, or a combination thereof) comprises at least one alkane (which can optionally comprise pentane, hexane, heptane, at least one n-alkane, n-pentane, n-hexane, n-heptane or a combination thereof), and wherein the at least one solvent comprises at least one aromatic compound (which can optionally comprise benzene, toluene, ortho-xylene, meta-xylene, para-xylene, or a combination thereof);

wherein the at least one alkane, acid, carboxylic acid, fatty acid, acetic acid, or combination thereof provides no more than 100, 99, 98, 97, 96, 95, 90, 85, 80, 75, 70, 65, 60, 55, 50, 45, 40, 35, 30, 25, 20, 15, 10, 9, 8, 7, 6, 5, 4, 3, 2, or 1 wt. % of the at least one solvent (e.g., first solvent, second solvent, or combination thereof), wherein the at least one alkane, acid, carboxylic acid, fatty acid, acetic acid, or combination thereof provides at least 0, 1, 2, 3, 4, 5, 6, 7, 8, 9, 10, 15, 20, 25, 30, 35, 40, 45, 50, 55, 60, 65, 70, 75, 80, 85, 90, 95, 96, 97, 98, or 99 wt. % of the at least one solvent (e.g., first solvent, second solvent, or combination thereof), wherein the at least one aromatic compound, ketone, methyl ethyl ketone (MEK), methyl isobutyl ketone (MIBK), or combination thereof provides at least 0, 1, 2, 3, 4, 5, 6, 7, 8, 9, 10, 15, 20, 25, 30, 35, 40, 45, 50, 55, 60, 65, 70, 75, 80, 85, 90, 95, 96, 97, 98, or 99 wt. % of the at least one solvent (e.g., first solvent, second solvent, or combination thereof), and wherein the at least one aromatic compound provides no more than 100, 99, 98, 97, 96, 95, 90, 85, 80, 75, 70, 65, 60, 55, 50, 45, 40, 35, 30, 25, 20, 15, 10, 9, 8, 7, 6, 5, 4, 3, 2 or 1 wt. % of the at least one solvent (e.g., first solvent, second solvent, or combination thereof);

wherein the at least one alkane provides 75 to 25 wt. % of the at least one solvent (e.g., first solvent) and wherein the at least one aromatic compound provides 25 to 75 wt. % of the at least one solvent (e.g., first solvent);

wherein the at least one alkane provides 60 to 40 wt. % of the at least one solvent (e.g., first solvent) and wherein the at least one aromatic compound provides 40 to 60 wt. % of the at least one solvent (e.g., first solvent);

wherein the at least one alkane provides 90 to 10 wt. % of the at least one solvent (e.g., first solvent) and wherein the at least one aromatic compound provides 10 to 90 wt. % of the at least one solvent (e.g., first solvent);

wherein the at least one alkane provides 95 to 75 wt. % of the at least one solvent (e.g., first solvent) and wherein the at least one aromatic compound provides 5 to 25 wt. % of the at least one solvent (e.g., first solvent);

wherein the at least one solvent (e.g., first solvent) comprises 95 to 85 wt. % n-heptane and 5 to 15 wt. % toluene;

wherein the first solvent comprises at least one solvent selected from the group consisting of: solvents in which maltenes are soluble, alkanes, lighter hydrocarbon solvents, 1- to 7-carbon-chain-length alkanes, pentane, hexane, heptane, xylene, 1- to 7-carbon-chain-length n-alkanes, n-pentane, n-hexane, n-heptane, acids, carboxylic acids, fatty acids, acetic acid, and combinations thereof;

wherein the first solvent comprises at least one alkane and the first fraction comprises maltenes;

wherein no more than 20, 15, 10, 9, 8, 7, 6 5, 4, 3, 2 or 1 wt. % and down to greater than 0 wt. % or down to 0 wt. % of the asphaltenes present in the bitumen-containing materials are soluble in the first solvent;

wherein the first solvent is provided at a temperature equal to at least ambient temperature, 0, 10, 20, 30, 40, 50, 60, 70, 80, or 90° C., no more than 10, 20, 30, 40, 45, 46, 47, 48, 49, 50, 60, 70, 80, 90 or 100° C.;

wherein the at least one alkane comprises, consists essentially of or consists of: n-pentane, n-hexane, n-heptane, or a combination thereof];

wherein the at least one alkane comprises n-heptane and wherein the at least one aromatic compound comprises toluene; wherein the at least one solvent (e.g., second solvent) comprises at least one aromatic compound (which can optionally comprise benzene, toluene, ortho-xylene, meta-xylene, para-xylene, or a combination thereof), optionally wherein the at least one aromatic compound provides at least 10, 20, 30, 40, 50, 60, 70, 80, 90, 91, 92, 93, 94, 95, 96, 97, 98 or 99 wt. % of the at least one solvent (e.g., second solvent);

wherein the at least one solvent (e.g., second solvent) comprises 0% or greater than 0% to no more than 50, 40, 30, 20, 10, 9, 8, 7, 6, 5, 4, 3, 2 or 1 wt. % of an alkane, optionally wherein the alkane comprises n-pentane, n-hexane, n-heptane, or a combination thereof;

wherein the second solvent comprises at least one aromatic compound and the second fraction comprises asphaltenes;

wherein the at least one aromatic compound comprises, consists essentially of or consists of: ortho-xylene, meta-xylene, para-xylene, toluene, benzene, insert, or a combination thereof;

wherein the second solvent comprises at least one solvent selected from the group consisting of: solvents in which asphaltenes are soluble, heavier-hydrocarbon solvents, heavier-and-lighter-hydrocarbon solvents, universal hydrocarbon solvents, aromatic compounds, benzene, toluene, ortho-xylene, meta-xylene, para-xylene, ketones, methyl ethyl ketone (MEK), methyl isobutyl ketone (MIBK), and combinations thereof;

wherein the second solvent comprises a mass ratio of the heavier-hydrocarbon solvent (e.g., heavier-and-lighter hydrocarbon solvent, a universal hydrocarbon solvent, toluene) to the lighter-hydrocarbon solvent (e.g., hexane, heptane, xylene, pentane or a combination thereof) that ranges from at least 50:50, 60:40, 70:30, 80:20 to no more than 100:0, 95:5, 90:10; or 80:20, or a combination thereof;

wherein at least 50, 60, 70, 80, 90, 91, 92, 93, 94, 95, 96, 97, 98, 99 and up to 100 wt. % of the asphaltenes remaining in the bitumen-containing materials after being contacted with the first solvent are soluble in the second solvent;

wherein at least 1, 2, 3, 4, 5, 10, 15, 20, 30, 40, 50, 60, 70, 80, or 90 and up to 100 wt. % of the maltenes remaining in the bitumen-containing materials after being contacted with the first solvent are soluble in the second solvent;

wherein the second solvent is provided at a temperature equal to at least ambient temperature, 0, 10, 20, 30, 40 or 50° C., no more than 10, 20, 30, 40, 50, 60, 70, 80, 90, or 100° C.;

wherein the initial amount of solvent added to the bitumen containing materials is approximately equal to at least 0.1, 0.2, 0.3, 0.4, 0.5 0.6, 0.7, 0.8, 0.9, 0.95, 1, 1.1, 1.2, 1.3, 1.4, 1.5, 1.6, 1.7, 1.8, 1.9 or 2.0 times and/or no more than 10000, 1000, 100, 10, 9, 8, 7, 6, 5, 4, 3, 2, 1.9, 1.8, 1.7, 1.6, 1.5, 1.4, 1.3, 1.2, 1.1 or 1 times the mass of the at least one fraction, the first fraction, the second fraction, the bitumen, or a combination thereof in the bitumen containing materials;

wherein the at least one solvent (e.g., in the at least one solvent stream 0152) comprises make-up solvent (e.g., provided by a make-up solvent stream 0154, from the make-up solvent storage system 0196, or a combination thereof), solvent provided by a solvent-rich stream 0180 from the at least one solvent-fraction separator 0108, a recirculating solvent (e.g., in the recirculating solvent stream 0187, from the recirculating solvent storage system 0186, or a combination thereof), solvent provided by a solvent-rich stream 0178, 0172 from at least one dryer 0116, 0114 (e.g., smaller solids dryer 0116, larger-solids dryer 0114 or a combination thereof), or a combination thereof;

wherein the at least one solvent (e.g., in the first solvent stream 0202) comprises make-up first solvent (e.g., provided by a make-up first solvent stream 0254, from the make-up first solvent storage system 0296, or a combination thereof), solvent provided by a first solvent-rich stream 0280 from the at least one solvent-fraction separator 0108, a recirculating first solvent (e.g., in the recirculating first solvent stream 0287, from the recirculating first-solvent storage system 0286, or a combination thereof), solvent provided by a first-solvent-rich stream 0278 from at least one dryer 0116 (e.g., smaller solids dryer 0116,), or a combination thereof;

wherein the at least one solvent (e.g., in the second solvent stream 0302) comprises make-up second solvent (e.g., provided by a make-up second solvent stream 0354, from the make-up second solvent storage system 0396, or a combination thereof), solvent provided by a second solvent-rich stream 0380 from the at least one solvent-fraction separator 0108, a recirculating second solvent (e.g., in the recirculating second solvent stream 0387, from the recirculating second-solvent storage system 0386, or a combination thereof), solvent provided by a second-solvent-rich stream 0378, 0372 from at least one dryer 0116, 0114 (e.g., smaller solids dryer 0116, larger-solids dryer 0114 or a combination thereof), or a combination thereof;

wherein the system 0101 is configured to provide for the addition of make-up solvent to the bitumen-containing materials 0150, to the recirculating solvent stream, the dissolution vessel 0102, or a combination thereof (e.g., in an amount equal to amount of solvent that is not recovered while processing a batch of bitumen-containing materials 0150, optionally wherein the system 0101 is configured so that 0% or greater than 0% to no more than 50, 40, 30, 20, 10, 9, 8, 7, 6, 5, 4, 3, 2, 1, 0.5 0. 4, 0.3, 0.2 or 0.1% by weight of the solvent used is not recovered (e.g., for use in the recirculating solvent stream) per batch of 1000 kg of bitumen-containing materials 0150 or per batch of 1000 kg of the at least one fraction, and/or optionally wherein no more than 500, 400, 300, 200, 100, 90, 80, 70, 60, 50, 40, 30, 20, or 10 kg of solvent is not recovered (e.g., for use in the recirculating solvent stream) per batch of 1000 kg of bitumen-containing materials 0150 or per batch of 1000 kg of the at least one fraction;

wherein the at least one product stream 0182 separated from bitumen-containing materials 0150 comprises at least one fraction selected from the group consisting of: a bitumen-rich stream 0184 (e.g., the at least one fraction, the first fraction, the second fraction, an asphaltene-rich bitumen stream, a maltene-rich bitumen stream, or a combination thereof), a sand-rich stream, a gravel-rich stream, a granule-rich stream, an aggregate-rich stream, a fiberglass-rich stream, a cellulose-rich stream, a metal-rich stream (e.g., nails, staples, screws), a limestone-rich stream, a vapor-rich stream, a liquid-rich stream, a solids-rich stream 0174, a solid-metal-rich stream (e.g., nails, staples, screws), a retentate stream, a permeate stream, a higher density stream, a lower density stream, and a combination thereof;

wherein a bitumen-rich stream 0184 (e.g., first-fraction-rich stream, second-fraction-rich stream, or a combination thereof) comprises at least one fraction selected from the group consisting of: the at least one fraction, the first fraction, the second fraction, an asphaltene-rich bitumen stream, a maltene-rich bitumen stream, asphaltenes, maltenes, and a combination thereof;

wherein a bitumen-rich stream comprises at least 1, 2, 3, 4, 5, 6, 7, 8, 9, 10, 20, 30, 40, 50, 60, 70, 80, 90, 91, 92, 93, 94, 95, 96, 97, 98, or 99 wt. % and up to 100 wt. % bitumen;

wherein a bitumen-rich stream 0184 in the at least one product stream 0182 separated from the bitumen-containing materials 0150 comprises a hard penetration ("pen") asphalt or low penetration ("pen") asphalt;

wherein a softening point value of the at least one product stream 0182, the bitumen-rich stream 0184, the first fraction, the second fraction, or a combination thereof is calculated according to ASTM D36M-14e1, "Standard Test Method for Softening Point of Bitumen (Ring-and-Ball Apparatus)" by ASTM International;

wherein a bitumen-rich stream 0184 in the at least one product stream 0182 separated from the bitumen-containing materials 0150 has a softening point of at least 60, 70, 80, 90, 100, 105, 110, 115, 116, 120, 130, 140, 150, 160, 170, 180, 190, 200, 210, 220, 230, 240, 250, 260 or 270° C.; a softening point of no more than 70, 80, 90, 100, 105, 110, 115, 116, 120, 130, 140, 150, 160, 170, 180, 190, 200, 210, 220, 230, 240, 250, 260, 270 or 280° C., a softening point of 100 to 130° C.; a softening point of 110 to 120° C.; or a combination thereof;

wherein a penetration ("pen") value of the at least one product stream 0182, the bitumen-rich stream 0184, the first-fraction-rich stream, the second-fraction-rich stream, the first fraction, the second fraction, or a combination thereof is no more than the highest value of a penetration test, 600, 500, 400, 350, 300, 250, 200, 150, 100, 90, 80, 70, 60, 50, 45, 40, 30, 20, 15, 14, 13, 12, 11, 10, 9, 8, 7, 6, 5, 4, 3, 2, 1, or 0 tenths of a millimeter (dmm), at least or greater than 0.0, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 20, 21, 22, 23, 24, 25, 30, 40, 45, 50, 60, 70, 80, 90, 100, 150, 200, 250, 300, 350, or 400 dmm, 3 to 40 dmm, 3 to 30 dmm, 3 to 25 dmm, 5 to 15 dmm, 7 to 12 dmm, 15 to 30 dmm, 18 to 27 dmm, or 20 to 24 dmm, or a combination thereof;

wherein a bitumen-rich stream 0184 in the at least one product stream 0182 separated from the bitumen-containing materials 0150 (e.g., a first-fraction-rich stream, a second-fraction-rich stream, an asphaltene-rich bitumen stream, maltene-rich bitumen stream, an asphaltene-and-maltene rich bitumen stream, or a combination thereof) has a penetration ("pen") value that is no more than the highest value of a penetration test, 600, 500, 400, 350, 300, 250, 200, 150, 100, 90, 80, 70, 60, 50, 45, 40, 30, 20, 15, 14, 13, 12, 11, 10, 9, 8, 7, 6, or 5 tenths of a millimeter (dmm), at least or greater than 0.0, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 20, 21, 22, 23, 24, 25, 30, 40, 45, 50, 60, 70, 80, 90, 100, 150, 200, 250, 300, 350, or 400 dmm, 3 to 40 dmm, 3 to 30 dmm, 3 to 25 dmm, 5 to 15 dmm, 7 to 12 dmm, 15 to 30 dmm, 18 to 27 dmm, or 20 to 24 dmm, or a combination thereof;

wherein a bitumen-rich stream 0184 in the at least one product stream 0182 separated from the bitumen-containing materials 0150 comprises an asphaltene-and-maltene-rich bitumen stream, wherein the asphaltene-and-maltene rich bitumen stream has a penetration ("pen") value that is equal to no more than the highest value of a penetration test, 600, 500, 400, 350, 300, 250, 200, 150, 100, 90, 80, 70, 60, 50, 45, 40, 30, 20, 19, 18, 17, 16, 15, 14, 13, 12, 11, 10, or 9 dmm, equal to at least or greater than 0.0, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 20, 21, 22, 23, 24, 25, 30, 40, 45, 50, 60, 70, 80, 90, 100, 150, 200, 250, 300, 350, or 400 dmm, or 1-18, 4-15, 6-13, 7-12, or 8-11 dmm, or a combination thereof;

wherein the solvent-rich stream 0180 comprises the first solvent, the second solvent, a plurality of solvents or a combination thereof;

wherein the bitumen-rich stream 0184 comprises the first fraction, the second fraction, a plurality of fractions or a combination thereof;

wherein the first fraction (e.g., maltenes) separated from the bitumen-containing materials 0150, or the first-fraction-rich stream or a combination thereof has a penetration ("pen") value equal to no more than the highest value of a penetration test, 600, 500, 400, 350, 300, 250, 200, 150, 100, 90, 80, 70, 60, 50, 40, 30, 20 or 15 tenths of a millimeter (dmm), equal to at least or greater than 10, 15, 20, 30, 40, 50, 60, 70, 80, 90, 100, 150, 200, 250, 300, 350 or 400 dmm, or a combination thereof;

wherein the second fraction (e.g., asphaltenes) separated from the bitumen-containing materials 0150, or the second-fraction-rich stream, or a combination thereof has a penetration ("pen") value equal to no more 40, 35, 30, 25, 20, 15, 10, 9, 8, 7, 6, 5, 4, 3, 2, 1, 0 dmm tenths of a millimeter (dmm), equal to at least or greater than 0, 1, 2, 3, 4, 5, 6, 7, 8, 9, 10, 15, 20, 25, 30 or 35 dmm, or a combination thereof;

wherein a bitumen-rich stream 0184 in the at least one product stream 0182 is separated from the bitumen-containing materials 0150, and optionally wherein at least 1, 10, 20, 30, 40, 50, 60, 70, 80, 90, 95, 96, 97, 98, 99 or 100 g of the bitumen-rich stream 0184 is soluble in 100 g of carbon disulphide and wherein the solubility of the bitumen-rich stream can range up to complete solubility in bitumen so that the bitumen is miscible with carbon disulphide;

wherein a bitumen-rich stream 0184 in the at least one product stream 0182 separated from the bitumen-containing materials comprises a soft penetration ("pen") asphalt or high penetration ("pen") asphalt, or wherein the at least one product stream 0182 separated from the bitumen-containing materials 0150 is not a hard pen or low pen asphalt, has a pen value of more than 20, 30 or 40 dmm, or a combination thereof;

wherein the bitumen comprises, consists essentially of or consists of: hydrocarbons, asphaltenes, maltenes, and a combination thereof;

wherein the bitumen comprises, consists essentially of or consists of: approximately 80-85 or 80.2 to 84.3 wt. % carbon, 5 to 15 or 9.8 to 10.8 wt. % hydrogen, 0.1 to 1.5 or 0.2 to 1.2 wt. % Nitrogen, 0.5 to 10 or 0.9 to 6.6 wt. % Sulphur, 0.2 to 1.5 or 0.4 to 1.0 wt. % Oxygen, 5-200 or 10 to 139 ppm Nickel, 3.5-3000 or 7 to 1590 ppm Vanadium, 2.5-300 or 5 to 147 ppm Iron, 0.05 to 7 0.1 to 3.7 ppm Manganese, 0.5 to 700 or 1 to 335 ppm Calcium, 0.5 to 260 or 1 to 134 ppm Magnesium, 3 to 300 or 6 to 159 ppm Sodium, or a combination thereof;

wherein the bitumen is non-crystalline; wherein the bitumen is black or dark brown; wherein at least 1, 10, 20, 30, 40, 50, 60, 70, 80, 90, 95, 96, 97, 98, 99 or 100 g of the bitumen is soluble in 100 g of carbon disulphide and wherein the solubility of the bitumen can range up to complete solubility in bitumen so that the bitumen is miscible with carbon disulphide; wherein the bitumen comprises a discontinuous asphaltene-phase dispersed in a continuous maltene phase, or a combination thereof; wherein a product stream (e.g., bitumen-rich stream; bitumen; first-fraction-rich stream; first fraction; second-fraction-rich stream; second fraction; bitumen blend; blend of the first fraction and the second fraction; a product produced using the at least one solvent, the first solvent, the second solvent, or a combination thereof, with or without agitation; or a combination thereof) comprises, consists essentially of, or consists of a product selected from the group consisting of:

(a) asphalt cement, optionally wherein the asphalt cement has a penetration value of 0 to 10 dmm as determined at 25° C. according to ASTM D5M-13, "Standard Test Method for Penetration of Bituminous Materials" by ASTM International, optionally wherein the asphalt cement is for use as a component in (e.g., blending agent for) a composition selected from the group consisting of (1) trackless tack coat emulsion, (2) trackless tack coat emulsion asphalt, and (3) a combination thereof;

(b) asphalt cement, optionally wherein the asphalt cement has a penetration value of 0 to 20 dmm as determined at 25° C. according to ASTM D5M-13, "Standard Test Method for Penetration of Bituminous Materials" by ASTM International, optionally wherein the asphalt cement is for use as a component in (e.g., blending agent for) a composition selected from the group consisting of (1) roofing flux, (2) oxidized coating asphalt, (3) rolled roofing asphalt, (4) asphalt used in trackless tack emulsion, (5) asphalt used in paving emulsions, (6) asphalt used in coating emulsions, (7) cold patch asphalt, (8) water seal coating asphalt, (9) pipe coating asphalt, (10) cut-back asphalt, (11) timber coating asphalt, (12) asphalt hardener additives, (12) PBA/PG (Polymer Modified Binder/Performance Grade) paving grade asphalts, (13) AR/AC (asphalt-rubber asphaltic concrete) Paving Grade asphalt, (14) AC Grade asphalt, (15) Pen Grade asphalt, (16) emulsion base stock (E.B.S.), (17) anionic emulsions, (18) cationic emulsions, (19) oxidized asphalt, (20) mildly oxidized asphalt, (21) unmodified asphalt, (22) polymer modified asphalt, and (23) a combination thereof;

(c) asphalt cement, optionally wherein the asphalt cement has a penetration value of 0 to 20 dmm as determined at 25° C. according to ASTM D5M-13, "Standard Test Method for Penetration of Bituminous Materials" by ASTM International, optionally wherein the asphalt cement comprises, consists essentially of, or consists of a composition selected from the group consisting of: (1) roofing flux asphalt, (2) oxidized coating asphalt, (3) paving grade asphalts, (4) trackless tack emulsion asphalt, (5) paving emulsions asphalt, (6) coating emulsions asphalt, (7) cold patch asphalt, (8) water seal coating asphalt, (9) pipe coating asphalt, (10) cut-back asphalt, (11) timber coating asphalt, (12) asphalt hardener additive, (13) PBA/PG (Polymer Modified Binder/Performance Grade) Paving Grade asphalt, (14) AR/AC (asphalt-rubber asphaltic concrete) Paving Grade asphalt, (15) AC grade asphalt, (16) pen grade asphalt, (17) emulsion base stock (E.B.S.), (18) anionic emulsifiers, (19) cationic emulsifiers, (20) oxidized asphalt, (21) mildly oxidized asphalt, (22) unmodified asphalt, (23) polymer modified asphalt, and (24) a combination thereof;

(d) pen asphalt, optionally wherein the pen asphalt has a penetration value of greater than 20 and up to 400 dmm as determined at 25° C. according to ASTM D5M-13, "Standard Test Method for Penetration of Bituminous Materials" by ASTM International, optionally wherein the asphalt cement is for use as a component in (e.g., blending agent for) a composition selected from the group consisting of (1) roofing flux asphalt, (2) oxidized coating asphalt, (3) rolled roofing asphalt, (4) paving grade asphalts, (5) asphalt used in trackless tack emulsion, (6) asphalt used in paving emulsions, (7) asphalt used in coating emulsions, (8) cold patch asphalt, (9) water seal coating asphalt, (10) pipe coating asphalt, (11) cut-back asphalt, (12) timber coating asphalt, (13) PBA/PG (polymer modified binder/performance grade) paving grade asphalt, (14) AR/AC (asphalt-rubber asphaltic concrete) paving grade asphalt, (15) AC Grade asphalt, (16) pen grade asphalt, (17) emulsion base stock (E.B.S.), (18) anionic emulsifiers, (19) cationic emulsifiers, (20) oxidized asphalt, (21) mildly oxidized asphalt, (22) unmodified asphalt, (23) polymer modified asphalt, and (24) a combination thereof;

(e) pen asphalt, optionally wherein the pen asphalt has a penetration value of greater than 20 and up to 400 dmm as determined at 25° C. according to ASTM D5M-13, "Standard Test Method for Penetration of Bituminous Materials" by ASTM International, optionally wherein the asphalt cement comprises, consists essentially of, or consists of a composition selected from the group consisting of roofing flux asphalt, oxidized coating asphalt, rolled roofing asphalt, paving grade asphalts, trackless tack emulsion asphalt, paving emulsions asphalt, coating emulsions asphalt, cold patch asphalt, water seal coating asphalt, pipe coating asphalt, cut-back asphalt, timber coating asphalt, PBA/PG (polymer modified binder/performance grade) paving grade asphalt, AR/AC (asphalt-rubber asphaltic concrete) paving grade asphalt, AC Grade asphalt, pen grade asphalt, emulsion base stock (E.B.S.), anionic emulsifiers, cationic emulsifiers, oxidized asphalt, mildly oxidized asphalt, unmodified asphalt, polymer modified asphalt, and a combination thereof;

(f) pen asphalt, optionally wherein the pen asphalt has a penetration value of 150 to 400 dmm as determined at 25° C. according to ASTM D5M-13, "Standard Test Method for Penetration of Bituminous Materials" by ASTM International, optionally wherein the asphalt cement is for use as a component in (e.g., blending agent for) a composition selected from the group consisting of asphalt maltene additives, asphalt grease compounds, asphalt lubricators, and a combination thereof;

(g) pen asphalt, optionally wherein the pen asphalt has a penetration value of 150 to 400 dmm as determined at 25° C. according to ASTM D5M-13, "Standard Test Method for Penetration of Bituminous Materials" by ASTM International, optionally wherein the asphalt cement comprises, consists essentially of, or consists of a composition selected from the group consisting of asphalt maltene additives, asphalt grease compounds, asphalt lubricators, and a combination thereof;

(h) filler sand, optionally wherein at least 50, 60, 70, 80, 90, 91, 92, 93, 94, 95, 96, 97, 98, 99 or 100 wt. % of the filler sand has a U.S. Sieve Size equal to No. 30 to No. 270 (nominal sieve opening of 600 microns to 53 microns) as measured according to ASTM D452-91(2013)e1, "Standard Test Method for Sieve Analysis of Surfacing for Asphalt Roofing Products" (e.g., using a pan), optionally wherein the filler sand has a specific gravity equal to 2 to 3 grams per cubic centimeter as measured according to ASTM C188-17, "Standard Test Method for Density of Hydraulic Cement", optionally wherein the filler sand is for use as a component in a composition selected from the group consisting of new asphalt shingles, new rolled roofing, hot mix, asphalt-based water sealants, asphalt-based coatings, asphalt emulsions, dirt fill (e.g., for use under and prior to pouring a concrete slab), landfill coverage, small aggregate for use in cold patch, and a combination thereof;

(i) back dusting sand, optionally wherein at least 50, 60, 70, 80, 90, 91, 92, 93, 94, 95, 96, 97, 98, 99 or 100 wt. % of the back dusting sand has a U.S. Sieve Size equal to No. 40 to No. 270 (nominal sieve opening of 420 microns to 53 microns) as measured according to ASTM D452-91(2013) e1, "Standard Test Method for Sieve Analysis of Surfacing for Asphalt Roofing Products" (e.g., using a pan), optionally wherein the back dusting sand has a specific gravity equal to 1.5 to 3.5 grams per cubic centimeter as measured according to ASTM C188-17, "Standard Test Method for Density of Hydraulic Cement", optionally wherein the back dusting sand is for use as a component in a composition selected from the group consisting of new asphalt shingles, new rolled roofing, fill dirt, landfill coverage, small aggregate for use in cold patch, and a combination thereof;

(j) headlap granules, optionally wherein at least 50, 60, 70, 80, 90, 91, 92, 93, 94, 95, 96, 97, 98, 99 or 100 wt. % of the headlap granules have a U.S. Sieve Size equal to No. 10 to No. 40 (nominal sieve opening of 2000 microns to 420 microns) as measured according to ASTM D452-91(2013) e1, "Standard Test Method for Sieve Analysis of Surfacing for Asphalt Roofing Products", optionally wherein the headlap granules have a specific gravity equal to 2.25 to 2.95 grams per cubic centimeter as measured according to ASTM C188-17, "Standard Test Method for Density of Hydraulic Cement", optionally wherein the headlap granules are for use as a component in a composition selected from the group consisting of new asphalt shingles, new rolled roofing, cement aggregate, hot mix aggregate, cold patch aggregate, asphalt emulsion aggregate, hot roofing, torched roofing, and a combination thereof;

(k) granules, optionally wherein at least 50, 60, 70, 80, 90, 91, 92, 93, 94, 95, 96, 97, 98, 99 or 100 wt. % of the granules have a U.S. Sieve Size equal to No. 12 to No. 40 (nominal sieve opening of 1680 microns to 420 microns) as measured according to ASTM D452-91(2013)e1, "Standard Test Method for Sieve Analysis of Surfacing for Asphalt Roofing Products", optionally wherein the granules have a specific gravity equal to 2.4 to 2.8 grams per cubic centimeter as measured according to ASTM C188-17, "Standard Test Method for Density of Hydraulic Cement", optionally wherein the granules are for use as a component in a composition selected from the group consisting of new asphalt shingles, new rolled roofing, cement aggregate, hot mix aggregate, cold patch aggregate, asphalt emulsion aggregate, hot roofing, torched roofing, and a combination thereof;

(l) sand, limestone or combination thereof (e.g., small solids), optionally wherein at least 50, 60, 70, 80, 90, 91, 92, 93, 94, 95, 96, 97, 98, 99 or 100 wt. % of the sand, limestone or combination thereof have a nominal particle size of 1 to 800 microns, have a nominal particle size of 1 to 840 microns, pass through a nominal 840 micron sieve (pass through a screen having a No. 20 nominal U.S. sieve size, e.g., as measured in accordance with ASTM D452-91(2013)

e1, "Standard Test Method for Sieve Analysis of Surfacing for Asphalt Roofing Products"), is retained by a filter having a nominal 1-micron pore size when conveyed in water at 170 kPa and 25° C. at the entrance to the filter, or a combination thereof, optionally wherein the sand, limestone or combination thereof is for use as a component in a composition selected from the group consisting of mortar, cement aggregate, hot mix aggregate, cold patch aggregate, and a combination thereof;

(m) a combination of asphalt and at least one component selected from the group consisting of sand, limestone, back dust sand, filler sand, and granules, optionally wherein at least 50, 60, 70, 80, 90, 91, 92, 93, 94, 95, 96, 97, 98, 99 or 100 wt. % of the sand, limestone or combination thereof have a nominal particle size of 1 to 800 microns, have a nominal particle size of 1 to 840 microns, pass through a nominal 840 micron sieve (pass through a screen having a No. 20 nominal U.S. sieve size, e.g., as measured in accordance with ASTM D452-91(2013)e1, "Standard Test Method for Sieve Analysis of Surfacing for Asphalt Roofing Products"), is retained by a filter having a nominal 1-micron pore size when conveyed in water at 170 kPa and 25° C. at the entrance to the filter, or a combination thereof, optionally wherein the asphalt has a penetration value of 0 to 100 dmm as determined at 25° C. according to ASTM D5M-13, "Standard Test Method for Penetration of Bituminous Materials" by ASTM International, optionally wherein the combination is for use as a component in a composition selected from the group consisting of cold patch, hot mix paving, roofing patch, waterproofing mix, pipe coating, walking path repair, bike path repair, in-situ roof repair spray, and a combination thereof;

(n) fiberglass, optionally wherein the fiberglass is for use as a component in a composition selected from the group consisting of (i) fiberglass, (ii) a blend of the shingle fiberglass, virgin fiberglass and resin (e.g., for use as fiberglass), and (iii) a combination thereof;

(o) rolled roofing fiberglass, optionally wherein the rolled roofing fiberglass is for use as a component in a composition selected from the group consisting of (i) fiberglass, (ii) a blend of the shingle fiberglass, virgin fiberglass and resin (e.g., for use as fiberglass), (iii) rolled roofing fiberglass, and (iv) a combination thereof;

(p) a combination of shingle fiberglass and at least one component selected from the group consisting of sand, limestone, back dust sand, and filler sand, optionally wherein at least 50, 60, 70, 80, 90, 91, 92, 93, 94, 95, 96, 97, 98, 99 or 100 wt. % of the sand, limestone or combination thereof have a nominal particle size of 1 to 800 microns, have a nominal particle size of 1 to 840 microns, pass through a nominal 840 micron sieve (pass through a screen having a No. 20 nominal U.S. sieve size, e.g., as measured in accordance with ASTM D452-91(2013)e1, "Standard Test Method for Sieve Analysis of Surfacing for Asphalt Roofing Products"), is retained by a filter having a nominal 1-micron pore size when conveyed in water at 170 kPa and 25° C. at the entrance to the filter, or a combination thereof, optionally wherein the combination is for use as a component in a composition selected from the group consisting of (i) a blend of the shingle fiberglass, virgin fiberglass and resin (e.g., for use as fiberglass), (ii) fiberglass products (e.g., paving stones, compressor pads, benches, trash can holders, parking stops, bricks, or a combination thereof), optionally wherein the fiberglass products are made from heat/pressure molding a blend of the combination and resins), (iii) landfill coverage (e.g., as a filler only), (iv) fill dirt (e.g., for use under and prior to pouring a concrete slab), (v) and a combination thereof;

(q) sand, limestone or combination thereof (e.g., small solids), optionally wherein at least 50, 60, 70, 80, 90, 91, 92, 93, 94, 95, 96, 97, 98, 99 or 100 wt. % of the sand, limestone or combination thereof has a nominal particle size equal to larger than 800 microns and up to 50 mm (2 inches), has a nominal particle size larger than 840 microns and up to 50 mm (2 inches), passes through a nominal 840 micron screen, passes through a screen having a nominal No. 20 U.S. sieve size (e.g., as measured in accordance with ASTM D452-91 (2013)e1, "Standard Test Method for Sieve Analysis of Surfacing for Asphalt Roofing Products"), is retained by a nominal 50 mm screen (nominal 2 inch screen), or a combination thereof, optionally wherein the sand, limestone or combination thereof is for use as a component in a composition selected from the group consisting of (1) headlap granules for roofing shingles, (2) roofing granules for roofing shingles, (3) a blend of the sand, limestone or combination thereof and headlap granules, (4) a blend of the sand, limestone or combination thereof and roofing granules, (5) a composition for landscaping, (6) a composition for controlling dust, (7) a hot roofing, (8) a membrane type roofing, (9) aggregate (e.g., for use in pre-cast concrete), and (10) a combination thereof; and (r) a combination thereof;

wherein the bitumen-containing materials 0150 are not melted, reduced in size (e.g., mechanically reduced in size, sliced, chopped, comminuted, pulverized, cut using blades or other devices, etc.), or a combination thereof before being fed to the apparatus, system or method;

wherein the bitumen-containing materials 0150 are not melted, mechanically reduced in size (e.g., sliced, chopped, comminuted, pulverized, cut using blades or other devices) or a combination thereof in the apparatus, system or method, optionally until the first fraction, the second fraction, the at least one product stream 0182, or a combination thereof have been separated from the bitumen-containing materials 0150;

wherein the bitumen-containing materials 0150 comprise a plurality of units of the bitumen-containing materials 0150, wherein each unit of the plurality of units comprises a longest distance between any two points on a surface of the unit, wherein the longest distance is at least 1, 2, 3, 4, 5, 10, 15, 20, 25 or 30 cm for at least 1, 5, 10, 20, 30, 40, 50, 60, 70, 80, or 90 wt. % of the units; optionally wherein each unit of the plurality of units comprises a longest transverse distance that is measured as the longest distance between any two points on a surface of the unit in a direction that is perpendicular to the longest distance, wherein the longest transverse distance is at least 1, 2, 3, 4, 5, 10, 15, 20, 25 or 30 cm for at least 1, 5, 10, 20, 30, 40, 50, 60, 70, 80, or 90 wt. % of the units;

wherein a component or fraction described herein as moved (e.g., fed, loaded, charged, received, unloaded, discharged, etc.) from one unit operation, container, vessel, piece of equipment or location to another unit operation, container, vessel, piece of equipment or location, the movement is accomplished using a conveyor (e.g., active or powered conveyor, endless conveyor belt, auger, pump, compressor, passive or non-powered conveyor, a chute, etc.), conduit (e.g., pipe, tube, duct, chute, etc.), or a combination thereof;

wherein when fluid communication is provided from one unit operation, container, vessel, piece of equipment or location to another unit operation, container, vessel, piece of equipment or location, the fluid communication can be provided using a conduit (e.g., pipe, tube, duct, chute, or a combination thereof and optionally the fluid can be caused to flow by using a conveyor (e.g., active or powered conveyor, endless conveyor belt, auger, pump, compressor, passive or non-powered conveyor, a chute, etc.)

wherein, when the dissolution vessel 0102 is positioned and oriented to facilitate the dissolution of the at least one fraction into the at least one solvent, a bottom of the dissolution vessel 0102 provides the catch basin 0410;

wherein the mixed-materials stream 0156 comprises the at least one solvent, the first solvent, the second solvent, a plurality of solvents, the at least one fraction, the first fraction, the second fraction, the smaller solid materials from the bitumen containing materials that can pass through the cage apertures 0416, a mixed-materials stream 0156 comprising bitumen-containing materials 0150 that have not completed the dissolution process in the dissolution vessel 0102, a mixed-materials stream 0156 comprising bitumen-containing materials 0150 that have completed the dissolution process in the dissolution vessel 0102, or a combination thereof; optionally wherein the dissolution process is deemed finished after completion of a specified dissolution process dwell time for the bitumen-containing materials 0150; optionally wherein the specified dissolution dwell time is at least 10, 11, 12, 13, 14, 15, 20, 25, 30, 60, 120, 180, 240, 300, 360 or 420 minutes, is no more than 1 week, 48 hours, 36 hours, 24 hours, 12 hours, 8 hours, 4 hours, 3 hours, 2, hours, 60 minutes, 50 minutes, 40 minutes, 35 minutes or 30 minutes, or a combination thereof; optionally wherein the dissolution process is deemed finished when the at least one fraction, the first fraction, the second fraction or a combination thereof makes up 0% or greater than 0% to no more than 1, 2, 3, 4, 5, 10 wt. % of the mixed-materials stream 0156;

an ultrasonic wave generator 2102 or plurality of ultrasonic wave generators 2102, optionally configured to direct ultrasonic waves 2104 (e.g., through fluid 2106, liquid, gas, air, solvent, or a combination thereof) to agitate the bitumen-containing materials 0150 (e.g., by impact) and facilitate the dissolution of bitumen in the bitumen containing materials 0150 into at least one solvent (e.g., solvent in the at least one solvent stream 0152, the first solvent, the second solvent, or a combination thereof);

wherein bitumen (e.g., first fraction, second fraction, maltenes, asphaltenes, or a combination thereof) from the bitumen-containing materials 0150 dissolves into a solvent (e.g., solvent in the at least one solvent stream 0152, first solvent, second solvent, or a combination thereof) while ultrasonic waves impact the bitumen-containing materials, optionally wherein the ultrasonic waves have a frequency of more than 20,000 Hz, and up to 20 MHz, more than 100 kHz and up to 20 MHz, or 1 to 20 MHz;

wherein the dissolution vessel 0102, the agitator, the tumbler, the cage 0414, or a combination thereof is configured so that the end 0442 of the dissolution vessel, the agitator, the tumbler, the cage 0414 or a combination thereof closest to the feed inlet 0408 of the dissolution vessel is provided at an angle of tilt (e.g., fixed or variable) relative to horizontal (e.g., from horizontal or greater than horizontal to at least 1, 2, 3, 4, 5, 10, 15, 20, 25, 30, 45, 60, or 90 degrees above horizontal, up to 2, 3, 4, 5, 10, 15, 20, 25, 30, 45, 60, 90 degrees or any degrees above horizontal, 0 to 90 degrees above horizontal, 2 to 45 degrees above horizontal, or 5 to 30 degrees above horizontal, or a combination thereof);

wherein the dissolution vessel 0102, agitator, tumbler, the cage 0414, or a combination thereof is configured to provide an inlet portion of an axis 1206 of rotation (e.g., for the cage 0414, shaft 0502, dissolution vessel 0102, agitator, tumbler or combination thereof) at an angle of tilt relative to horizontal (e.g., greater than horizontal, at least 1, 2, 3, 4, 5, 10, 15, 20, 25, 30, 45, 60, or 90 degrees above horizontal, up to 2, 3, 4, 5, 10, 15, 20, 25, 30, 45, 60, 90 degrees or any degrees above horizontal, or a combination thereof), wherein the inlet portion of the axis of rotation is the portion of the axis of rotation located adjacent to the feed inlet 0408 of the dissolution vessel;

wherein the dissolution vessel, agitator, tumbler, cage or combination thereof is provided at an angle of tilt (e.g., fixed or variable angle of tilt to facilitate loading and unloading), optionally wherein a support (e.g., structure functionally equivalent or identical to the tilt actuator except fixed in position), a frame, or combination thereof is configured to maintain the dissolution vessel, cage or combination thereof at the angle of tilt, optionally wherein the angle of tilt is greater than horizontal, at least 1, 2, 3, 4, 5, 10, 15, 20, 25, 30, 45, 60, or 90 degrees above horizontal, up to 2, 3, 4, 5, 10, 15, 20, 25, 30, 45, 60, 90 degrees or any degrees above horizontal, or a combination thereof;

wherein the mixed-materials discharge outlet 0424, the solids discharge outlet 0412, or a combination thereof is located at a lower elevation than the feed inlet 0408;

wherein the feed inlet 0408 is located at a first end of the dissolution vessel 0102 and wherein the mixed-materials discharge outlet 0424, the solids discharge outlet 0412, or a combination thereof is located at a second end 0442 of the dissolution vessel 0102, optionally wherein the second end 0444 of the dissolution vessel 0102 is opposite the first end 0442 of the dissolution vessel;

wherein the cage 0414, shaft 0502, dissolution vessel 0102, paddle, paddles, or a combination thereof is configured to rotate at a rotational velocity of at least 1, 2, 3, 4, 5, 6, 7, 8, 9, 10, 15, 20, 25, 30, 40, 50, 60, 70, 80, 90, 100, 110, 120, 130, 140, 150, 160, 170, 180, 190, 200, 210, 220 or 230 rotations per minute (rpm), at no more than 240, 230, 220, 210, 200, 190, 180, 170, 160, 150, 140, 130, 120, 110, 100, 90, 80, 70, 60, 50, 40, 30, 25, 20, 15, 10, 9, 8, 7, 6, 5, 4, 3, or 2 rpm, at greater than 0 to 240 rpm, at greater than 0 and up to 120 rpm, at 3 to 90 rpm, at 6 to 60 rpm, at 10 to 45 rpm, at 10 to 30 rpm, at 10 to 20 rpm, or a combination thereof;

wherein the process, system, apparatus, dissolution vessel, agitator, tumbler, cage or combination thereof processes at least 23, 45, 227, 454, 2268, 3402, 4536, 4990, 5443, 5897, 6350 or 6804 kg (50, 100, 500, 1000, 5000, 7500, 10000, 11000, 12000, 13000, 14000 or 15000 lb) per hour or per batch of bitumen-containing materials (e.g., fed to a process, system, apparatus, dissolution vessel, agitator, tumbler, cage, or combination thereof) and optionally up to 13608, 11340 or 9072 kg (30000, 25000 or 20000 lb) per hour or per batch of bitumen-containing material;

wherein the bitumen-containing materials (e.g., shingles) comprise 74 wt. % sand and/or gravel, 6 wt. % fiberglass, and 20. % bitumen (e.g., asphalt), optionally wherein the weight percentage of each component can vary by 30, 25, 20, 15, 10, 9, 8, 7, 6, 5, 4, 3, 2 or 1% from the listed weight percentages;

wherein the bitumen-containing materials (e.g., shingles) comprise at least 4.5, 9.1, 45, 91, 454, 680, 907, 998, 1089, 1179, 1270 or 1361 kg (10, 20, 100, 200, 1000, 1500, 2000, 2200, 2400, 2600, 2800 or 3000 lb) of bitumen per hour or per batch of bitumen-containing materials and optionally up to 2722, 2268 or 1814 kg (6000, 5000 or 4000 lb) of bitumen per hour or per batch of bitumen-containing materials;

wherein the at least one product stream (e.g., plurality of bitumen-rich streams, bitumen-rich stream, first-fist-fraction-rich stream, second-fraction-rich stream, maltene-rich stream, asphaltene-rich-stream, first fraction, second fraction, maltenes, asphaltenes or a combination thereof) comprises at least 50, 60, 70, 80, 85, 86, 87, 88, 89, 90, 91, 92, 93, 94, 95, 96, 97, 98, 99 wt. % and up to 100 wt. % of the bitumen in the bitumen-containing materials (e.g., on a per batch basis, per hour basis, or a combination thereof);

wherein the at least one product stream (e.g., plurality of bitumen-rich streams, bitumen-rich stream, first-fist-fraction-rich stream, second-fraction-rich stream, maltene-rich stream, asphaltene-rich-stream, first fraction, second fraction, maltenes, asphaltenes or a combination thereof) comprises at least 50, 60, 70, 80, 85, 86, 87, 88, 89, 90, 91, 92, 93, 94, 95, 96, 97, 98, 99 wt. % and up to 100 wt. % of the bitumen in the bitumen-containing materials;

and a combination thereof.

9. An apparatus to facilitate dissolution of at least one fraction of bitumen-containing materials into at least one solvent, the apparatus comprising:

a dissolution vessel;

a tumbler configured to agitate the bitumen-containing materials and facilitate wetting the bitumen-containing materials with the at least one solvent; and at least one solvent distributor configured to discharge the at least one solvent into the dissolution vessel;

wherein the dissolution vessel comprises:

a feed inlet of the dissolution vessel configured to facilitate feeding the bitumen-containing materials into the dissolution vessel;

a catch basin of the dissolution vessel; and at least one discharge outlet of the dissolution vessel;

wherein the tumbler comprises:

a cage configured to receive the bitumen-containing materials, wherein the bitumen-containing materials comprise larger solid objects and smaller solid objects, wherein the cage is configured to partially contain the bitumen-containing materials, wherein the cage comprises cage apertures configured to retain the larger solid objects that cannot pass through the cage apertures and allow liquid and the smaller solid objects to pass through the cage apertures; and a containment space bounded by the cage, wherein the containment space is configured to permit the bitumen-containing materials to be agitated within the cage;

wherein the catch basin is configured to receive catch basin contents, wherein the catch basin contents comprise the at least one solvent, the at least one fraction of the bitumen-containing materials and the smaller solid objects in the bitumen containing materials, and wherein the catch basin is configured to discharge the catch basin contents through the at least one discharge outlet, thereby providing a mixed-materials stream.

10. The apparatus of clause 9, wherein the apparatus comprises at least one element selected from the group consisting of:

the cage is configured to rotate within the dissolution vessel;

the tumbler comprises at least one paddle positioned inside the cage, wherein the at least one paddle is fixed to a rotatable shaft extending within the cage, and wherein the at least one paddle rotates within the dissolution vessel to agitate the bitumen-containing materials inside the cage;

the tumbler comprises at least one paddle positioned inside the cage, wherein the at least one paddle is fixed to an interior of the cage, and wherein the at least one paddle rotates within the dissolution vessel to agitate the bitumen-containing materials inside the cage;

the tumbler comprises at least one paddle positioned inside the cage, wherein the at least one paddle is configured to rotate in a first direction and a second direction that is opposite the first direction, wherein the tumbler is configured so that rotation of the at least one paddle in the first direction results in a force on the bitumen-containing materials that causes the bitumen-containing materials to move into the cage and away from the feed inlet of the dissolution vessel, and wherein the tumbler is configured so that rotation of the at least one paddle in the second direction results in a force on a remnant of the solid bitumen-containing materials remaining in the cage that causes the remnant in the cage to move toward a solids discharge outlet of the cage, wherein the solids discharge outlet of the cage is configured to discharge the remnant in the cage.

the at least one solvent distributor is configured to discharge the at least one solvent into contact with bitumen-containing materials enclosed by the tumbler when the tumbler is in a loaded configuration;

the dissolution vessel comprises a closure for the feed inlet of the dissolution vessel;

a solids discharge outlet of the dissolution vessel is located at a lower elevation than the feed inlet, wherein the dissolution vessel is provided at an angle of tilt, or a combination thereof;

the dissolution vessel comprises a tilt actuator configured to tilt the dissolution vessel to facilitate loading the bitumen-containing material into the cage and to facilitate discharging any undissolved portion of the bitumen-containing materials from the cage, and wherein a solids discharge outlet is located at a first end of the dissolution vessel and wherein the feed inlet is also located at the first end of the dissolution vessel;

the dissolution vessel comprises a solids discharge outlet, wherein the apparatus comprises a discharge hopper configured to receive a solids-rich stream from the solids discharge outlet, wherein the discharge hopper is configured to deliver the solids-rich stream to a solids conveyor;

the apparatus comprises a discharge housing, wherein the discharge housing, in conjunction with the discharge hopper, is configured to enclose the solids discharge outlet of the dissolution vessel;

the apparatus comprises a feed hopper, wherein the feed hopper is configured to receive the bitumen-containing materials from the solids conveyor, wherein the feed hopper is configured to deliver the bitumen-containing materials to the feed inlet of the dissolution vessel and inside the cage;

the tumbler comprises a rotation actuator and a shaft configured to provide an axis of rotation for the cage, wherein the shaft is rotatably mounted to the dissolution vessel, wherein the shaft is rotated by the rotation actuator and wherein the cage is fixed to the shaft;

the at least one solvent distributor comprises a conduit in fluid communication with a solvent source and wherein the at least one solvent distributor comprises a nozzle to spray the at least one solvent into contact with the bitumen-containing materials; and a combination thereof.

11. A system comprising the apparatus of clause 9, the system comprising:

a solid-liquid separator configured to receive the mixed-materials stream from the at least one discharge outlet of the dissolution vessel, wherein the solid-liquid separator is configured to separate the mixed-materials stream into a liquid-rich stream comprising liquid from the mixed-materials stream and a solids-rich stream comprising solids from the mixed-materials stream; and at least one solvent-fraction separator, wherein the at least one solvent-fraction separator is configured to separate the liquid-rich stream into a solvent-rich stream comprising the at least one solvent and a bitumen-rich stream comprising the at least one fraction.

12. The system of clause 11, wherein the system comprises at least one element selected from the group consisting of:

the system comprises a conveyor for the liquid-rich stream in fluid communication with the at least one solvent distributor, wherein the conveyor for the liquid-rich stream is configured to receive the liquid-rich stream and convey the liquid-rich stream to the at least one solvent distributor;

the system comprises a conveyor for the solvent-rich stream in fluid communication with the at least one solvent distributor, wherein the conveyor for the solvent-rich stream is configured to receive the solvent-rich stream, and convey the solvent-rich stream to the at least one solvent distributor;

the system comprises a dryer, wherein the dryer is configured to receive the solids-rich stream and discharge a dried solids-rich stream;

the at least one solvent-fraction separator comprises a flash drum;

the at least one solvent-fraction separator comprises a solvent-fraction heater and a flash valve, wherein the heater is configured to receive the liquid-rich stream and provide a heated liquid-rich stream, wherein the flash drum is configured to receive the heated liquid-rich stream and provide the bitumen-rich stream and the solvent-rich stream;

the at least one solvent-fraction separator comprises a solvent-fraction heater, a flash valve, a flash drum, a bottoms pump, and a recirculation heater, wherein the solvent-fraction heater is configured to receive the liquid-rich stream and provide a heated liquid-rich stream, wherein the flash valve is configured to receive the heated liquid-rich stream and reduce the pressure of the heated liquid-rich stream to provide a saturated stream, wherein the flash drum is configured to receive the saturated stream and provide the bitumen-rich stream and the solvent-rich stream, wherein the bottoms pump is configured to receive the bitumen-rich stream, wherein the bottoms pump and the system are configured to convey a first portion of the bitumen-rich stream to the recirculation heater, wherein the recirculation heater is configured to receive the first portion of the bitumen-rich stream, and discharge a heated bitumen-rich stream to the flash drum, wherein the bottoms pump and the system are configured to convey a second portion of the bitumen-rich stream to a bitumen storage system;

the system comprises a solvent heater to heat the at least one solvent to provide the at least one solvent at a desired temperature equal to at least 25° C. and no more than 200° C.;

the solid-liquid separator comprises at least one screen, wherein the at least one screen comprises screen apertures configured to retain solid objects from the bitumen-containing materials that cannot pass through the screen apertures while allowing liquid to pass through the screen apertures, wherein the solids-rich stream comprises at least a portion of the solid objects and wherein the liquid-rich stream comprises at least a portion of the liquid that passes through the screen apertures;

the solid-liquid separator comprises a vibratory screen;

the system comprises a flow restrictor in fluid communication with the at least one discharge outlet and configured to restrict a flow of the mixed-materials stream from the at least one discharge outlet;

the system comprises a heat treater configured to heat the bitumen-rich stream to provide a heat-treated product stream, wherein the bitumen-rich stream is heated to 204° C. to 372° C. to provide the heat-treated product stream, and wherein the heat treater is configured to agitate the bitumen-rich stream while the at least one product stream is heated by the heat treater; and a combination thereof.

13. A method for separating bitumen-containing materials to provide at least one product stream, wherein the at least one product stream comprises a bitumen-rich stream, wherein the bitumen-rich stream comprises at least one fraction selected from the group consisting of asphaltenes, maltenes and a combination thereof, the method comprising:

contacting the bitumen-containing materials with at least one solvent while agitating the bitumen-containing materials, wherein the bitumen-containing materials comprise the at least one fraction, and wherein the at least one fraction is soluble in the at least one solvent;

separating the bitumen-containing materials to provide a solvent-and-bitumen-rich stream comprising a separated portion of the at least one solvent and the at least one fraction dissolved in the separated portion of the at least one solvent;

separating the solvent-and-bitumen-rich stream to provide the bitumen-rich stream comprising the at least one fraction.

14. The method of clause 13, wherein the method comprises at least one element selected from the group consisting of:

the bitumen-rich stream comprises 80 to 100 wt. % bitumen;

the at least one solvent comprises at least one alkane, and wherein the at least one solvent comprises at least one aromatic compound;

the at least one solvent comprises at least one solvent selected from the group consisting of: alkanes, acids, aromatic compounds, ketones and a combination thereof;

the at least one alkane provides 95 to 5 wt. % of the at least one solvent and wherein the at least one aromatic compound provides 5 to 95 wt. % of the at least one solvent, and optionally wherein the at least one alkane provides 75 to 25 wt. % of the at least one solvent and wherein the at least one aromatic compound provides 25 to 75 wt. % of the at least one solvent;

the at least one alkane provides 60 to 40 wt. % of the at least one solvent and wherein the at least one aromatic compound provides 40 to 60 wt. % of the at least one solvent;

the at least one solvent comprises at least one alkane selected from the group consisting of n-pentane, n-hexane, n-heptane and a combination thereof, and wherein the at least one solvent comprises at least one aromatic compound selected from the group consisting of benzene, toluene, ortho-xylene, meta-xylene, para-xylene, and a combination thereof;

the at least one alkane comprises n-heptane and wherein the at least one aromatic compound comprises toluene;

the method comprises feeding the bitumen-containing materials into a tumbler located within a dissolution vessel before the step of contacting the bitumen-containing materials with the at least one solvent;

the method comprises agitating the bitumen-containing materials to facilitate dissolution of the at least one fraction in the at least one solvent, wherein the agitating the bitumen-containing materials and the contacting the bitumen-containing materials with the at least one solvent occur in the tumbler;

the method comprises discharging an undissolved portion of the bitumen-containing materials from the tumbler and the dissolution vessel;

the contacting the bitumen-containing materials with the at least one solvent comprises spraying the at least one solvent into contact with the bitumen-containing materials while the bitumen-containing materials are agitated;

separating the bitumen-containing materials provides the solvent-and-bitumen-rich stream and a remaining portion of the bitumen-containing materials, wherein the method comprises recirculating the solvent-and-bitumen-rich stream into contact with the remaining portion of the bitumen-containing materials;

separating the bitumen-containing materials provides the solvent-and-bitumen-rich stream and a remaining portion of the bitumen-containing materials, wherein the separating the solvent-and-bitumen-rich stream provides the bitumen-rich stream comprising the at the at least one fraction and a solvent-rich stream comprising the separated portion of the at least one solvent, wherein the method comprises recirculating the solvent-rich stream into contact with the remaining portion of the bitumen-containing materials;

the bitumen-containing materials comprise roofing shingles;

the bitumen-containing materials have not been comminuted;

comprising heating the bitumen-rich stream to 204° C. to 372° C. to provide a heat-treated bitumen-rich stream, and wherein the bitumen-rich stream is agitated during the heating of the bitumen-rich stream;

the bitumen-rich stream comprises a penetration value of 0 to 20 tenths of a millimeter, wherein the penetration value is determined at 25° C. according to ASTM D5M-13, "Standard Test Method for Penetration of Bituminous Materials" by ASTM International;

the bitumen-containing materials comprise rolled roofing;

the bitumen-containing materials have not been comminuted; and a combination thereof.

15. A method for separating bitumen-containing materials to provide at least one product stream, wherein the bitumen-containing materials comprise a first fraction and a second fraction, and wherein the at least one product stream comprises a first-fraction-rich stream comprising the first fraction and a second-fraction-rich stream comprising the second fraction, the method comprising:

contacting the bitumen-containing materials with a first solvent, wherein the first fraction is soluble in the first solvent, and wherein the first fraction comprises maltenes;

separating the bitumen-containing materials to provide a first-solvent-and-first-fraction-rich stream and a first remaining portion of the bitumen-containing materials, wherein the first-solvent-and-first-fraction-rich stream comprises a separated portion of the first solvent and the first fraction dissolved in the separated portion of the first solvent;

separating the first-solvent-and-first-fraction-rich stream to provide the first-fraction-rich stream;

contacting the first remaining portion of the bitumen-containing materials with a second solvent, wherein the first remaining portion of the bitumen-containing materials comprises the second fraction, wherein the second fraction is soluble in the second solvent, and wherein the second fraction comprises asphaltenes;

separating the first remaining portion of the bitumen-containing materials to provide a second-solvent-and-second-fraction-rich stream comprising a separated portion of the second solvent and the second fraction dissolved in the separated portion of the second solvent; and separating the second-solvent-and-second-fraction-rich stream to provide the second-fraction-rich stream.

16. The method of clause 15, wherein the apparatus comprises at least one element selected from the group consisting of:

the first-fraction-rich stream comprises 5 to 100 wt. % maltenes;

the second-fraction-rich stream comprises 50 to 100 wt. % asphaltenes;

the first solvent comprises an alkane;

the second solvent comprises an aromatic compound;

the first solvent comprises at least one alkane, and wherein the first solvent comprises at least one aromatic compound;

the at least one alkane provides 95 to 5 wt. % of the first solvent and wherein the at least one aromatic compound provides 5 to 95 wt. % of the first solvent;

the at least one alkane provides 95 to 75 wt. % of the first solvent and wherein the at least one aromatic compound provides 5 to 25 wt. % of the second solvent;

the at least one alkane provides 95 to 85 wt. % of the first solvent and wherein the at least one aromatic compound provides 5 to 15 wt. % of the second solvent;

the at least one alkane in the first solvent is selected from the group consisting of n-pentane, n-hexane, n-heptane and a combination thereof, and wherein the at least one aromatic compound in the first solvent is selected from the group consisting of benzene, toluene, ortho-xylene, meta-xylene, para-xylene, and a combination thereof;

the at least one alkane comprises n-heptane and wherein the at least one aromatic compound comprises toluene;

at least one aromatic compound provides 50 to 100 wt. % of the second solvent;

the second solvent comprises a limited amount of alkanes, wherein the limited amount the alkanes is within the range of 0 to 5 wt. % of the second solvent;

the second solvent comprises a limited amount of alkanes selected from the group consisting of n-pentane, n-hexane, n-heptane, or a combination thereof, wherein the limited amount of alkanes is within the range of 0 to 5 wt. % of the second solvent;

the method comprises feeding the bitumen-containing materials into a tumbler located within a dissolution vessel before the step of contacting the bitumen-containing materials with the first solvent;

the method comprises agitating the bitumen-containing materials to facilitate dissolution of the first fraction in the first solvent and agitating the first remaining portion of the bitumen-containing materials to facilitate dissolution of the second fraction in the second solvent; wherein the agitating the bitumen-containing materials, the contacting the bitumen-containing materials with the first solvent, agitating the first remaining portion of the bitumen-containing materials, and the contacting the first remaining portion of the bitumen-containing materials with the second solvent occur in the tumbler;

the method comprises recirculating the first-solvent-and-first-fraction-rich stream into contact with the first remaining portion of the bitumen-containing materials;

the separating the first remaining portion of the bitumen-containing materials provides a second-solvent-and-second-fraction-rich stream and a second remaining portion of the bitumen-containing materials, wherein the method comprises recirculating the second-solvent-and-second-fraction-rich stream into contact with the second remaining portion of the bitumen-containing materials;

the separating the first-solvent-and-first-fraction-rich stream provides the first-fraction-rich stream comprising the first fraction and a first-solvent-rich stream comprising the separated portion of the first solvent, wherein the method comprises recirculating the first-solvent-rich stream into contact with the first remaining portion of the bitumen-containing materials;

the separating the first remaining portion of the bitumen-containing materials provides the second-solvent-and-second-fraction-rich stream and a second remaining portion of the bitumen-containing materials, wherein the separating the second-solvent-and-second-fraction-rich stream provides the second-fraction-rich stream comprising the second fraction and a second-solvent-rich stream comprising the separated portion of the second solvent, wherein the method comprises recirculating the second-solvent-rich stream into contact with the second remaining portion of the bitumen-containing materials;

the bitumen-containing materials comprise roofing shingles;

the bitumen-containing materials have not been comminuted;

the method comprises blending the first fraction and the second fraction to provide a bitumen blend;

the first-fraction-rich stream comprises a relatively softer bitumen and wherein the second-fraction-rich stream comprises a relatively harder bitumen in comparison to the relatively softer bitumen;

the first-fraction-rich stream comprises a relatively softer bitumen having a relatively higher penetration value equal to greater than 20 tenths of a millimeter and optionally up to 600, 500 or 400 tenths of a millimeter, wherein the second-fraction-rich stream comprises a relatively harder bitumen having a relatively lower penetration value equal to 0 to 20 tenths of a millimeter, wherein the penetration values are determined at 25° C. according to ASTM D5M-13, "Standard Test Method for Penetration of Bituminous Materials" by ASTM International; and a combination thereof.

Although the present disclosure has provided many examples of systems, apparatuses, and methods, it should be understood that the components of the systems, apparatuses and methods described herein are compatible and additional embodiments can be created by combining one or more elements from the various embodiments described herein. As an example, in some embodiments, a method described herein can further comprise one or more elements of a system described herein or a selected combination of elements from any combination of the systems or apparatuses described herein.

Furthermore, in some embodiments, a method described herein can further comprise using a system or apparatus described herein, using one or more elements of a system or apparatus described herein, or using a selected combination of elements from any combination of the systems or apparatuses described herein.

Although embodiments of the invention have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments. For example, it should be understood that the method steps described herein are exemplary, and upon reading the present disclosure, a skilled person would understand that one or more method steps described herein can be combined, omitted, re-ordered, or substituted.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of" for "comprising."

Unless otherwise noted, when the term "at least," "more than," "no more than," "less than" or equivalent terms are used to define a range without also specifying an upper or lower endpoint for the range as applicable, the term is meant to indicate that the unspecified upper or lower end point is the lowest or greatest number possible depending on the characteristic that the number represents. For example, in some embodiments the lowest number possible can be 0 or any number greater than 0, although in other embodiments negative numbers are possible. Similarly, in some embodiments the highest number possible can be less than 0, can be 0, can be 1 (e.g., 100%) or can be any number up to infinity.

Where language, for example, "for" or "to", is used herein in conjunction with an effect, function, use or purpose, an additional embodiment can be provided by substituting "for" or "to" with "configured for/to" or "adapted for/to."

Additionally, when a range for a particular variable is given for an embodiment, an additional embodiment can be created using a subrange or individual values that are contained within the range. Moreover, when a value, values, a range, or ranges for a particular variable are given for one or more embodiments, an additional embodiment can be created by forming a new range whose endpoints are selected from any expressly listed value, any value between expressly listed values, and any value contained in a listed range. For example, if the application were to disclose an embodiment in which a variable is 1 and a second embodiment in which the variable is 3-5, a third embodiment can be created in which the variable is 1.31-4.23. Similarly, a fourth embodiment can be created in which the variable is 1-5.

As used herein, examples of "substantially" include: "more so than not," "mostly," and "at least 30, 40, 50, 60, 70, 80, 90, 95, 96, 97, 98 or 99%" with respect to a referenced characteristic. With respect to vectors, directions, movements or angles, that are "substantially" in the same direction as or parallel to a reference vector, direction, movement, angle or plane, "substantially" can also mean "at least a component of the vector, direction, movement or angle specified is parallel to the reference vector, direction, movement, angle or plane," although substantially can also mean within plus or minus 45, 40, 35, 30, 25, 20, 15, 10, 5, 4, 3, 2, or 1 degrees of the reference vector, direction, movement, angle or plane.

As used herein, examples of "about" and "approximately" include a specified value or characteristic to within plus or minus 30, 25, 20, 15, 10, 5, 4, 3, 2, or 1% of the specified value or characteristic.

As used herein, an example of a second stream that is "rich" in a component includes a stream that has a greater mass concentration of the component than a first stream from which the second stream is derived. For example, the second stream can be enriched in the component. As further examples, a stream rich in a component can comprise at least 1, 2, 3, 4, 5, 6, 7, 8, 9, 10, 20, 30, 40, 50, 60, 70, 80, 90, 91, 92, 93, 94, 95, 96, 97, 98, or 99 wt. % and up to 100 wt. % of the component.

As used herein, at least a portion of a component can comprise, for example, at least 1, 2, 3, 4, 5, 6, 7, 8, 9, 10, 20, 30, 40, 50, 60, 70, 80, 90, 91, 92, 93, 94, 95, 96, 97, 98, or 99 wt. % and up to 100 wt. % of the component.

As used herein, an embodiment reciting at least one component comprises a component, one and only one component and a plurality of components.

As used herein "at least one" is equivalent to "one or more."

Each test method referenced herein (for example ASTM test methods) are hereby incorporated by reference.

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A system comprising:
   an apparatus configured to facilitate dissolution of at least one fraction of bitumen-containing materials into at least one solvent;
   a solid liquid separator; and
   at least one solvent-fraction separator;
   the apparatus comprising:
      a dissolution vessel;
      a tumbler configured to agitate the bitumen-containing materials and facilitate wetting the bitumen-containing materials with the at least one solvent; and
      at least one solvent distributor configured to discharge the at least one solvent into the dissolution vessel;
   wherein the dissolution vessel comprises:
      a feed inlet of the dissolution vessel configured to facilitate feeding the bitumen-containing materials into the dissolution vessel;
      a catch basin of the dissolution vessel; and
      at least one discharge outlet of the dissolution vessel;
   wherein the tumbler comprises:
      a cage configured to rotate within the dissolution vessel and to receive the bitumen-containing materials, wherein the bitumen-containing materials comprise larger solid objects and smaller solid objects, wherein the cage is configured to partially contain the bitumen-containing materials, wherein the cage comprises cage apertures configured to retain the larger solid objects that cannot pass through the cage apertures and allow liquid and the smaller solid objects to pass through the cage apertures; and
      a containment space bounded by the cage, wherein the containment space is configured to permit the bitumen-containing materials to be agitated within the cage;
   wherein the catch basin is configured to receive catch basin contents, wherein the catch basin contents comprise the at least one solvent, the at least one fraction of the bitumen-containing materials and the smaller solid objects in the bitumen-containing materials, and wherein the catch basin is configured to discharge the catch basin contents through the at least one discharge outlet of the dissolution vessel, thereby providing a mixed-materials stream;
   the solid-liquid separator being configured to receive the mixed-materials stream from the at least one discharge outlet of the dissolution vessel, wherein the solid-liquid separator is configured to separate the mixed-materials stream into a liquid-rich stream comprising liquid from the mixed materials stream and a solids-rich stream comprising solids from the mixed-materials stream; and
   the at least one solvent -fraction separator being configured to separate the liquid-rich stream onto a solvent rich stream comprising the at least one solvent and a bitumen-rich stream comprising the at least one fraction;
   wherein the at least one solvent-fraction separator comprises a solvent-fraction heater, a flash valve, a flash drum, a bottoms pump, and a recirculation heater, wherein the solvent-fraction heater is configured to receive the liquid-rich stream and provide a heated liquid-rich stream, wherein the flash valve is configured to receive the heated liquid-rich stream and reduce the pressure of the heated liquid-rich stream to provide a saturated stream, wherein the flash drum is configured to receive the saturated stream and provide the bitumen-rich stream and the solvent-rich stream, wherein the bottoms pump is configured to receive the bitumen-rich stream, wherein the bottoms pump and the system are configured to convey a first portion of the bitumen-rich stream to the recirculation heater, wherein the recirculation heater is configured to receive the first portion of the bitumen-rich stream, and discharge a heated bitumen-rich stream to the flash drum, wherein the bottoms pump and the system are configured to convey a second portion of the bitumen-rich stream to a bitumen storage system.

2. The apparatus of claim 1, wherein the tumbler comprises at least one paddle positioned inside the cage, wherein the at least one paddle is fixed to a rotatable shaft extending within the cage, and wherein the at least one paddle rotates within the dissolution vessel to agitate the bitumen-containing materials inside the cage.

3. The apparatus of claim 1, wherein the tumbler comprises at least one paddle positioned inside the cage, wherein the at least one paddle is fixed to an interior of the cage, and wherein the at least one paddle rotates within the dissolution vessel to agitate the bitumen-containing materials inside the cage.

4. The apparatus of claim 1, wherein the tumbler comprises at least one paddle positioned inside the cage, wherein the at least one paddle is configured to rotate in a first direction and a second direction that is opposite the first direction, wherein the tumbler is configured so that rotation of the at least one paddle in the first direction results in a force on the bitumen-containing materials that causes the bitumen-containing materials to move into the cage and away from the feed inlet of the dissolution vessel, and wherein the tumbler is configured so that rotation of the at least one paddle in the second direction results in a force on a remnant of solid bitumen-containing materials remaining in the cage that causes the remnant in the cage to move toward a solids discharge outlet of the cage, wherein the solids discharge outlet of the cage is configured to discharge the remnant in the cage.

5. The apparatus of claim 1, wherein the at least one solvent distributor is configured to discharge the at least one solvent into contact with bitumen-containing materials contained by the tumbler when the tumbler is in a loaded configuration.

6. The apparatus of claim 1, wherein the dissolution vessel comprises a closure for the feed inlet of the dissolution vessel.

7. The apparatus of claim 1, wherein a solids discharge outlet of the dissolution vessel is located at a lower elevation than the feed inlet, wherein the dissolution vessel is provided at an angle of tilt, or a combination thereof.

8. The apparatus of claim 1, wherein the dissolution vessel comprises a tilt actuator configured to tilt the dissolution vessel to facilitate loading the bitumen-containing materials into the cage and to facilitate discharging any undissolved portion of the bitumen-containing materials from the cage, and wherein a solids discharge outlet is located at a first end of the dissolution vessel and wherein the feed inlet is also located at the first end of the dissolution vessel.

9. The apparatus of claim 1, wherein the dissolution vessel comprises a solids discharge outlet, wherein the apparatus comprises a discharge hopper configured to receive a solids-rich discharge stream from the solids discharge outlet, wherein the discharge hopper is configured to deliver the solids-rich discharge stream to a solids conveyor.

10. The apparatus of claim 9, wherein the apparatus comprises a discharge housing, wherein the discharge housing, in conjunction with the discharge hopper, is configured to enclose the solids discharge outlet of the dissolution vessel.

11. The apparatus of claim 10, wherein the apparatus comprises a feed hopper, wherein the feed hopper is configured to receive the bitumen-containing materials from the solids conveyor, wherein the feed hopper is configured to deliver the bitumen-containing materials to the feed inlet of the dissolution vessel and inside the cage.

12. The apparatus of claim 1, wherein the tumbler comprises a rotation actuator and a shaft configured to provide an axis of rotation for the cage, wherein the shaft is rotatably mounted to the dissolution vessel, wherein the shaft is rotated by the rotation actuator and wherein the cage is fixed to the shaft.

13. The apparatus of claim 1, wherein the at least one solvent distributor comprises a conduit in fluid communication with a solvent source and wherein the at least one solvent distributor comprises a nozzle to spray the at least one solvent into contact with the bitumen-containing materials.

14. The system of claim 1, wherein the system comprises a conveyor for the liquid-rich stream in fluid communication with the at least one solvent distributor, wherein the conveyor for the liquid-rich stream is configured to receive the liquid-rich stream and convey the liquid-rich stream to the at least one solvent distributor.

15. The system of claim 1, wherein the system comprises a conveyor for the solvent-rich stream in fluid communication with the at least one solvent distributor, wherein the conveyor for the solvent-rich stream is configured to receive the solvent-rich stream, and convey the solvent-rich stream to the at least one solvent distributor.

16. The system of claim 1, wherein the system comprises a dryer, wherein the dryer is configured to receive the solids-rich stream and discharge a dried solids-rich stream.

17. The system of claim 1, wherein the system comprises a solvent heater to heat the at least one solvent to provide the at least one solvent at a desired temperature equal to at least 25° C. and no more than 200° C.

18. The system of claim 1, wherein the solid-liquid separator comprises at least one screen, wherein the at least one screen comprises screen apertures configured to retain solid objects from the bitumen-containing materials that cannot pass through the screen apertures while allowing liquid to pass through the screen apertures, wherein the solids-rich stream comprises at least a portion of the solid objects that cannot pass through the screen apertures and wherein the liquid-rich stream comprises at least a portion of the liquid that passes through the screen apertures.

19. The system of claim 1, wherein the solid-liquid separator comprises a vibratory screen.

20. The system of claim 1, wherein the system comprises a flow restrictor in fluid communication with the at least one discharge outlet and configured to restrict a flow of the mixed-materials stream from the at least one discharge outlet of the dissolution vessel.

21. The system of claim 1, wherein the system comprises a heat treater configured to heat the bitumen-rich stream to provide a heat-treated product stream, wherein the bitumen-rich stream is heated to 204° C. to 372° C. to provide the heat-treated product stream, and wherein the heat treater is configured to agitate the bitumen-rich stream while the bitumen-rich stream is heated by the heat treater.

* * * * *

UNITED STATES PATENT AND TRADEMARK OFFICE
CERTIFICATE OF CORRECTION

PATENT NO. : 10,695,769 B2  
APPLICATION NO. : 15/932291  
DATED : June 30, 2020  
INVENTOR(S) : Robert William Palmer et al.

Page 1 of 2

It is certified that error appears in the above-identified patent and that said Letters Patent is hereby corrected as shown below:

In the Claims

Column 77, Line 45, Claim 1 replace "a solid liquid separator; and" with --a solid-liquid separator; and--.

Column 78, Line 18, Claim 1 replace "the at least pne discharge" with --at least one discharge--.

Column 78, Line 22, Claim 1 replace "the mixed materials stream" with --the mixed-materials stream--.

Column 78, Line 25, Claim 1 replace "at least one solvent -fraction separator" with --at least one solvent-fraction separator--.

Column 78, Lines 26 to 27, Claim 1 replace "onto a solvent rich stream" with --into a solvent-rich stream--.

Column 78, Line 51, Claim 2 replace "2. The apparatus of claim 1" with --2. The system of claim 1--.

Column 78, Line 57, Claim 3 replace "3. The apparatus of claim 1" with --3. The system of claim 1--.

Column 78, Line 63, Claim 4 replace "4. The apparatus of claim 1" with --4. The system of claim 1--.

Column 79, Line 12, Claim 5 replace "5. The apparatus of claim 1" with --5. The system of claim 1--.

Column 79, Line 17, Claim 6 replace "6. The apparatus of claim 1" with --6. The system of claim 1--.

Column 79, Line 20, Claim 7 replace "7. The apparatus of claim 1" with --7. The system of claim 1--.

Column 79, Line 24, Claim 8 replace "8. The apparatus of claim 1" with --8. The system of claim 1--.

Signed and Sealed this  
Sixteenth Day of November, 2021

Drew Hirshfeld  
*Performing the Functions and Duties of the  
Under Secretary of Commerce for Intellectual Property and  
Director of the United States Patent and Trademark Office*

CERTIFICATE OF CORRECTION (continued)
U.S. Pat. No. 10,695,769 B2

Column 79, Line 32, Claim 9 replace "9. The apparatus of claim 1" with --9. The system of claim 1--.

Column 79, Line 38, Claim 10 replace "10. The apparatus of claim 9" with --10. The system of claim 9--.

Column 79, Line 43, Claim 11 replace "11. The apparatus of claim 10" with --11. The system of claim 10--.

Column 79, Line 49, Claim 12 replace "12. The apparatus of claim 1" with --12. The system of claim 1--.

Column 80, Line 4, Claim 13 replace "13. The apparatus of claim 1" with --13. The system of claim 1--.